(12) United States Patent
Holt

(10) Patent No.: US 7,971,005 B2
(45) Date of Patent: Jun. 28, 2011

(54) ADVANCED CONTENTION DETECTION

(75) Inventor: John M. Holt, Hornchurch (GB)

(73) Assignee: Waratek Pty Ltd., Lindfield, New South Wales (AU)

( * ) Notice: Subject to any disclaimer, the term of this patent is extended or adjusted under 35 U.S.C. 154(b) by 741 days.

(21) Appl. No.: 11/973,372

(22) Filed: Oct. 5, 2007

(65) Prior Publication Data

US 2008/0140976 A1    Jun. 12, 2008

Related U.S. Application Data

(60) Provisional application No. 60/850,711, filed on Oct. 9, 2006.

(30) Foreign Application Priority Data

Oct. 5, 2006   (AU) ................................. 2006905527

(51) Int. Cl.
*G06F 12/00* (2006.01)
*G06F 13/00* (2006.01)
(52) U.S. Cl. .......................... 711/150; 711/154; 711/168
(58) Field of Classification Search .................. 711/100, 711/147, 148, 154, 150
See application file for complete search history.

(56) References Cited

U.S. PATENT DOCUMENTS

| | | |
|---|---|---|
| 4,068,298 A | 1/1978 | Dechant et al. |
| 4,969,092 A | 11/1990 | Shorter |
| 4,982,402 A | 1/1991 | Beaven et al. |
| 5,053,943 A | 10/1991 | Yokoyama |
| 5,067,069 A | 11/1991 | Fite et al. |
| 5,089,957 A | 2/1992 | Stultz et al. |
| 5,113,507 A | 5/1992 | Jaeckel |
| 5,214,776 A | 5/1993 | Bagnoli et al. |
| 5,283,897 A | 2/1994 | Georgiadis et al. |

(Continued)

FOREIGN PATENT DOCUMENTS

WO    WO95/08809    3/1995

(Continued)

OTHER PUBLICATIONS

International Search Report and Written Opinion for PCT International Patent Application No. PCT/AU2007/001489, mailed on Nov. 23, 2007.

(Continued)

*Primary Examiner* — Tuan V. Thai
(74) *Attorney, Agent, or Firm* — Pillsbury Winthrop Shaw Pittman LLP

(57) ABSTRACT

A multiple computer system is disclosed in which n computers (M1, M2 . . . Mn) each run a different portion of a single application program written to execute only on a single computer. The local memory of each computer is maintained substantially the same by updating all computers with every change made to addressed memory locations. Contention can arise when the same memory location is substantially simultaneously updated by two or more machines because of transmission delays and latency of the communications network interconnecting all the computers. Contention detection and resolution is disclosed. A count value (99) indicative of the cumulative number of times each memory location has been updated is utilized. Contention is indicated if the currently stored count value and the incoming updating count value are the same. A method of echo suppression and a method of echo rejection are disclosed. In particular incrementing the count value by two in the case of consecutive sequential transmission to the same memory location (D) is disclosed.

15 Claims, 34 Drawing Sheets

U.S. PATENT DOCUMENTS

| | | | |
|---|---|---|---|
| 5,291,581 | A | 3/1994 | Cutler et al. |
| 5,291,597 | A | 3/1994 | Shorter |
| 5,418,966 | A | 5/1995 | Madduri |
| 5,434,994 | A | 7/1995 | Shaheen et al. |
| 5,488,723 | A | 1/1996 | Baradel et al. |
| 5,544,345 | A | 8/1996 | Carpenter et al. |
| 5,568,605 | A | 10/1996 | Clouston et al. |
| 5,568,609 | A | 10/1996 | Sugiyama et al. |
| 5,612,865 | A | 3/1997 | Dasgupta |
| 5,719,872 | A | 2/1998 | Dubberly et al. |
| 5,802,585 | A | 9/1998 | Scales et al. |
| 5,806,075 | A | 9/1998 | Jain et al. |
| 5,918,248 | A | 6/1999 | Newell et al. |
| 6,049,809 | A | 4/2000 | Raman et al. |
| 6,122,630 | A | 9/2000 | Strickler et al. |
| 6,148,377 | A | 11/2000 | Carter et al. |
| 6,161,170 | A | 12/2000 | Burger et al. |
| 6,163,801 | A | 12/2000 | O'Donnell et al. |
| 6,178,441 | B1 | 1/2001 | Elnozahy |
| 6,192,514 | B1 | 2/2001 | Lurndal |
| 6,266,747 | B1 | 7/2001 | Dahl et al. |
| 6,314,558 | B1 | 11/2001 | Angel et al. |
| 6,324,587 | B1 | 11/2001 | Trenbeath et al. |
| 6,327,630 | B1 | 12/2001 | Carroll et al. |
| 6,370,625 | B1 | 4/2002 | Carmean et al. |
| 6,389,423 | B1 * | 5/2002 | Sakakura ........................ 707/613 |
| 6,425,016 | B1 | 7/2002 | Banavar et al. |
| 6,446,170 | B1 | 9/2002 | Chan et al. |
| 6,449,734 | B1 * | 9/2002 | Shrivastava et al. ............. 714/15 |
| 6,460,051 | B1 | 10/2002 | LaRue et al. |
| 6,571,278 | B1 | 5/2003 | Negishi et al. |
| 6,574,628 | B1 | 6/2003 | Kahn et al. |
| 6,574,674 | B1 | 6/2003 | May et al. |
| 6,611,955 | B1 | 8/2003 | Logean et al. |
| 6,625,751 | B1 | 9/2003 | Starovic et al. |
| 6,633,577 | B1 | 10/2003 | Nyu |
| 6,668,260 | B2 | 12/2003 | Zoltan |
| 6,725,014 | B1 | 4/2004 | Voegele |
| 6,757,896 | B1 | 6/2004 | Cohen et al. |
| 6,760,903 | B1 | 7/2004 | Morshed et al. |
| 6,775,831 | B1 | 8/2004 | Carrasco et al. |
| 6,779,093 | B1 | 8/2004 | Gupta |
| 6,782,492 | B1 | 8/2004 | Nakaso |
| 6,823,511 | B1 | 11/2004 | McKenney et al. |
| 6,862,608 | B2 | 3/2005 | Buhlman et al. |
| 6,882,645 | B2 | 4/2005 | Jones |
| 6,954,794 | B2 | 10/2005 | Rudd et al. |
| 6,968,372 | B1 | 11/2005 | Thompson et al. |
| 6,975,629 | B2 | 12/2005 | Welin |
| 7,010,576 | B2 | 3/2006 | Bae |
| 7,020,736 | B1 | 3/2006 | Cherukuri |
| 7,031,989 | B2 | 4/2006 | Elmendorf et al. |
| 7,047,341 | B2 | 5/2006 | Jung |
| 7,047,521 | B2 | 5/2006 | Bunnell |
| 7,058,826 | B2 | 6/2006 | Fung |
| 7,082,604 | B2 | 7/2006 | Schneiderman |
| 7,206,827 | B2 | 4/2007 | Viswanath et al. |
| 7,283,476 | B2 | 10/2007 | Bare |
| 7,483,443 | B2 | 1/2009 | Newson et al. |
| 7,548,539 | B2 | 6/2009 | Kouretas et al. |
| 7,549,150 | B2 | 6/2009 | Yu |
| 2002/0087925 | A1 | 7/2002 | Hayden et al. |
| 2002/0138551 | A1 * | 9/2002 | Erickson ........................ 709/203 |
| 2002/0161848 | A1 * | 10/2002 | Willman et al. .............. 709/213 |
| 2002/0199172 | A1 | 12/2002 | Bunnell |
| 2003/0004924 | A1 | 1/2003 | Williams |
| 2003/0005260 | A1 | 1/2003 | Garg et al. |
| 2003/0005407 | A1 | 1/2003 | Hines |
| 2003/0012197 | A1 | 1/2003 | Yazaki et al. |
| 2003/0065704 | A1 | 4/2003 | Buch |
| 2003/0067912 | A1 | 4/2003 | Mead et al. |
| 2003/0105816 | A1 | 6/2003 | Goswami |
| 2003/0163653 | A1 | 8/2003 | Skendzic et al. |
| 2003/0208658 | A1 | 11/2003 | Magoshi |
| 2004/0030766 | A1 | 2/2004 | Witkowski |
| 2004/0073828 | A1 | 4/2004 | Bronstein |
| 2004/0093588 | A1 | 5/2004 | Gschwind et al. |
| 2004/0142655 | A1 | 7/2004 | Voegele |
| 2004/0158819 | A1 | 8/2004 | Cuomo et al. |
| 2004/0163077 | A1 | 8/2004 | Dimpsey et al. |
| 2005/0010683 | A1 | 1/2005 | Moleyar et al. |
| 2005/0039171 | A1 | 2/2005 | Avakian et al. |
| 2005/0086384 | A1 | 4/2005 | Ernst |
| 2005/0100049 | A1 | 5/2005 | Siminoff |
| 2005/0108481 | A1 | 5/2005 | Iyengar et al. |
| 2005/0132249 | A1 | 6/2005 | Burton et al. |
| 2005/0240737 | A1 | 10/2005 | Holt |
| 2005/0243737 | A1 | 11/2005 | Dooley et al. |
| 2005/0257219 | A1 | 11/2005 | Holt |
| 2005/0262313 | A1 | 11/2005 | Holt |
| 2005/0262513 | A1 | 11/2005 | Holt |
| 2005/0278280 | A1 | 12/2005 | Semerdzhiev et al. |
| 2006/0015665 | A1 | 1/2006 | Illowsky et al. |
| 2006/0020913 | A1 | 1/2006 | Holt |
| 2006/0041823 | A1 | 2/2006 | Wolfgang et al. |
| 2006/0080389 | A1 | 4/2006 | Powers et al. |
| 2006/0095483 | A1 | 5/2006 | Holt |
| 2006/0106993 | A1 | 5/2006 | Khare et al. |
| 2006/0143350 | A1 | 6/2006 | Miloushev et al. |
| 2006/0167878 | A1 | 7/2006 | Hartman |
| 2006/0242464 | A1 | 10/2006 | Holt |
| 2006/0253844 | A1 | 11/2006 | Holt |
| 2006/0265703 | A1 | 11/2006 | Holt |
| 2006/0265704 | A1 | 11/2006 | Holt |
| 2006/0265705 | A1 | 11/2006 | Holt |
| 2007/0147168 | A1 | 6/2007 | Pinto et al. |
| 2007/0233967 | A1 * | 10/2007 | Rangarajan et al. .......... 711/147 |
| 2007/0288587 | A1 | 12/2007 | Aguilera et al. |
| 2007/0288828 | A1 | 12/2007 | Biran et al. |
| 2008/0072238 | A1 | 3/2008 | Monnie et al. |
| 2008/0126516 | A1 | 5/2008 | Holt |
| 2008/0133711 | A1 | 6/2008 | Holt |
| 2008/0140973 | A1 | 6/2008 | Holt |
| 2008/0140975 | A1 | 6/2008 | Holt |
| 2008/0140976 | A1 | 6/2008 | Holt |
| 2008/0189700 | A1 | 8/2008 | Schmidt et al. |
| 2008/0250221 | A1 | 10/2008 | Holt |
| 2009/0019459 | A1 | 1/2009 | Rowan et al. |

FOREIGN PATENT DOCUMENTS

| | | |
|---|---|---|
| WO | WO98/58330 | 12/1998 |
| WO | WO02/44835 | 6/2002 |
| WO | WO03/083614 | 10/2003 |
| WO | WO03084116 | 10/2003 |
| WO | 2005/103928 A1 | 11/2005 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

International Search Report and Written Opinion for PCT International Patent Application No. PCT/AU2007/001483, mailed on Nov. 22, 2007.

International Search Report and Written Opinion for PCT International Patent Application No. PCT/AU2007/001493, mailed on Nov. 27, 2007.

International Search Report and Written Opinion for PCT International Patent Application No. PCT/AU2007/001492, mailed on Nov. 23, 2007.

International Search Report and Written Opinion for PCT International Patent Application No. PCT/AU2007/001491, mailed on Nov. 22, 2007.

International Search Report and Written Opinion for PCT International Patent Application No. PCT/AU2007/001494, mailed on Nov. 22, 2007.

International Search Report and Written Opinion for PCT International Patent Application No. PCT/AU2007/001490, mailed on Nov. 22, 2007.

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Experience with Distributed Programming in Orca", *IEEE CS International Conference on Computer Languages*, pp. 1-23, Mar. 1990, New Orleans, Louisiana.

Bal, et al., "Object Distribution in ORCA Using Compile-Time and Run-Time Techniques", Proc. Conference on Object-Oriented Programming Systems, Languages and Applications pp. 162-177, Sep. 26, 1993-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications On Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", 28$^{th}$ Annual International Symposium on Fault-Tolerant Computing, pp. 128-137, Jun. 1998, Munich, Germany.

Chen, et al., "Multi-Jav: a distributed shared memory system based on multiple Java virtual machines." Proc. Of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9, Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5- Retreived from the internet URL:http//www.springerlink.com/content/5v 028411810p6m700/>, vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.

Radovic, et al., "Removing the overhead from software-based shared memory." Prc. 2001 ACM/IEEE Conf. Supercomputing (CDrom), Denver CO, Nov. Oct. 16, 2001, Supercomuting '01. ACM Press. NY.

Russ, et al. "The hector distributed run-time environment", IEEEE Transactions on Parallel and Distributed Systems, vol. 9, No. 1 11998, May 22, 1998.

Sanchez, et al. "Distributed Garbage Collection for Wide Area Replicated Memory", Proceedings of the 6th Conference on Usenix Conference on Object-Orientated Technologies and Systems [On Line], vol. 6, Jun. 29, 2001, pp. 1-14, P1-14XP002502672 Retrieved from the Internet URL:http://portal.acm.org/citation.cfm?id=1268246 http://citeseerx.ist.psu.edu/viewdoc/summary?doi=10.1.1.10.5675 http://www.gsd.inesc-id.pt/ {veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Supplementary European Search Report EP 06 79 0317 Dated Mar. 5, 2009.

Factor et al., Java Split: A Runtime for Execution of Monolithic Java Programs on Heterogeneous Collections of Commodity Workstations, Dec. 1-4, 2003, Proceedings of 2003 IEEE Fifth International Conference on Cluster Computing, pp. 110-117.

Strom et al., Concurrency Control and View Notification Algorithms for Collaborative Replicated Objects, Apr. 1998, IEEE Transactions on Computers, vol. 47, Issue 4, pp. 458-471.

Terry et al, Managing Update Conflicts in Bayou, A Weakly Connected Replicated Storage System, Operating Systems Review, vol. 29, No. 5, pp. 172-183, Fifteenth AC Symposium on Operating Systems Principles Conference, Dec. 3-6, 1995.

* cited by examiner

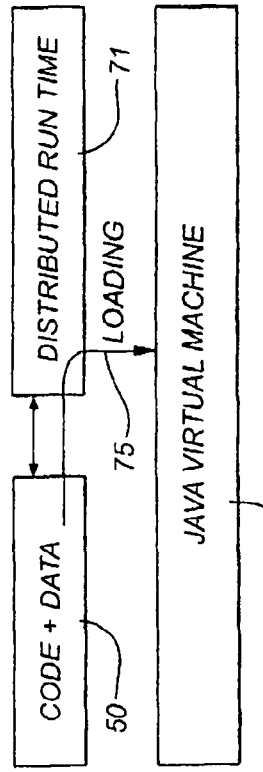
FIG. 1A
PRIOR ART
FIG. 1B
PRIOR ART
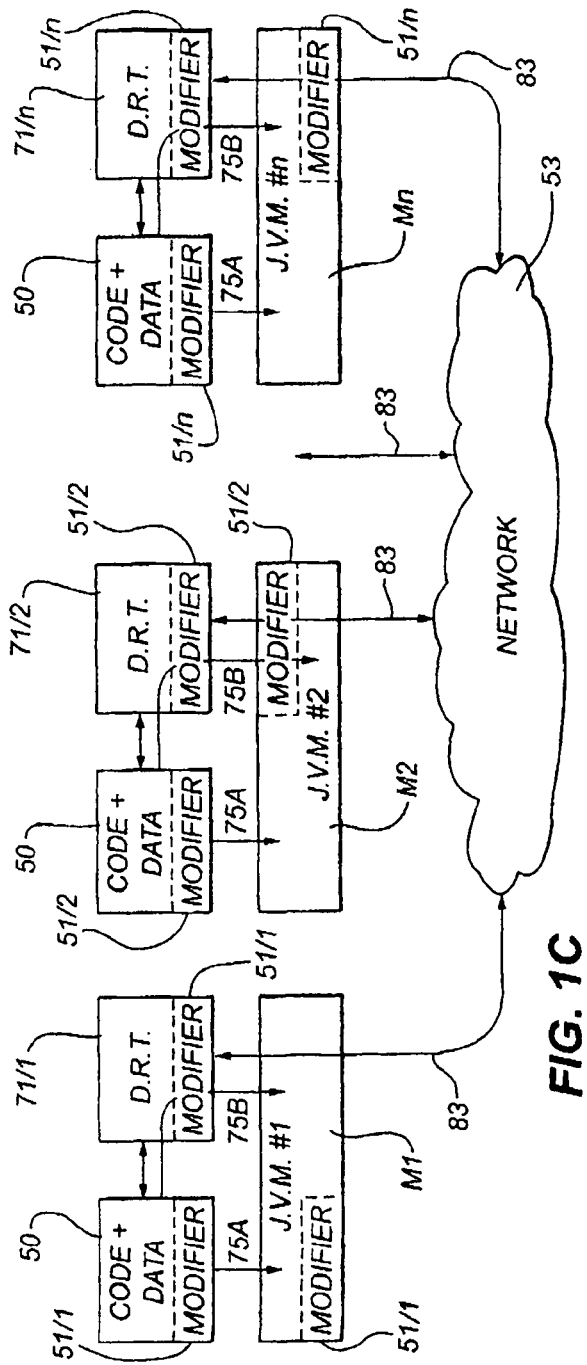
FIG. 1C

US 7,971,005 B2

ADVANCED CONTENTION DETECTION

CROSS REFERENCE TO RELATED APPLICATIONS

The present application claims benefit under 35 USC 119 (e) to U.S. Provisional Application No. 60/850,711 filed on 9 Oct. 2006. This application also claims priority under 35 U.S.C. 119(a)-(d) to Australian Provisional Application No. 2006905527 filed on 5 Oct. 2006, both of which are hereby incorporated herein by reference.

This application is related to concurrently filed U.S. Application entitled "Advanced Contention Detection," now issued as U.S. Pat. No. 7,831,779, and concurrently filed U.S. Application entitled "Advanced Contention Detection," application Ser. No. 11/973,397, both of which are hereby incorporated herein by reference.

FIELD OF THE INVENTION

The present invention relates to computing and, in particular, to the detection of contention in computing activities relating to address memory but is not restricted to such activities. The present invention finds particular application to the simultaneous operation of a plurality of computers interconnected via a communications network, and preferably operating in a replicated shared memory arrangement, but is not limited thereto.

BACKGROUND

International Patent Application No. PCT/AU2005/000580 published under WO 2005/103926 (to which U.S. patent application Ser. No. 11/111,946 and published under No. 2005-0262313 corresponds) in the name of the present applicant, discloses how different portions of an application program written to execute on only a single computer can be operated substantially simultaneously on a corresponding different one of a plurality of computers. That simultaneous operation has not been commercially used as of the priority date of the present application. International Patent Applications Nos. PCT/AU2005/001641 (WO2006/110,937) and PCT/AU2006/000532 (WO2006/110,957) both in the name of the present applicant and both unpublished as at the priority date of the present application, also disclose further details. The contents of the specification of each of the abovementioned prior application(s) are hereby incorporated into the present specification by cross reference for all purposes.

Briefly stated, the abovementioned patent specification discloses that at least one application program written to be operated on only a single computer can be simultaneously operated on a number of computers each with independent local memory. The memory locations required for the operation of that program are replicated in the independent local memory of each computer. On each occasion on which the application program writes new data to any replicated memory location, that new data is transmitted and stored at each corresponding memory location of each computer. Thus apart from the possibility of transmission delays, each computer has a local memory the contents of which are substantially identical to the local memory of each other computer and are updated to remain so. Since all application programs, in general, read data much more frequently than they cause new data to be written, the abovementioned arrangement enables very substantial advantages in computing speed to be achieved. In particular, the stratagem enables two or more commodity computers interconnected by a commodity communications network to be operated simultaneously running under the application program written to be executed on only a single computer.

In many situations, the above-mentioned arrangements work satisfactorily. This applies particularly where the programmer is aware that there may be updating delays and so can adjust the flow of the program to account for this. However, the need to update each local memory when any change is made to any memory location, can create contention where corresponding memory locations are being updated in simultaneous or near simultaneous fashion from different sources. This can establish a race condition or similar anomalous conditions. Such conditions can also arise in other computing, information processing, electronics, and electrical engineering situations.

GENESIS OF THE INVENTION

The genesis of the present invention is a desire to a least partially overcome the abovementioned difficulty.

SUMMARY OF THE INVENTION

In accordance with the first aspect of the present invention there is disclosed a method of updating the contents of at least one memory location at each of at least two physical locations interconnected by a communications link over which memory updating messages are sent, said method comprising the step of:

(i) associating with each memory updating message verification data which enables the physical location to be updated to verify said updating messages.

In accordance with a further aspect of the present invention there is disclosed a system for updating the contents of at least one memory location at each of at least two physical locations interconnected by a communications link over which memory updating messages are sent, wherein each said memory updating message has verification data associated with it, said verification data enabling the physical location to be updated to verify said updating messages.

In accordance with a further aspect of the present invention there is disclosed a multiple computer system comprising a multiplicity of computers, each interconnected via at least one communications network, and each executing a different portion of an applications program written to execute on a single computer, each having an independent local memory with at least one memory location being replicated in each said local memory, and a method of detecting contention in replica memory updating in which a memory location having a specific location identifier and replicated on at least two computers, can be updated substantially simultaneously from a plurality of sources, said method comprising the steps of:

(i) utilizing an updating format for the signal or packet carrying out the updating, said format comprising the specific identifier of the memory location to be updated, the content with which said memory location is to be updated, and a resident updating count of the updating source, said count comprising a number indicative of the sequence of occasions on which the updating source has been updated inclusive of the current updating, (ii) storing for each replicated memory location the updating count of the previously sent or received updating, (iii) comparing the resident updating count associated with the replicated memory location to be updated with the updating count of the currently received updating signal or packet, and (iv) indicating a contention situation if the compared updating counts are the same.

In accordance with a further aspect of the present invention there is disclosed a multiple computer system comprising a multiplicity of computers, each interconnected via at least one communications network, and each executing a different portion of an applications program written to execute on a single computer, each having an independent local memory with at least one memory location being replicated in each said local memory, and a system for detecting contention in replica memory updating, said system comprising at least one memory location having a specific location identifier and replicated on at least two machines, and updated to remain substantially similar upon occasion of a machine modifying its replica value; a plurality of sources each of which can update said memory location(s) and each of which utilizes an updating format for the signal or packet carrying out the updating, said format comprising the specific identifier of the memory location to be updated, the content with which said memory location is to be updated, and a resident updating count of the updating source, said count comprising a number indicative of the sequence of occasions on which the updating source has been updated inclusive of the current updating; a storage means associated with each said memory location and in which the updating count of the previously received updating is stored; comparison means to compare the previously stored updating count with the updating count of the currently received updating signal or packet; and contention indicating means connected with said comparison means and operable to indicate a contention situation if the compared updating counts are the same.

In accordance with a further aspect of the present invention there is disclosed a multiple computer system comprising a multiplicity of computers, each interconnected via at least one communications network, and each executing a different portion of an applications program written to execute on a single computer, each having an independent local memory with at least one memory location being replicated in each said local memory, and a method of replica memory updating in which a memory location having a specific location identifier and replicated on at least two computers, can be updated substantially simultaneously from a plurality of sources, said method comprising the steps of:

(i) utilizing an updating format for the signal or packet carrying out the updating, said format comprising the specific identifier of the memory location to be updated, the content with which said memory location is to be updated, and a resident updating count of the updating source, said count comprising a number indicative of the sequence of occasions on which the updating source has been updated inclusive of the current updating, (ii) storing for each replicated memory location the updating count of the previously sent or received updating, (iii) comparing the presently resident updating count associated with the replicated memory location to be updated with the updating count of the currently received updating signal or packet, and (iv) if the currently received updating count is greater than the presently resident updating count, overwriting the associated replicated memory location with the currently received data content, and overwriting the presently resident updating count with the currently received updating count, or (v) if the currently received updating count is less than the presently resident updating count, not overwriting the associated replicated memory location with the currently received data content, and not overwriting the presently resident updating count with the currently received updating count, or (vi) if the currently received updating count is equal to the presently resident updating count, indicating a contention situation.

In accordance with a further aspect of the present invention there is disclosed a multiple computer system comprising a multiplicity of computers, each interconnected via at least one communications network, and each executing a different portion of an applications program written to execute on a single computer, each having an independent local memory with at least one memory location being replicated in each said local memory, and a system for replica memory updating, said system comprising at least one memory location having a specific location identifier and replicated on at least two machines, and updated to remain substantially similar upon occasion of a machine modifying its replica value; a plurality of sources each of which can update said memory location(s) and each of which utilizes an updating format for the signal or packet carrying out the updating, said format comprising the specific identifier of the memory location to be updated, the content with which said memory location is to be updated, and a resident updating count of the updating source, said count comprising a number indicative of the sequence of occasions on which the updating source has been updated inclusive of the current updating; a storage means associated with each said memory location and in which the updating count of the previously received updating is stored; comparison means to compare the currently received updating count value with the presently resident updating count value and overwriting the associated replicated memory location with the currently received data content and overwriting the presently resident updating count with the currently received updating count, if the currently received updating count exceeds the presently resident updating count, or not overwriting the associated replicated memory location with the currently received data content and not overwriting the presently resident updating count with the currently received updating count, if the currently received updating count is less than the presently resident updating count; and contention indicating means connected with said comparison means and operable to indicate a contention situation if the compared updating counts are the same. Preferably the count comparison means is a comparator.

In accordance with a further aspect of the present invention there is disclosed a single computer for use in cooperation with at least one other computer in a multiple computer system, wherein said multiple computer system comprising a multiplicity of computers, each interconnected via at least one communications network, and each executing a different portion of an applications program written to execute on a single computer, each having an independent local memory with at least one memory location being replicated in each said local memory, and a method of replica memory updating in which a memory location having a specific location identifier and replicated on at least two computers, can be updated substantially simultaneously from a plurality of sources, said method comprising the steps of:

(i) utilizing an updating format for the signal or packet carrying out the updating, said format comprising the specific identifier of the memory location to be updated, the content with which said memory location is to be updated, and a resident updating count of the updating source, said count comprising a number indicative of the sequence of occasions on which the updating source has been updated inclusive of the current updating, (ii) storing for each replicated memory location the updating count of the previously sent or received updating, (iii) comparing the presently resident updating count associated with the replicated memory location to be updated with the updating count of the currently received updating signal or packet, and (iv) if the currently received updating count is greater than the presently resident updating count, overwriting the associated replicated memory location with the currently received data content, and overwriting the presently resident updating count with the currently received updating count, or (v) if the currently received updating count is less than the presently resident updating count, not overwriting the associated replicated memory location with the currently received data content, and not overwriting the presently resident updating count with the currently received updating count, or (vi) if the currently received updating count is equal to the presently resident updating count, indicating a contention situation.

In accordance with further aspects of the present invention stored data, a single computer and a computer program product are all disclosed.

In accordance with a further aspect of the present invention there is disclosed a method of resolving contention in addressed memory updating in which a memory location having a specific location identifier can be updated substantially simultaneously from a plurality of sources, said method comprising the steps of:

(i) utilizing an updating format for the signal or packet carrying out the updating, said format comprising the specific identifier of the memory location to be updated, the content with which said memory location is to be updated, and a resident updating count of the updating source, said count comprising a number indicative of the position of the updating message in the sequence of occasions on which the updating source has been updated inclusive of the current updating, (ii) storing for each receiving memory location the updating count of the previously received updating, (iii) comparing the updating count presently resident at the receiving memory location with the updating count of any currently received updating signal or packet, and (iv) if the currently received updating count is greater than the presently resident updating count, not actioning the incoming signal or packet, or (v) if the currently received updating count is less than the currently resident updating count, actioning the incoming signal or packet, or (vi) if the currently received updating count is equal to the presently resident updating count, instituting a contention resolution.

In accordance with a further aspect of the present invention there is disclosed a system for detecting contention in addressed memory updating, said system comprising at least one memory location having a specific location identifier; a plurality of sources each of which can update said memory location(s) and each of which utilizes an updating format for the signal or packet carrying out the updating, said format comprising the specific identifier of the memory location to be updated, the content with which said memory location is to be updated, and a resident updating count of the updating source, said count comprising a number indicative of the position of the updating message in the sequence of occasions on which the updating source has been updated inclusive of the current updating; a storage means associated with each said memory location and in which the updating count of the previously received updating is stored; comparison means to compare the previously stored updating count with the updating count of any currently received updating signal or packet; contention indicating means connected with said comparison means and operable to indicate a contention situation if the compared updating counts are the same, to not act upon the currently received updating signal or packet if said comparison indicates that the currently received updating count is greater than the presently resident updating count, or to act upon the currently received updating signal or packet if said comparison indicates that the currently received updating count is less than the presently resident updating count, and contention resolution means connected with said contention indicating means to institute a contention resolution procedure In accordance with a further aspect of the present invention there is disclosed a method of resolving contention in replica memory updating for a multiple computer system comprising a multiplicity of computers, each interconnected via at least one communications network, and each executing a different portion of an applications program written to execute on a single computer, each having an independent local memory with at least one memory location being replicated in each said local memory, and in which a memory location having a specific location identifier can be updated substantially simultaneously from a plurality of sources, said method comprising the steps of:

(i) utilizing an updating format for the signal or packet carrying out the updating, said format comprising the specific identifier of the replicated memory location to be updated, the content with which said replicated memory location is to be updated, a resident updating count of the updating source associated with the replicated memory location, said count comprising a number indicative of the sequence of occasions on which the updating source has been updated inclusive of the current updating, and a resident, and a resolution value of the updating source associated with the replicated memory location, said resolution value comprising a unique value to or of the updating source, (ii) storing for each receiving memory location the updating count and resolution value of the previously received updating, (iii) comparing the updating count presently resident at the receiving memory location with the updating count of any currently received updating signal or packet, and (iv) if the currently received updating count associated with the replicated memory location to be updated is equal to the presently resident updating count, not actioning the incoming signal or packet, or (v) if the currently received updating count is less than the currently resident updating count, actioning the incoming signal or packet, or (vi) if the currently received updating count is equal to the presently resident updating count, comparing the presently resident resolution value associated with the replicated memory location to be updated with the updating resolution value of the currently received updating signal or packet, and (vii) if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or (viii) if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

In accordance with a further aspect of the present invention there is disclosed a system for resolving contention in replica memory updating for a multiple computer system comprising a multiplicity of computers, each interconnected via at least one communications network, and each executing a different portion of an applications program written to execute on a single computer, each having an independent local memory with at least one memory location being replicated in each said local memory, said system comprising at least one memory location having a specific location identifier; a plurality of sources each of which can update said replicated memory location(s) and each of which utilizes an updating format for the signal or packet carrying out the updating, said format comprising the specific identifier of the replicated memory location to be updated, the content with which said replicated memory location is to be updated, and a resident updating count of the updating source associated with the replicated memory location, said count comprising a number indicative of the sequence of occasions on which the updating source has been updated inclusive of the current updating, and a resolution value of the updating source associated with the replicated memory location, said resolution value said resolution value comprising a unique value to or of the updating source; a storage means associated with each said replicated memory location and in which the updating count and resolution value of the previously received updating is stored; comparison means to compare the previously stored updating count associated with the replicated memory location to be updated with the updating count of the currently received updating signal or packet; contention indicating means connected with said comparison means and operable to indicate a contention situation if the compared updating counts are the same, contention resolution means connected with said contention indicating means to institute a contention resolution procedure, wherein said resolution procedure comprises comparing the presently resident resolution value associated with the replicated memory location to be updated with the updating resolution value of the currently received updating signal or packet, and if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

In accordance with a further aspect of the present invention there is disclosed a multiple computer system comprising a multiplicity of computers, each interconnected via at least one communications network, and each executing a different portion of an applications program written to execute on a single computer, each having an independent local memory with at least one memory location being replicated in each said local memory, and a method of resolving contention in replica memory updating in which a memory location having a specific location identifier and replicated on at least two computers, can be updated substantially simultaneously from a plurality of sources, said method comprising the steps of:

(i) utilizing an updating format for the signal or packet carrying out the updating, said format comprising the specific identifier of the memory location to be updated, the content with which said memory location is to be updated, a resident updating count of the updating source, said count comprising a number indicative of the sequence of occasions on which the updating source has been updated inclusive of the current updating, and a resolution value of the updating source, said resolution value comprising a unique value to or of the updating source, (ii) storing for each replicated memory location the updating count and resolution value of the previously sent or received updating, (iii) comparing the presently resident updating count associated with the replicated memory location to be updated with the updating count of the currently received updating signal or packet, and (iv) if the currently received updating count is equal to the presently resident updating count, comparing the presently resident resolution value associated with the replicated memory location to be updated with the updating resolution value of the currently received updating signal or packet, and (v) if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or (vi) if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

In accordance with a further aspect of the present invention there is disclosed a multiple computer system comprising a multiplicity of computers, each interconnected via at least one communications network, and each executing a different portion of an applications program written to execute on a single computer, each having an independent local memory with at least one memory location being replicated in each said local memory, and a system for resolving contention in replica memory updating, said system comprising at least one memory location having a specific location identifier and replicated on at least two machines, and updated to remain substantially similar upon occasion of a machine modifying its replica value; a plurality of sources each of which can update said memory location(s) and each of which utilizes an updating format for the signal or packet carrying out the updating, said format comprising the specific identifier of the memory location to be updated, the content with which said memory location is to be updated, and a resident updating count of the updating source, said count comprising a number indicative of the sequence of occasions on which the updating source has been updated inclusive of the current updating, and a resolution value of the updating source, said resolution value comprising a unique value to or of the updating source; a storage means associated with each said replicated memory location and in which the updating count and resolution value of the previously sent or received updating is stored; comparison means to compare the currently received updating count value associated with the replicated memory location to be updated with the presently resident updating count value and if the compared updating counts are the same, comparing the presently resident resolution value associated with the replicated memory location to be updated with the updating resolution value of the currently received updating signal or packet, and if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

In accordance with a further aspect of the present invention there is disclosed a single computer for use in cooperation with at least one other computer in a multiple computer system, wherein said multiple computer system comprising a multiplicity of computers, each interconnected via at least one communications network, and each executing a different portion of an applications program written to execute on a single computer, each having an independent local memory with at least one memory location being replicated in each said local memory, and a method of resolving contention in replica memory updating in which a memory location having a specific location identifier and replicated on at least two computers, can be updated substantially simultaneously from a plurality of sources, said method comprising the steps of:

(i) utilizing an updating format for the signal or packet carrying out the updating, said format comprising the specific identifier of the memory location to be updated, the content with which said memory location is to be updated, a resident updating count of the updating source, said count comprising a number indicative of the sequence of occasions on which the updating source has been updated inclusive of the current updating, and a resolution value of the updating source, said resolution value comprising a unique value to or of the updating source, (ii) storing for each replicated memory location the updating count and resolution value of the previously sent or received updating, (iii) comparing the presently resident updating count associated with the replicated memory location to be updated with the updating count of the currently received updating signal or packet, and (v) if the currently received updating count is equal to the presently resident updating count, comparing the presently resident resolution value associated with the replicated memory location to be updated with the updating resolution value of the currently received updating signal or packet, and (v) if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or (vi) if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

In accordance with a further aspect of the present invention there is disclosed a method of broadcasting a memory updating signal or packet over a communications network interconnecting a plurality of computers each of said computers having addressed memory locations each of which has a specific location identifier and can be updated substantially simultaneously from a plurality of sources, said method comprising the steps of:

(i) utilizing an updating format for the signal or packet carrying out the updating, said format comprising the specific identifier of each memory location to be updated, the content with which said each memory location is to be updated, and at least one resident updating count of the updating source, each said count comprising a number indicative of the position of the updating message in the sequence of occasions on which the updating source has been updated inclusive of the current updating, and (ii) following receipt of said broadcast updating signal or packet by each of said application executing computers, storing in the local memory of each said computer at each specific memory location both the corresponding updated content and said updating count.

In accordance with a further aspect of the present invention there is disclosed a system for broadcasting an addressed memory updating signal or packet over a communications network interconnecting a plurality of computers, said system comprising at least one memory location having a specific location identifier in each said computer; a plurality of sources each of which can update said memory location(s) and each of which utilizes an updating format for the signal or packet carrying out the updating, said format comprising the specific identifier of each memory location to be updated, the content with which said each memory location is to be updated, and at least one resident updating count of the updating source, each said count comprising a number indicative of the position of the updating message in the sequence of occasions on which the updating source has been updated inclusive of the current updating; and a storage means associated with each said memory location and in which the updating count of the previously received updating is stored.

In accordance with a further aspect of the present invention there is disclosed a method of broadcasting a memory updating signal or packet over a communications network interconnecting a plurality of computers each executing a different portion of an applications program written to execute on a single computer, and each having an independent local memory with at least one addressed memory location being replicated in each said local memory, each of which has a specific location identifier and can be updated substantially simultaneously from a plurality of sources, said method comprising the steps of:

(i) utilizing an updating format for the signal or packet carrying out the updating, said format comprising the specific identifier of each memory location to be updated, the content with which said each memory location is to be updated, and at least one updating count of the updating source, each said count comprising a number indicative of the sequence of occasions on which the updating source has been updated inclusive of the current updating, and at least one resolution value of the updating source, each said resolution value comprising a unique value of the updating source.

In accordance with a further aspect of the present invention there is disclosed a system for broadcasting an addressed memory updating signal or packet over a communications network interconnecting a plurality of computers, each said computer executing a different portion of an applications program written to execute on a single computer, and each having an independent local memory with at least one, said system comprising at least one replicated memory location being replicated in each said local memory having a specific location identifier in each said computer; a plurality of sources each of which can update said replicated memory location(s) and each of which utilizes an updating format for the signal or packet carrying out the updating, said format comprising the specific identifier of each replicated memory location to be updated, the content with which said each replicated memory location is to be updated, and at least one updating count of the updating source, each said count comprising a number indicative of the sequence of occasions on which the updating source has been updated inclusive of the current updating; and at least one resolution value of the updating source, each said resolution value comprising a unique value of the updating source.

In accordance with a further aspect of the present invention there is disclosed a method of broadcasting a memory updating signal or packet over a communications network interconnecting a plurality of computers each executing a different portion of an applications program written to execute on a single computer, and each having an independent local memory with at least one addressed memory location being replicated in each said local memory, each of which has a specific location identifier and can be updated substantially simultaneously from a plurality of sources, said method comprising the steps of:
(i) utilizing an updating format for the signal or packet carrying out the updating, said format comprising the specific identifier of at least two replicated memory locations to be updated, the content with which said each replicated memory location is to be updated, and one updating count of the updating source for all said replicated memory locations, said count comprising a number indicative of the highest magnitude sequence of occasions on which all said replicated memory locations have been updated inclusive of the current updating, and at least one resolution value of the updating source, said resolution value comprising a unique value of the updating source.

In accordance with a further aspect of the present invention there is disclosed a method of data consolidation in a system for detection and/or resolution of contention in addressed memory updating in which a memory location having a specific address or identifier can be updated substantially simultaneously from a plurality of sources, said method comprising the steps of:
(i) utilizing an updating signal/packet format comprising the specific address of the memory location to be updated, the content with which said memory location is to be updated, and an updating count indicative of the cumulative number of occasions on which said memory location will have been updated inclusive of the current updating.
(ii) storing for each said memory location the updating count of the previously received updating.
(iii) from time to time on the occurrence of a predetermined condition, consolidating the stored updating count.

In accordance with a further aspect of the present invention there is disclosed a system for data consolidation to permit detection and/or resolution of contention where addressed memory in which memory locations each having a specific address or identifier can be updated substantially simultaneously from a plurality of sources, said system comprising a data storage comprising the specific address of each memory location to be updated, for each said address the content thereof which is overwritten by any received updated content, and an updating count indicative of the cumulative number of occasions on which each said memory location has been updated inclusive of any current updating, and consolidation means connected to said data storage to from time to time on the occurrence of a predetermined condition consolidate the stored updating count.

In accordance with a further aspect of the present invention there is disclosed a method of data consolidation in a multiple computer system for detection and/or resolution of contention in addressed memory updating in which a replicated application memory location/content having a specific address or identifier can be updated substantially simultaneously from a plurality of sources, each of said computers comprising an independent local memory and each executing a portion of an application program written to operation on only a single computer, said method comprising the steps of:
(i) utilizing an updating signal/packet format comprising the specific address of the replicated application memory location/content to be updated, the content with which said memory location is to be updated, and an updating count ("count value") indicative of the cumulative number of occasions on which said memory location will have been updated inclusive of the current updating.
(ii) storing for each said memory location the updating count of the previously received updating.
(iii) from time to time on the occurrence of a predetermined condition, consolidating or deleting the stored updating count.

In accordance with a further aspect of the present invention there is disclosed a multiple computer system, each of said computers comprising an independent local memory and each executing a portion of a same application program written to operate on only a single computer, and a system for data consolidation to permit detection and/or resolution of contention where addressed memory in which replicated application memory locations/contents each having a specific address or identifier can be updated substantially simultaneously from a plurality of sources, said system comprising a data storage comprising the specific address of each replicated application memory location/content to be updated, for each said address the content thereof which is overwritten by any received updated content, and an updating count ("count value") indicative of the cumulative number of occasions on which each said memory location has been updated inclusive of any current updating, and consolidation or deletion means connected to said data storage to from time to time on the occurrence of a predetermined condition consolidate the stored updating count.

In accordance with the further aspect of the present invention there is disclosed a method of ensuring correct operation of a data updating system using a count value to signify the position of an updating message in a sequence of updating messages, said method comprising the steps of:
(i) halting the flow of updating messages, and
(ii) during said halt re-setting the count values.

In accordance with the further aspect of the present invention there is disclosed a multiple memory system in which at least one memory location at each of at least two physical locations are connected by a communications link over which memory updating messages are set, wherein a count value is associated with each the sent message to signify its position in a sequence of sent messages, and wherein the sending of the messages is temporarily halted to re-set the count values.

In accordance with the further aspect of the present invention there is disclosed a method ensuring correct operation of a finite counter storing an updating count value in a multiple computer system, each the computer comprising an independent local memory and each operating an application program written to operate on only a single computer, and at least on application program memory location/content replicated in each of the independent memories and updated to remain substantially similar, the method comprising the steps of:
(i) resetting or reinitializing the updating count value of each the computer upon the updating count value reaching a threshold value.

In accordance with the further aspect of the present invention there is disclosed a method ensuring correct operation of a finite counter storing an updating count value in a multiple computer system, each the computer comprising an independent local memory and each operating an application program written to operate on only a single computer, and at least on application program memory location/content replicated in each of the independent memories and updated to remain substantially similar, the method comprising the steps of:
(i) halting replica updating transmissions of replicated application memory locations/contents when associated the updating count value reaches a threshold value or a predetermined time interval has elapsed,
(ii) resetting or reinitializing the updating count value on each of the computers,
(iii) resuming the previously halted replica updating transmissions.

In accordance with a further aspect of the present invention there is disclosed a method of overcoming memory updating echoes in a memory system where at least one memory location is replicated at different memory stores and is able to be substantially simultaneously updated from a number of sources, each source transmitting an updating message including the address of the location, the new content for the location, and an updating count indicative of the position of the updating message in a sequence of updating messages, said updating count being incremented by a predetermined number to indicate consecutive updating messages, said method comprising the steps of:
(i) determining which source was the last to transmit in respect of a specific memory location, and
(ii) where the same source is to transmit sequentially in respect of the same memory location, incrementing said updating count for the second transmission by more than said predetermined number.

In accordance with a further aspect of the present invention there is disclosed a replicated memory system with memory updating echo rejection, said system comprising at least one memory location replicated at different memory stores and able to be substantially simultaneously updated from a number of sources each source transmitting an updating message including the address of the location, the new content for the location, and an updating count indicative of the position of the updating message in a sequence of updating messages, said updating count being increased by a predetermined number to indicate consecutive updating messages, wherein said system determines which source was the last to transmit, and where the same source is to transmit sequentially in respect of the same memory location increments said updating count for the second transmission by more than said predetermined number.

In accordance with a further aspect of the present invention there is disclosed a multiple computer system, each said computer comprising an independent local memory and each said computer operating a portion of an application program write to operate on a single computer, and a method of overcoming memory updating echoes in a memory system where at least one application memory location is replicated in each of said independent local memories and updated to remain substantially similar, each source transmitting an updating message including the address or identity of the replicated application memory location/content, the associated new content for the replicated application memory location, and an updating count indicative of the position of the updating message in a sequence of updating messages, said updating count being incremented by a predetermined number to indicate consecutive updating messages, said method comprising the steps of:
(i) determining which source was the last to transmit in respect of a specific memory location, and
(ii) where the same source is to transmit sequentially in respect of the same memory location, incrementing said updating count for the second transmission by more than said predetermined number.

In accordance with a further aspect of the present invention there is disclosed a replicated memory system with memory updating echo rejection, said system comprising at least one application memory location/content replicated at different independent memory stores and is able to be substantially simultaneously updated from a number of sources each source transmitting an updating message including the address or identity of the replicated application memory location/content, the associated new content for the replicated application memory location, and an updating count indicative of the position of the updating message in a sequence of updating messages, said updating count being increased by a predetermined number to indicate consecutive updating messages, wherein said system determines which source was the last to transmit, and where the same source is to transmit sequentially in respect of the same memory location increments said updating count for the second transmission to more than said predetermined number.

In accordance with a further aspect of the present invention there is disclosed a multiple computer system, each said computer comprising an independent local memory and each said computer operating a portion of an application program write to operate on a single computer, and a method of overcoming memory updating echoes in a memory system where at least one application memory location is replicated in each of said independent local memories and updated to remain substantially similar, each source transmitting an updating message including the address or identity of the replicated application memory location/content, the associated new content for the replicated application memory location, and an updating count indicative of the position of the updating message in a sequence of updating messages, said updating count being incremented by a predetermined number to indicate consecutive updating messages, said method comprising the steps of:
(i) disabling on a receiving machine any alerted or scheduled but not yet transmitted replica memory updates upon receipt of a replica memory update transmission for the same replicated application memory location/content.

In accordance with a further aspect of the present invention there is disclosed a replicated memory system with memory updating echo rejection, said system comprising at least one application memory location/content replicated at different independent memory stores and is able to be substantially simultaneously updated from a number of sources each source transmitting an updating message including the address or identity of the replicated application memory location/content, the associated new content for the replicated application memory location, and an updating count indicative of the position of the updating message in a sequence of updating messages, said updating count being increased by a predetermined number to indicate consecutive updating messages, wherein said system determines upon receipt of a replica memory update transmission by a receiving machine whether there exists on said receiving machine any alerted or scheduled but not yet transmitted replica memory updates for the same replicated application memory location/content, and if so disabling or cancelling said alerted or scheduled replica memory updates of the receiving machine.

BRIEF DESCRIPTION OF THE DRAWINGS

Preferred embodiments of the present invention will now be described with reference to the drawings in which:

FIG. 1A is a schematic illustration of a prior art computer arranged to operate JAVA code and thereby constitute a single JAVA virtual machine, FIG. 1B is a drawing similar to FIG. 1A but illustrating the initial loading of code, FIG. 1C illustrates the interconnection of a multiplicity of computers each being a JAVA virtual machine to form a multiple computer system, FIG. 2 schematically illustrates "n" application running computers to which at least one additional server machine X is connected as a server, FIG. 23 illustrates an alternative arrangement of replicated memory instances.

DETAILED DESCRIPTION

Figure 2:
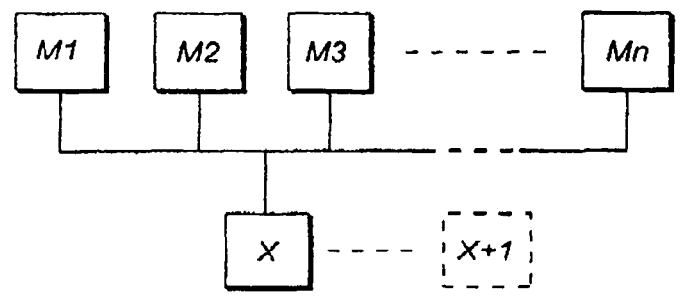

The embodiments will be described with reference to the JAVA language, however, it will be apparent to those skilled in the art that the invention is not limited to this language and, in particular can be used with other languages (including procedural, declarative and object oriented languages) including the MICROSOFT.NET platform and architecture (Visual Basic, Visual C, and Visual C++, and Visual C#), FORTRAN, C, C++, COBOL, BASIC and the like.

It is known in the prior art to provide a single computer or machine (produced by any one of various manufacturers and having an operating system operating in any one of various different languages) utilizing the particular language of the application by creating a virtual machine as illustrated in FIG. 1A.

The code and data and virtual machine configuration or arrangement of FIG. 1A takes the form of the application code 50 written in the JAVA language and executing within the JAVA virtual machine 61. Thus where the intended language of the application is the language JAVA, a JAVA virtual machine is used which is able to operate code in JAVA irrespective of the machine manufacturer and internal details of the computer or machine.

For further details, see "The JAVA Virtual Machine Specification" $2^{nd}$ Edition by T. Lindholm and F. Yellin of Sun Microsystems Inc of the USA which is incorporated herein by reference.

This conventional art arrangement of FIG. 1A is modified by the present applicant by the provision of an additional facility which is conveniently termed a "distributed run time" or a "distributed run time system" DRT 71 and as seen in FIG. 1B.

In FIGS. 1B and 1C, the application code 50 is loaded onto the Java Virtual Machine(s) M1, M2, . . . Mn in cooperation with the distributed runtime system 71, through the loading procedure indicated by arrow 75 or 75A or 75B. As used herein the terms "distributed runtime" and the "distributed run time system" are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. The runtime system typically deals with the details of the interface between the program and the operating system such as system calls, program start-up and termination, and memory management. For purposes of background, a conventional Distributed Computing Environment (DCE) (that does not provide the capabilities of the inventive distributed run time or distributed run time system 71 used in the preferred embodiments of the present invention) is available from the Open Software Foundation. This Distributed Computing Environment (DCE) performs a form of computer-to-computer communication for software running on the machines, but among its many limitations, it is not able to implement the desired modification or communication operations. Among its functions and operations the preferred DRT 71 coordinates the particular communications between the plurality of machines M1, M2, . . . Mn. Moreover, the preferred distributed runtime 71 comes into operation during the loading procedure indicated by arrow 75A or 75B of the JAVA application 50 on each JAVA virtual machine 72 or machines JVM#1, JVM#2, . . . JVM#n of FIG. 1C. It will be appreciated in light of the description provided herein that although many examples and descriptions are provided relative to the JAVA language and JAVA virtual machines so that the reader may get the benefit of specific examples, there is no restriction to either the JAVA language or JAVA virtual machines, or to any other language, virtual machine, machine or operating environment.

FIG. 1C shows in modified form the arrangement of the JAVA virtual machines, each as illustrated in FIG. 1B. It will be apparent that again the same application code 50 is loaded onto each machine M1, M2 . . . Mn. However, the communications between each machine M1, M2 . . . . Mn are as indicated by arrows 83, and although physically routed through the machine hardware, are advantageously controlled by the individual DRT's 71/1 . . . 71/n within each machine. Thus, in practice this may be conceptionalised as the DRT's 71/1, . . . 71/n communicating with each other via the network or other communications link 53 rather than the machines M1, M2 . . . Mn communicating directly themselves or with each other. Contemplated and included are either this direct communication between machines M1, M2 . . . Mn or DRT's 71/1, 71/2 . . . 71/n or a combination of such communications. The preferred DRT 71 provides communication that is transport, protocol, and link independent.

The one common application program or application code 50 and its executable version (with likely modification) is simultaneously or concurrently executing across the plurality of computers or machines M1, M2 . . . Mn. The application program 50 is written with the intention that it only operate on a single machine or computer. Essentially the modified structure is to replicate an identical memory structure and contents on each of the individual machines.

The term common application program is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1, M2 . . . Mn. Put somewhat differently, there is a common application program represented in application code 50. This is either a single copy or a plurality of identical copies each individually modified to generate a modified copy or version of the application program or program code. Each copy or instance is then prepared for execution on the corresponding machine. At the point after they are modified they are common in the sense that they perform similar operations and operate consistently and coherently with each other. It will be appreciated that a plurality of computers, machines, information appliances, or the like implementing the above described arrangements may optionally be connected to or coupled with other computers, machines, information appliances, or the like that do not implement the above described arrangements.

The same application program 50 (such as for example a parallel merge sort, or a computational fluid dynamics application or a data mining application) is run on each machine, but the executable code of that application program is modified on each machine as necessary such that each executing instance (copy or replica) on each machine coordinates its local operations on that particular machine with the operations of the respective instances (or copies or replicas) on the other machines such that they function together in a consistent, coherent and coordinated manner and give the appearance of being one global instance of the application (i.e. a "meta-application").

The copies or replicas of the same or substantially the same application codes, are each loaded onto a corresponding one of the interoperating and connected machines or computers. As the characteristics of each machine or computer may differ, the application code 50 may be modified before loading, or during the loading process, or with some disadvantages after the loading process, to provide a customization or modification of the code on each machine. Some dissimilarity between the programs may be permitted so long as the other requirements for interoperability, consistency, and coherency as described herein can be maintained. As it will become apparent hereafter, each of the machines M1, M2 . . . Mn and thus all of the machines M1, M2 . . . Mn have the same or substantially the same application code 50, usually with a modification that may be machine specific.

Before the loading of, or during the loading of, or at any time preceding the execution of, the application code 50 (or the relevant portion thereof) on each machine M1, M2 . . . Mn, each application code 50 is modified by a corresponding modifier 51 according to the same rules (or substantially the same rules since minor optimizing changes are permitted within each modifier 51/1, 51/2 . . . 51/n).

Each of the machines M1, M2 . . . Mn operates with the same (or substantially the same or similar) modifier 51 (in some embodiments implemented as a distributed run time or DRT71 and in other embodiments implemented as an adjunct to the code and data 50, and also able to be implemented within the JAVA virtual machine itself). Thus all of the machines M1, M2 . . . Mn have the same (or substantially the same or similar) modifier 51 for each modification required. A different modification, for example, may be required for memory management and replication, for initialization, for finalization, and/or for synchronization (though not all of these modification types may be required for all embodiments).

There are alternative implementations of the modifier 51 and the distributed run time 71. For example as indicated by broken lines in FIG. 1C, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71 such as within the code and data 50, or within the JAVA virtual machine itself. In one embodiment, both the modifier 51 and DRT 71 are implemented or written in a single piece of computer program code that provides the functions of the DRT and modifier. In this case the modifier function and structure is, in practice, subsumed into the DRT. Independent of how it is implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT can, for example, implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures, is not crucial.

However, in the arrangement illustrated in FIG. 1C, a plurality of individual computers or machines M1, M2 . . . Mn are provided, each of which are interconnected via a communications network 53 or other communications link. Each individual computer or machine is provided with a corresponding modifier 51. Each individual computer is also provided with a communications port which connects to the communications network. The communications network 53 or path can be any electronic signalling, data, or digital communications network or path and is preferably a slow speed, and thus low cost, communications path, such as a network connection over the Internet or any common networking configurations including communications ports known or available as of the date of this application such as ETHERNET or INFINI-BAND and extensions and improvements, thereto. Preferably the computers are provided with known communication ports (such as CISCO Power Connect 5224 Switches) which connect with the communications network 53.

As a consequence of the above described arrangement, if each of the machines M1, M2, . . . , Mn has, say, an internal or local memory capability of 10 MB, then the total memory available to the application code 50 in its entirety is not, as one might expect, the number of machines (n) times 10 MB. Nor is it the additive combination of the internal memory capability of all n machines. Instead it is either 10 MB, or some number greater than 10 MB but less than n×10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has a private (i.e. 'non-common') internal memory capability. The private internal memory capability of the machines M1, M2, . . . , Mn are normally approximately equal but need not be.

Non-commercial operation of a prototype multiple computer system indicates that not every machine or computer in the system utilises or needs to refer to (e.g. have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation.

In some embodiments, some or all of the plurality of individual computers or machines can be contained within a single housing or chassis (such as so-called "blade servers" manufactured by Hewlett-Packard Development Company, Intel Corporation, IBM Corporation and others) or the multiple or dual core processor or machines manufactured by Intel, AMD, or others, or implemented on a single printed circuit board or even within a single chip or chip set.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform and/or virtual machine and/or machine and/or runtime system environment, and utilize the platform, and/or virtual machine and/or machine and/or runtime system and/or language architecture irrespective of the machine manufacturer and the internal details of the machine. It will also be appreciated that the platform and/or runtime system can include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the structure, method and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the Power PC computer architecture manufactured by International Business Machines Corporation and others, and the personal computer products made by Apple Computer, Inc., and others.

For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records), derived types, or other code or data structures of procedural languages or other languages and environments such as functions, pointers, components, modules, structures, reference and unions. These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn. This analysis or scrutiny of the application code 50 can take place either prior to loading the application program code 50, or during the application program code 50 loading procedure, or even after the application program code 50 loading procedure. It may be likened to an instrumentation, program transformation, translation, or compilation procedure in that the application code can be instrumented with additional instructions, and/or otherwise modified by meaning-preserving program manipulations, and/or optionally translated from an input code language to a different code language (such as for example from source-code language or intermediate-code language to object-code language or machine-code language). In this connection it is understood that the term "compilation" normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object code), and compilation from source-code to source-code, as well as compilation from object-code to object code, and any altered combinations therein. It is also inclusive of so-called "intermediary-code languages" which are a form of "pseudo object-code".

By way of illustration and not limitation, in one arrangement, the analysis or scrutiny of the application code 50 takes place during the loading of the application program code such as by the operating system reading the application code 50 from the hard disk or other storage device or source and copying it into memory and preparing to begin execution of the application program code. In another embodiment, in a JAVA virtual machine, the analysis or scrutiny may take place during the class loading procedure of the java.lang.ClassLoader.loadClass method (e.g. "java.lang.ClassLoader.loadClass( )").

Alternatively, the analysis or scrutiny of the application code 50 may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

Persons skilled in the computing arts will be aware of various possible techniques that may be used in the modification of computer code, including but not limited to instrumentation, program transformation, translation, or compilation means.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code. All such modification routes are envisaged and also a combination of two, three or even more, of such routes.

The DRT or other code modifying means is responsible for creating or replication a memory structure and contents on each of the individual machines M1, M2 . . . Mn that permits the plurality of machines to interoperate. In some arrangements this replicated memory structure will be identical. Whilst in other arrangements this memory structure will have portions that are identical and other portions that are not. In still other arrangements the memory structures are different only in format or storage conventions such as Big Endian or Little Endian formats or conventions.

These structures and procedures when applied in combination when required, maintain a computing environment where the memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Therefore the terminology "one", "single", and "common" application code or program includes the situation where all machines M1, M2 . . . Mn are operating or executing the same program or code and not different (and unrelated) programs, in other words copies or replicas of same or substantially the same application code are loaded onto each of the interoperating and connected machines or computers.

In conventional arrangements utilising distributed software, memory access from one machine's software to memory physically located on another machine takes place via the network interconnecting the machines. However, because the read and/or write memory access to memory physically located on another computer require the use of the slow network interconnecting the computers, in these configurations such memory accesses can result in substantial delays in memory read/write processing operations, potentially of the order of $10^6$-$10^7$ cycles of the central processing unit of the machine. Ultimately this delay is dependent upon numerous factors, such as for example, the speed, bandwidth, and/or latency of the communication network. This in large part accounts for the diminished performance of the multiple interconnected machines in the prior art arrangement.

However, in the present arrangement all reading of memory locations or data is satisfied locally because a current value of all (or some subset of all) memory locations is stored on the machine carrying out the processing which generates the demand to read memory.

Similarly, all writing of memory locations or data is satisfied locally because a current value of all (or some subset of all) memory locations is stored on the machine carrying out the processing which generates the demand to write to memory.

Such local memory read and write processing operation can typically be satisfied within $10^2$-$10^3$ cycles of the central processing unit. Thus, in practice there is substantially less waiting for memory accesses which involves and/or writes.

The arrangement is transport, network, and communications path independent, and does not depend on how the communication between machines or DRTs takes place. Even electronic mail (email) exchanges between machines or DRTs may suffice for the communications.

Non-commercial operation of a prototype multiple computer system indicates that not every machine or computer in the system utilises or needs to refer to (eg have a local replica of) every possible memory location. As a consequence, it is possible to operate a multiple computer system without the local memory of each machine being identical to every other machine, so long as the local memory of each machine is sufficient for the operation of that machine. That is to say, provided a particular machine does not need to refer to (for example have a local replica of) some specific memory locations, then it does not matter that those specific memory locations are not replicated in that particular machine.

In connection with the above, it will be seen from FIG. 2 that there are a number of machines M1, M2, . . . Mn, n being an integer greater than or equal to two, on which the application program 50 of FIG. 1 is being run substantially simultaneously, and there is preferably a further machine X which is provided to enable various housekeeping functions to be carried out, such as acting as a lock server. In particular, the further machine X can be a low value machine, and much less expensive than the other machines which can have desirable attributes such as processor speed. Furthermore, an additional low value machine (X+1) is preferably available to provide redundancy in case machine X should fail. Where two such server machines X and X+1 are provided, they are preferably, for reasons of simplicity, operated as dual machines in a cluster configuration. Machines X and X+1 could be operated as a multiple computer system in accordance with the above-described arrangements, if desired. However this would result in generally undesirable complexity. If the machine X is not provided then its functions, such as housekeeping functions, are provided by one, or some, or all of the other machines.

Figure 20:
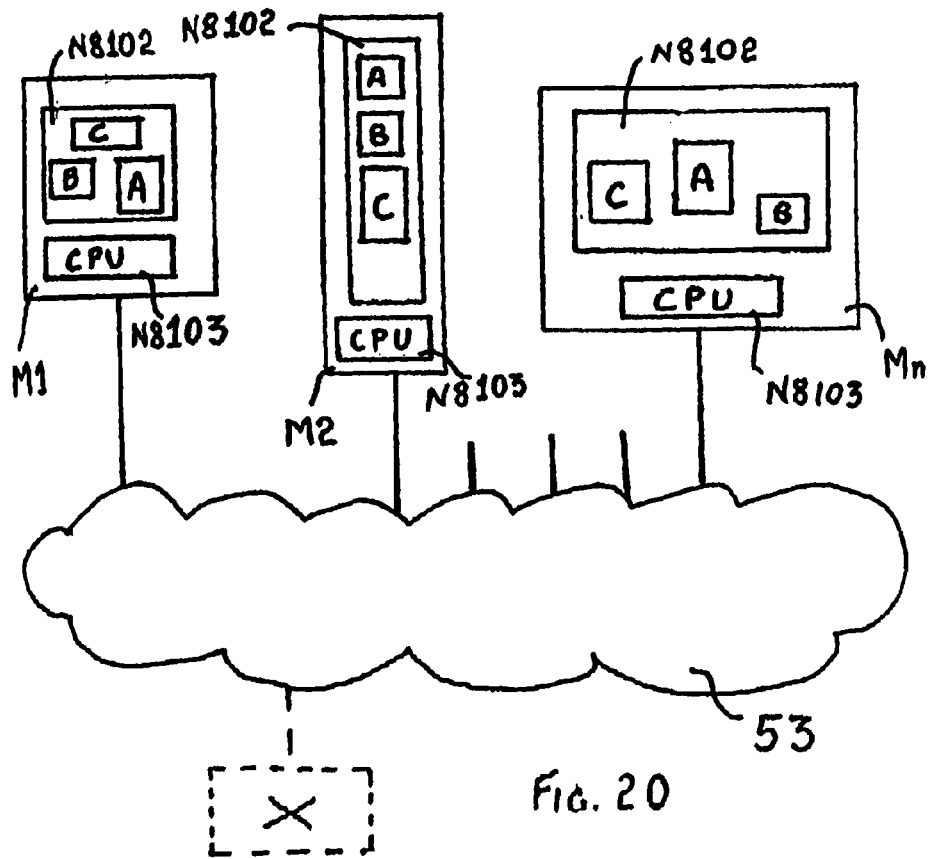
FIGS. 20-22 illustrate two arrangements of replicated shared memory multiple computer systems.

FIG. 20 is a schematic diagram of a replicated shared memory system. In FIG. 20 three machines are shown, of a total of "n" machines (n being an integer greater than one) that is machines M1, M2, ... Mn. Additionally, a communications network 53 is shown interconnecting the three machines and a preferable (but optional) server machine X which can also be provided and which is indicated by broken lines. In each of the individual machines, there exists a memory N8102 and a CPU N8103. In each memory N8102 there exists three memory locations, a memory location A, a memory location B, and a memory location C. Each of these three memory locations is replicated in a memory N8102 of each machine.

This arrangement of the replicated shared memory system allows a single application program written for, and intended to be run on, a single machine, to be substantially simultaneously executed on a plurality of machines, each with independent local memories, accessible only by the corresponding portion of the application program executing on that machine, and interconnected via the network 53. In International Patent Application No. PCT/AU2005/001641 (WO 2006/110,937) to which U.S. patent application Ser. No. 11/259,885 entitled: "Computer Architecture Method of Operation for Multi-Computer Distributed Processing and Co-ordinated Memory and Asset Handling" corresponds and PCT/AU2006/000532 (WO 2006/110,957) in the name of the present applicant, a technique is disclosed to detect modifications or manipulations made to a replicated memory location, such as a write to a replicated memory location A by machine M1 and correspondingly propagate this changed value written by machine M1 to the other machines M2 ... Mn which each have a local replica of memory location A. This result is achieved by the preferred embodiment of detecting write instructions in the executable object code of the application to be run that write to a replicated memory location, such as memory location A, and modifying the executable object code of the application program, at the point corresponding to each such detected write operation, such that new instructions are inserted to additionally record, mark, tag, or by some such other recording means indicate that the value of the written memory location has changed.

Figure 21:
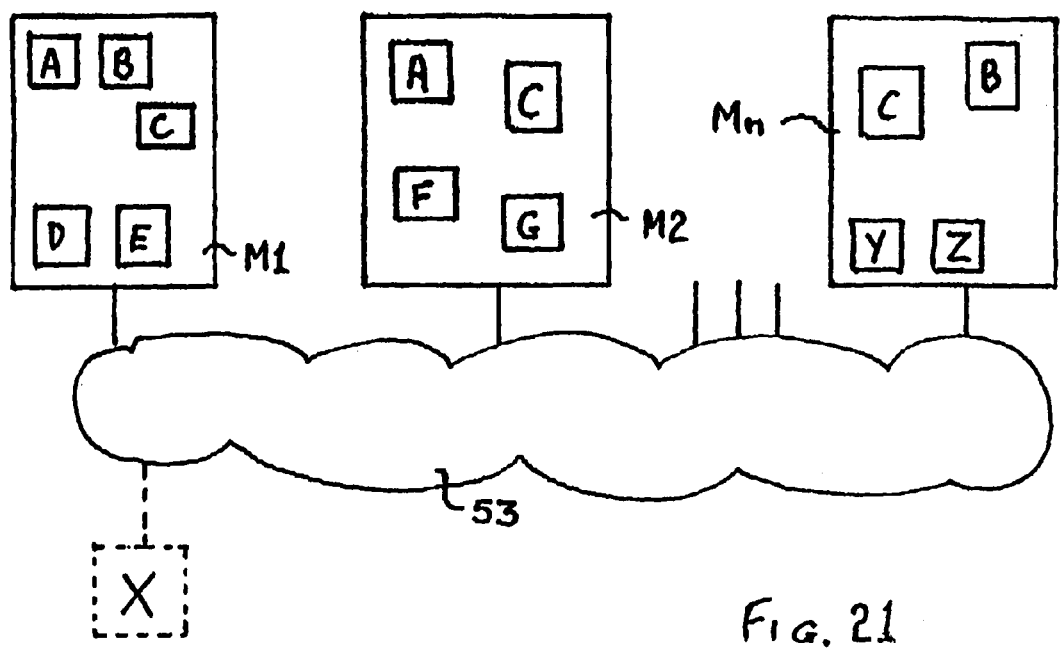

An alternative arrangement is that illustrated in FIG. 21 and termed partial or hybrid replicated shared memory (RSM). Here memory location A is replicated on computers or machines M1 and M2, memory location B is replicated on machines M1 and Mn, and memory location C is replicated on machines M1, M2 and Mn. However, the memory locations D and E are present only on machine M1, the memory locations F and G are present only on machine M2, and the memory locations Y and Z are present only on machine Mn. Such an arrangement is disclosed in International Patent Application No. PCT/AU2006/001447 published under WO 2007/041762 (and to which U.S. patent application Ser. No. 11/583, 958 ). In such a partial or hybrid RSM systems changes made by one computer to memory locations which are not replicated on any other computer do not need to be updated at all. Furthermore, a change made by any one computer to a memory location which is only replicated on some computers of the multiple computer system need only be propagated or updated to those some computers (and not to all other computers).

Consequently, for both RSM and partial RSM, a background thread task or process is able to, at a later stage, propagate the changed value to the other machines which also replicate the written to memory location, such that subject to an update and propagation delay, the memory contents of the written to memory location on all of the machines on which a replica exists, are substantially identical. Various other alternative embodiments are also disclosed in the abovementioned prior art. Whilst the above prior art methods are adequate for application programs which write infrequently to replicated memory locations, the prior art method is prone to inherent inefficiencies in those application programs which write frequently to replicated memory locations.

All described embodiments and arrangements of the present invention are equally applicable to replicated shared memory systems, whether partially replicated or not. Specifically, partially replicated shared memory arrangements where some plurality of memory locations are replicated on some subset of the total machines operating in the replicated shared memory arrangement, themselves may constitute a replicated shared memory arrangement for the purposes of this invention.

Figure 3:
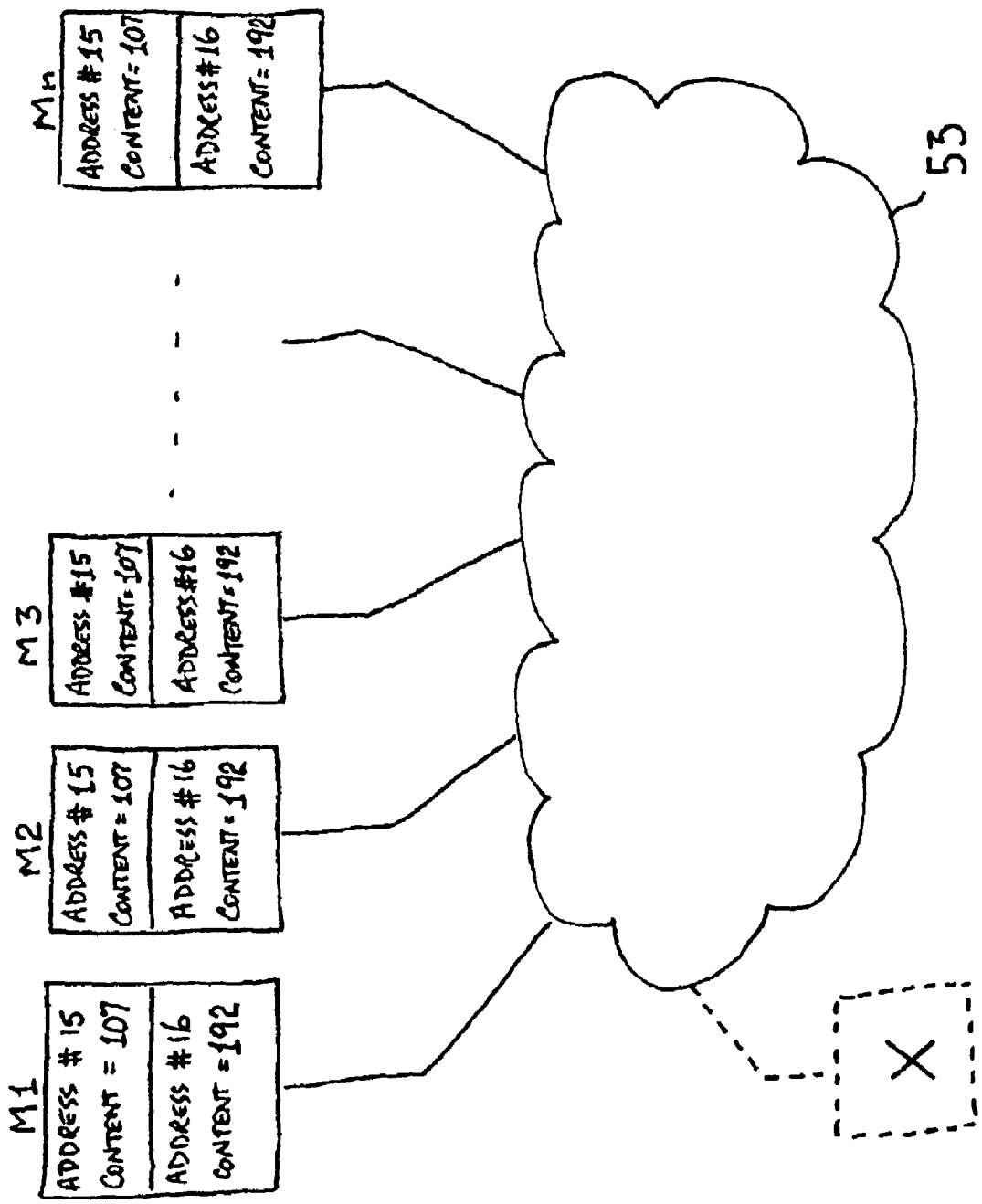
FIGS. 3-5 illustrate the steps of in due course updating memory locations.

In FIG. 3 a number, "n", of application running computers or machines M1, M2, M3 ... Mn are provided and, if desired, a server machine X can also be provided. Since the server machine is not essential it is indicated in phantom in FIG. 3. All the machines M1-Mn, and X if present, are interconnected in some fashion, preferably via a commodity communications network 53. In each of the application running machines, there are replicated memory locations which, for the sake of this discussion, will be restricted to two in number and which have addresses/identifiers of #15 and #16 respectively (but which need not be sequential). Each replicated memory location has a content or value which in some instances can include code but again for the purposes of this discussion will be deemed to constitute merely a number having a numerical value. The content of replica memory location/address #15 is the value (number) 107 and the content of replica memory location/address #16 is the value (number) 192. Each of the n application running machines has the two replicated memory locations and each replica memory location in each machine has substantially the same content or number.

Figure 4:
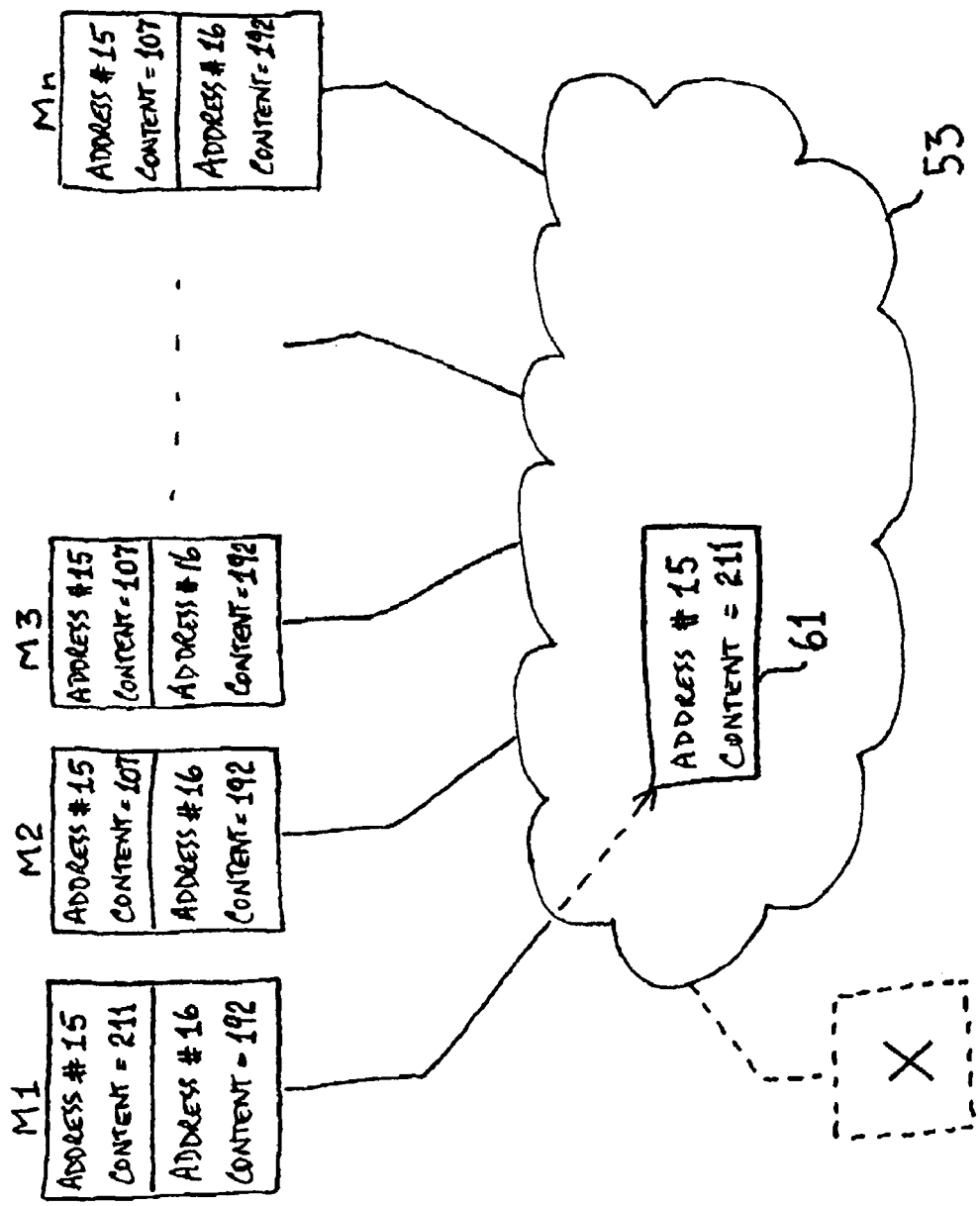

Turning now to FIG. 4, the situation which arises when a change in the content of a specific replicated memory location of one of the machines occurs, is explained. For the purposes of this description, it is assumed that machine M1 in executing its portion of the application program 50, carries out a memory write which results in the content of replica memory location/address #15 of machine M1 being changed from the value (number) 107 to the value (number) 211. This change is then notified (updated) to all other machines M2, M3 ... Mn via the network 53, such as in accordance with the above mentioned specifications and/or description for updating of replicated memory locations. This is schematically illustrated in FIG. 4 by the sending of an update notification from machine M1 to all the other machines on which a corresponding replica memory location resides, of the identity or address of the modified replica memory location with the changed content, and also the new changed content. This message is schematically illustrated as message 61 in FIG. 4.

Figure 5:
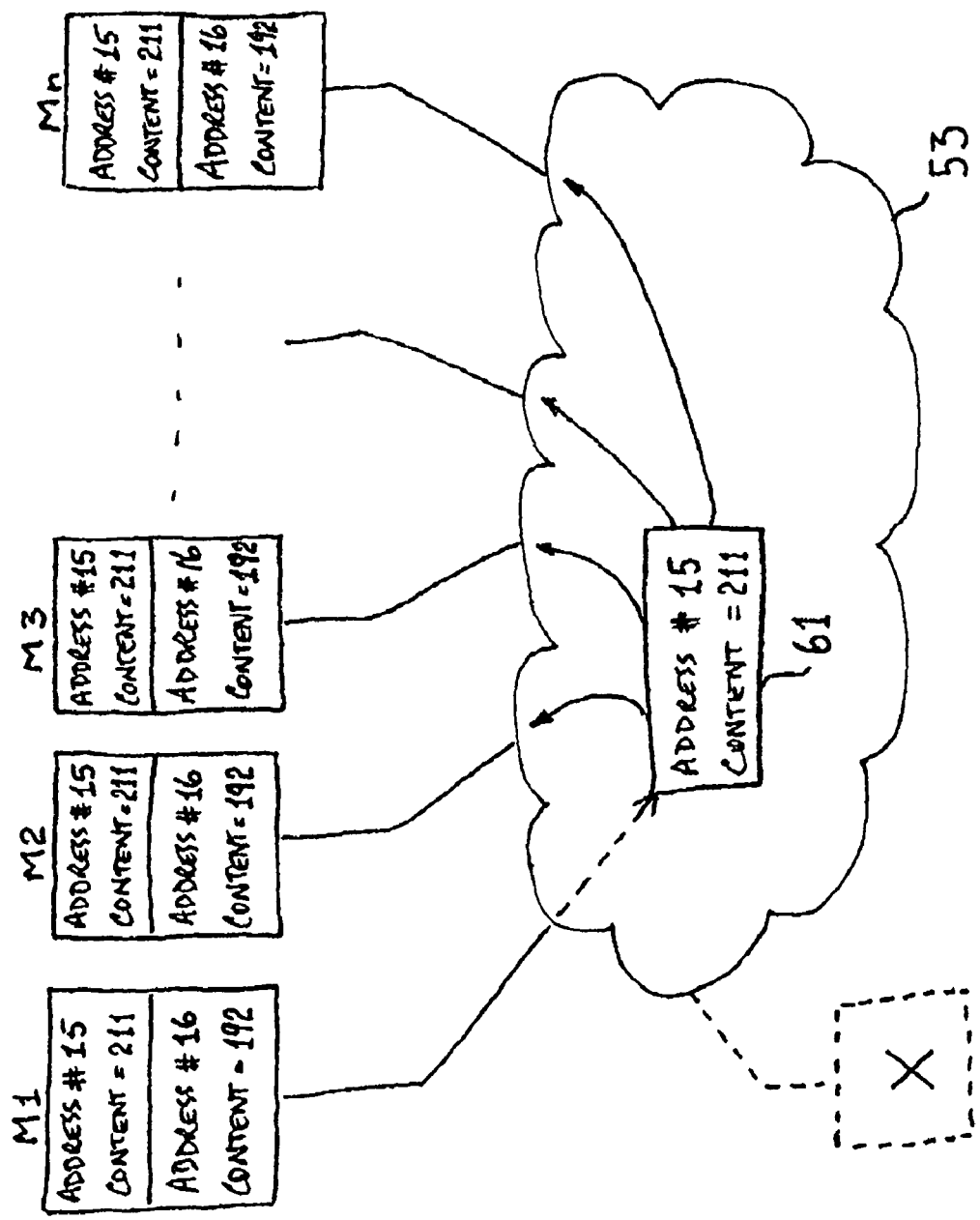

In FIG. 5, the message 61 from machine M1 of FIG. 4 has passed through the network 53 and been received by each of the other machines M2, M3 . . . Mn, which on receipt of the message 61 utilize an overwrite means or arrangement to store the changed content 211 in the local replica memory location corresponding to address #15. In this connection it should be understood that the actual address in each of the machines M1-Mn may be different from each other machine but that each of the replica memory locations has a substantially similar global identifier or global address. Preferably, the local memory address and the global memory identifier/address are recorded or tabulated either in tables maintained by each of the machines M1-Mn, or in the server machine X. In FIG. 5, the updating has been successfully carried out and all machines M2, M3 . . . Mn have been consistently updated to take into account the change brought about by (and within) machine M1.

Figure 13:
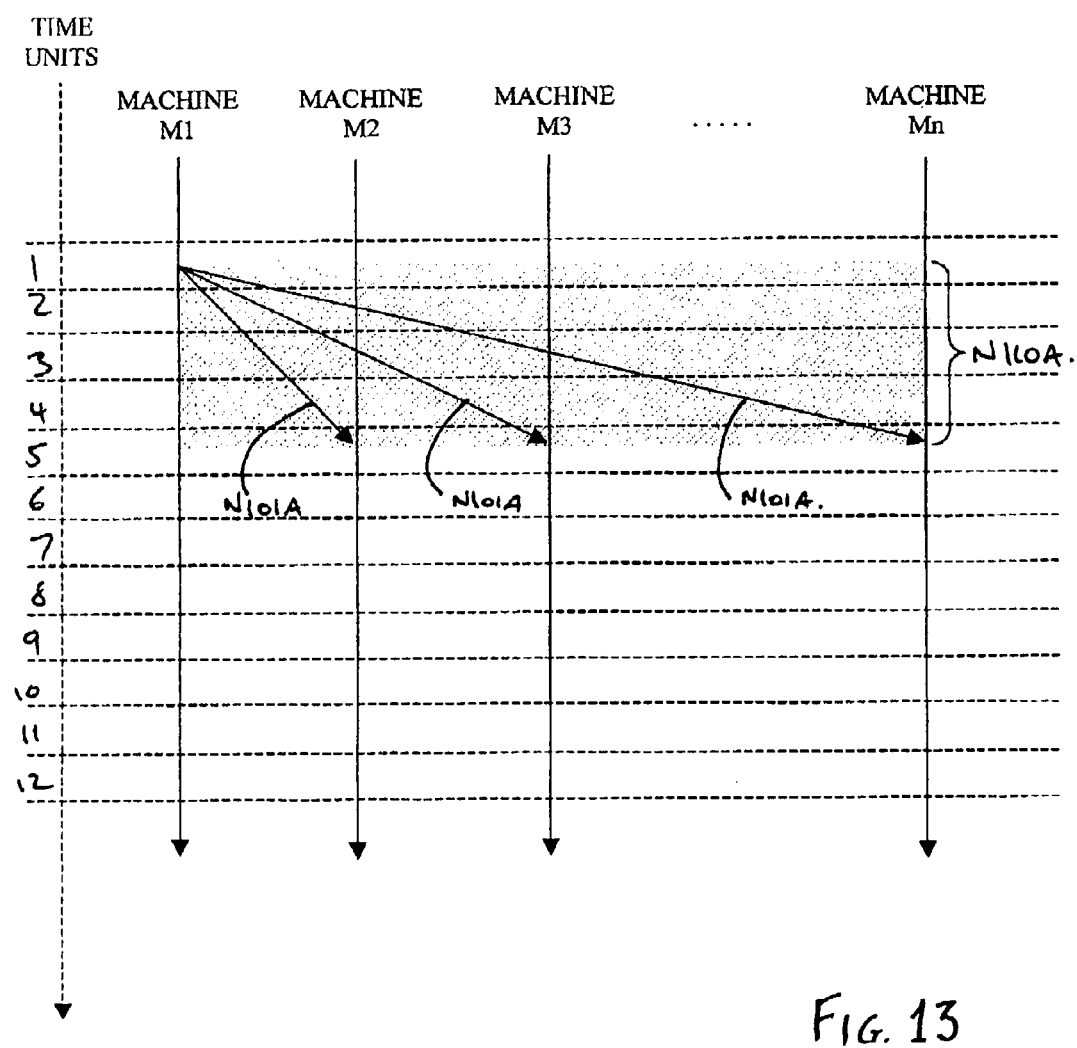

Turning now to FIG. 13, the example of FIGS. 4-5 is collectively illustrated in a time-diagram. Here, machine M1 transmits replica memory update N101 (which corresponds to replica update 61 of FIGS. 4 and 5) at time-unit 1, with the updated value "211" of address #15, to machines M2, M3 . . . Mn on which corresponding replica memory locations reside. However, as is indicated in FIG. 13, transmission N101 does not arrive at the receiving machines M2-Mn immediately (that is, at the same time-unit 1 of transmission). Instead, each receiving machine is indicated to receive replica update transmission N101 at time-unit 5 by the arrows shown for each machine M2-Mn.

Thus, FIG. 13 illustrates a time-delay that typically results between transmission and receipt of a replica memory update, due to latency and delay of the communications network used to interconnect and transmit the replica memory updates between the multiple computers of the multiple computer system. This period of delay, N110, represents the "transmission latency/delay" between the sending of replica update transmission N101 by machine M1, and the receipt of the same replica update transmission N101 by machines M2-Mn.

Following transmission N101 at time-unit 1, at time-unit 5 the receiving machines M2, M3 . . . Mn each independently receive the transmission N101, and update their local corresponding replica memory locations of address #15 with the received updated replica value "211" of transmission N101.

Figure 14:
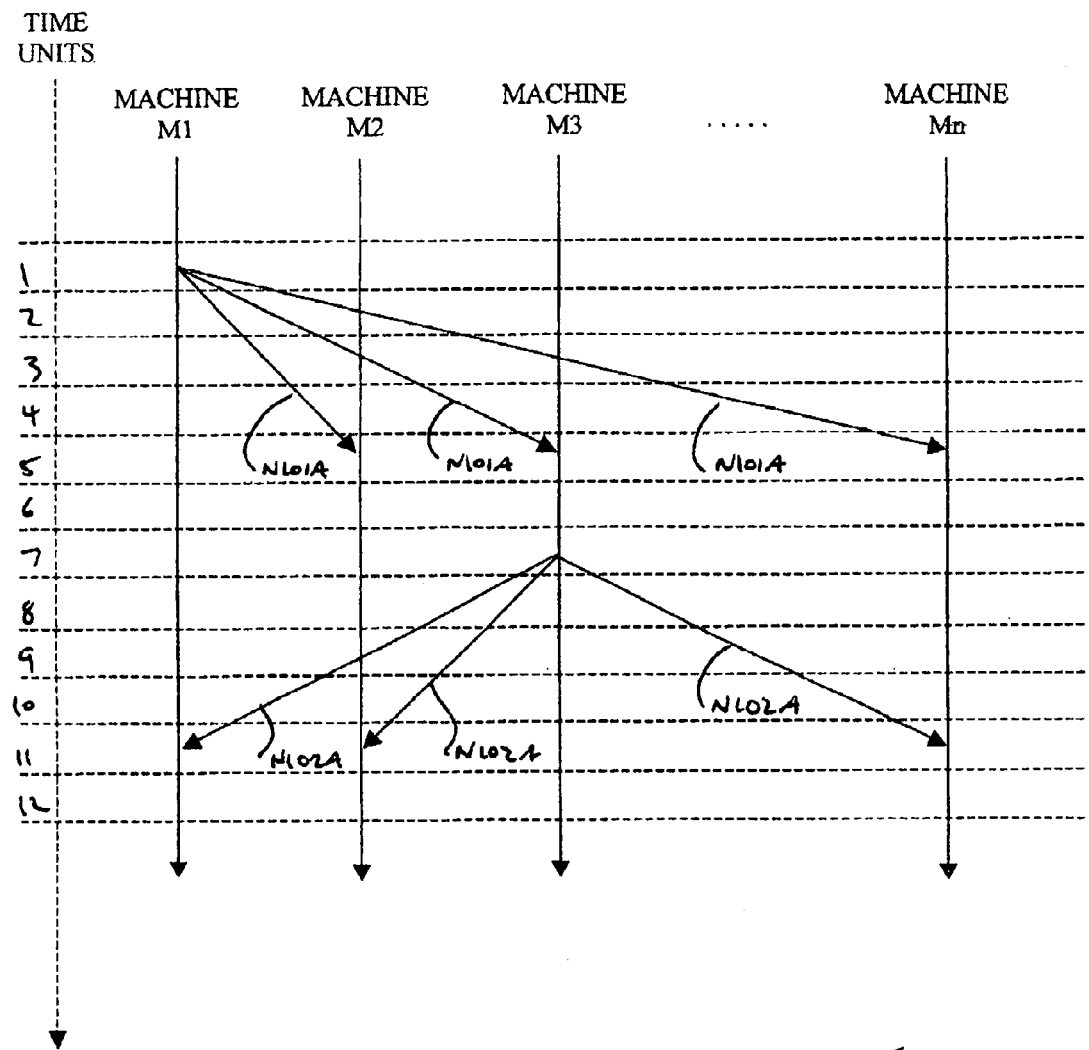

Thus in the circumstances where only a single machine at a time updates a replica memory address(es)/location(s) of other machines with changed value(s) or content, then no conflict or inconsistency arises (or will arise) between the values of the replicated memory locations on all the machines M1, M2, M3 . . . Mn. For example, consider FIG. 14. FIG. 14 follows on from FIG. 13, where at time-unit 7, and following receipt of transmission N101, machine M3 transmits replica memory update N102, with the updated value "999" of address #15, to machines M1, M2, M4 . . . Mn. As all machines M2-Mn are indicated to have received transmission N101 prior to transmission N102, then no potential inconsistency or conflict will arise between transmissions N101 and N102. Thus, consistent and coherent updating of replicated memory locations is preserved in cases where only a single machine at a time updates a replicated memory location.

However, it is possible for the content of a single replica memory location/address, say address #15, to be modified (written-to) simultaneously, or substantially simultaneously, by two machines, say M1 and M3. The term "substantially simultaneously" as used herein is used to refer to events which happen at the same time, or concurrently, or to events which are nearly simultaneous or nearly concurrent. In the example to be described hereafter the new content of replica memory location/address #15 written by machine M1 is the value/number 404 and the new content of replica memory location/address #15 of machine M3 is the value/number 92. As a consequence of their execution of their different portions of the application program 50, the two machines M1 and M3 modifying the same replica memory location/address #15, substantially simultaneously/concurrently send a update notification 81 and 82 respectively via the network 53 to all the other machines. These update notifications are intended to update the corresponding replica memory locations of all other machines in the manner indicated in FIG. 6.

Figure 7:
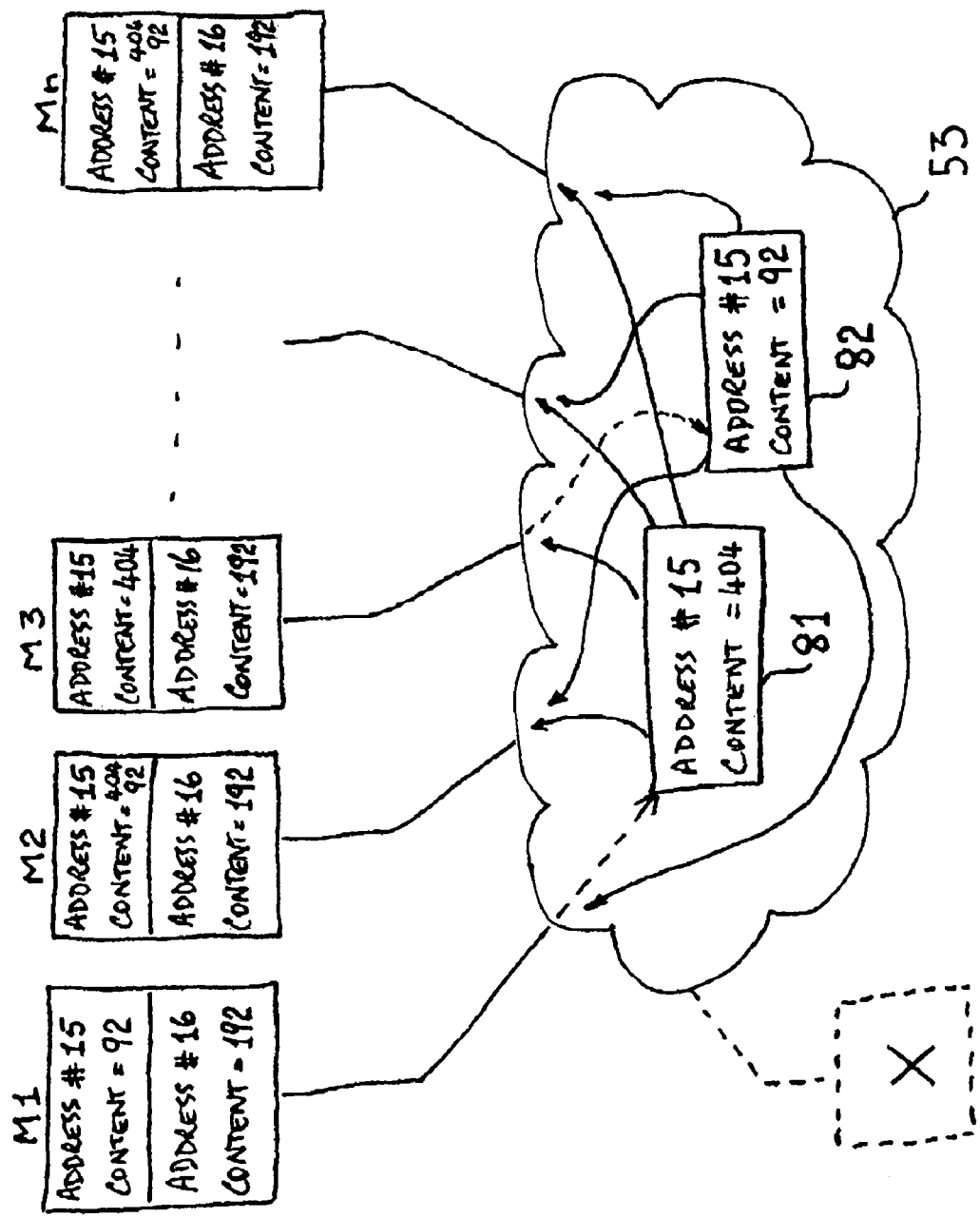

In FIG. 7, machine M1 which has just changed (written) its content at replica memory location/address #15 to value/number 404, now receives update message 82 from machine M3 and therefore in accordance with the replica updating method of FIG. 5 updates its value/content of replica memory location/address #15 to be the value/number 92. Similarly, machine M3 which has just updated (written) its content at replica memory location/address #15 to the value/number 92, then receives the update message 81 from machine M1 and thus updates its value/content of replica memory location/address #15 to be the value/number 404.

However, each of the other machines M2, M4, M5 . . . Mn receives both messages 81 and 82 (in either order, and potentially dissimilar orders, depending upon the speed and latency of the network 53). Thus the value/content appearing at replica memory location/address #15 for these machines will be either the value/number 404 or 92 depending upon whether message 81 or message 82 was received last.

Clearly, the consequence of the circumstances described above in relation to FIG. 7 is that the memory values/contents for corresponding replica memory locations/addresses of the plural machines M1-Mn are no longer consistent. Machines M1 and M3 will have swapped values caused by the receipt of each other's update notification of each other machine's change, whilst the remaining machines will each independently have either one or the other of the values of the two message originating machines (M1 and M3 in this example). It follows that in circumstances where updating messages are issued simultaneously, or nearly simultaneously, it is not possible to guarantee that the replicated memory locations on all of the machines M1, M2 . . . Mn will be updated in a consistent and coherent manner, and consequently that all machines will have consistent contents or values for the same replicated memory location(s). Therefore the desirable behaviour of consistently updated replicated memory locations of plural machines, and the desirable state of consistent replicated memory locations of plural machines, is not achieved and/or is not guaranteed to be achieved.

Figure 15:
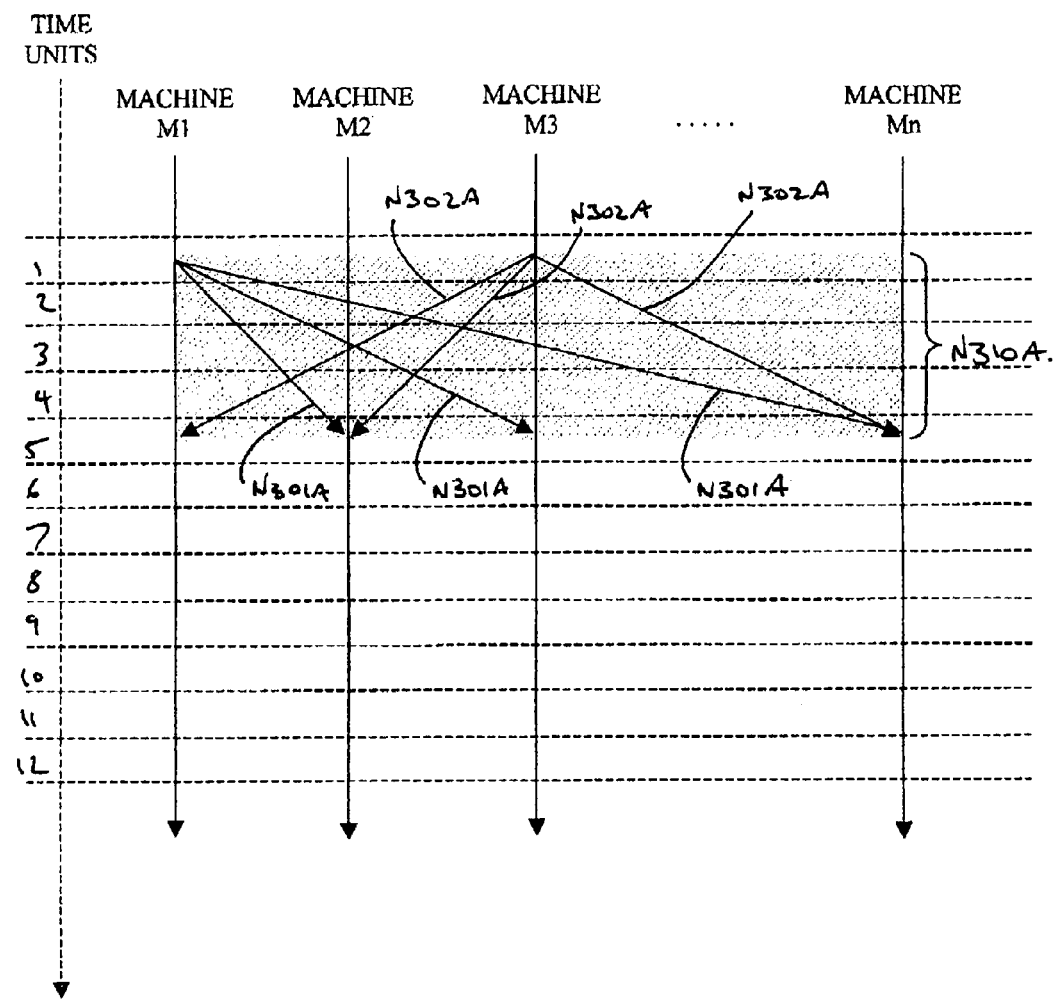

It will be apparent that such contention/inconsistency arises because of differences in timing caused by latency/delay and/or ordering of network transmissions. FIG. 15 illustrates how such latency/delay of network transmissions can cause the "contention/inconsistency" case of FIGS. 6-7.

Figure 6:
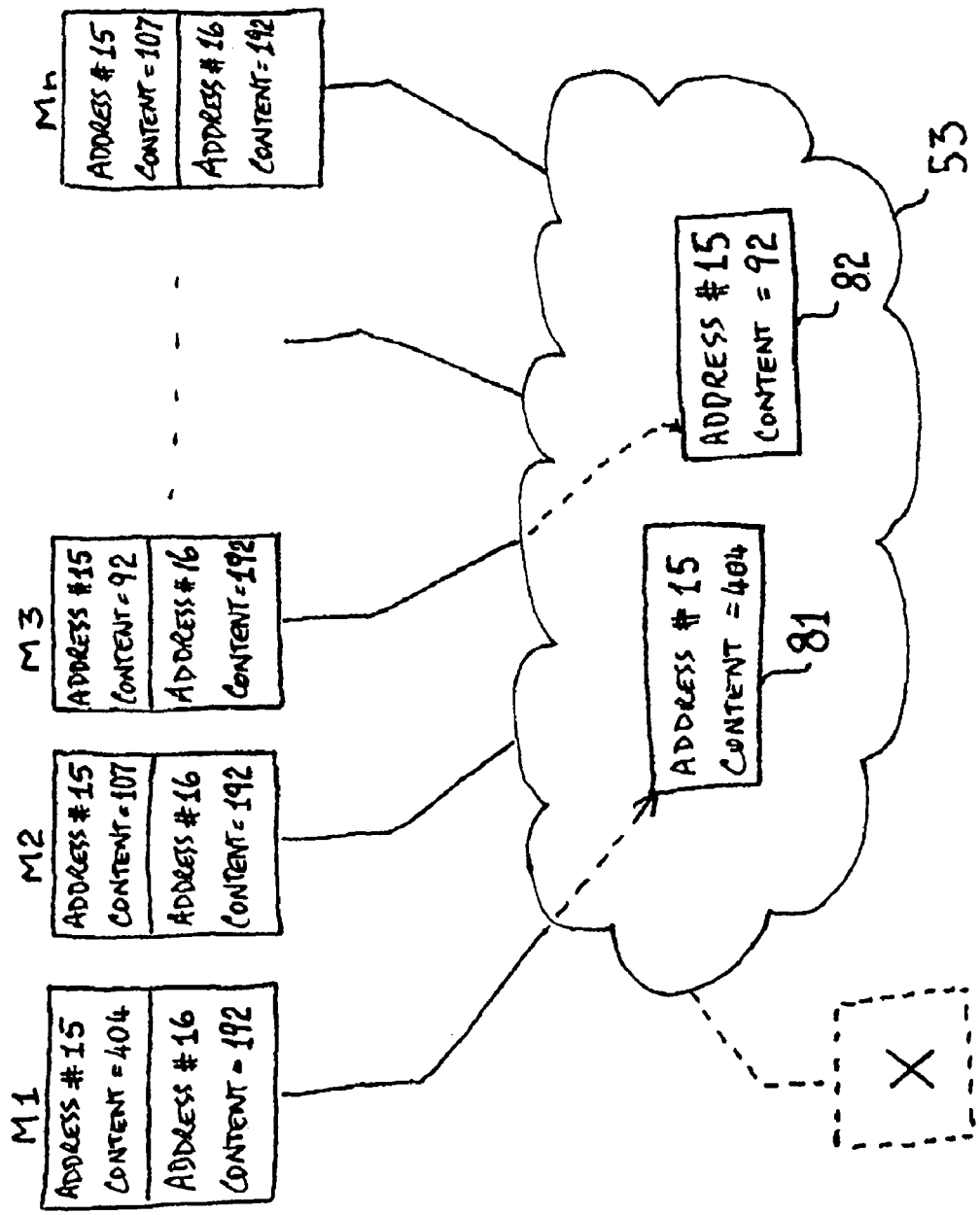
FIGS. 6 and 7 illustrate the stages by which contention can occur.

Thus in FIG. 15, the example of FIGS. 6-7 is collectively illustrated in a time-diagram. Here, machine M1 transmits replica memory update N301 (which corresponds to replica update 81 of FIGS. 6 and 7), with the updated value "404" of address #15, to machines M2, M3 . . . . Mn on which corresponding replica memory locations reside. Also, substantially simultaneously/concurrently machine M3 also transmits a replica memory update N302 (which corresponds to replica update 82 of FIGS. 6 and 7), with the updated value "92" of the same address #15, to machines M1, M2, M4 . . . Mn on which corresponding replica memory locations reside.

However, as is indicated in FIG. 15, transmissions N301 and N302 do not arrive at the receiving machines immediately (that is, at the same time-unit 1 of transmission). Instead, each receiving machine is indicated to receive replica update transmissions N301 and N302 at time-unit 5 by the arrows shown for each machine M1-Mn.

The problem of such contention/conflict between plural replica update transmissions of FIGS. 6-7, arises due to the latency and delay of network communication through the network 53 interconnecting the multiple computers. Specifically, where there is a latency/delay (e.g. N310 of FIG. 15) between transmission and receipt of a replica update transmission, such delay represents a "blind-spot" of a first transmitting machine (e.g. machine M1) attempting a replica update transmission for a specific replicated memory location, as such first machine is not able to know at the time of transmission (e.g. time-unit 1) whether a second (or more) machine (e.g. machine M3) has already transmitted a yet to be received replica update transmission for the same specific replicated memory location (such as transmitted prior to time-unit 1), or is currently transmitting a replica update transmission for the same specific replicated memory location (such for example transmission N302 at time-unit 1), or will transmit prior to receipt of the first machine's transmission a replica update transmission for the same specific replicated memory location (such as for example transmitted at time-units 2-4). Such a "blind spot" (or "contention window") is indicated as the shaded area N310 of FIG. 15.

Consequently, two or more replica update transmission(s) for a same replicated memory location(s) transmitted during such a "blind spot" (or "contention window"), may be or will be at risk of "conflicting" with one another, thus potentially resulting in inconsistent updating of such replicated memory location(s) of the plural machines if undetected.

Thus, FIG. 15 illustrates the case of the two machines M1 and M3 of FIGS. 6-7 each transmitting a replica memory update for a same replicated memory location (address #15) at a substantially simultaneous time, where each transmitting machine does not know in advance of transmission that another machine is also transmitting a replica memory update for the same replicated memory location.

The time-delay N310 that results between transmission and receipt of each machine's replica memory update, due to latency and delay of the communications network used to interconnect and transmit the replica memory updates between the multiple computers of the multiple computer system, represents a "blind spot" (or "contention window") where potential transmissions by other machines are not able to be known or detected until some-time later (e.g. upon receipt of such other potential transmissions, such as time-unit 5 when the "blind-spot" N310 is indicated to end). This period of delay, N310, represents the "transmission latency/delay" between the sending of replica update transmissions N301 and N302 by machines M1 and M3, and the receipt of each replica update transmission by the receiving machines.

Therefore, in order to overcome the risk of inconsistent replica updating of FIGS. 6-7, it is necessary to conceive a method to detect multiple transmissions for a same replicated memory location/address #15 which are (or were) transmitted substantially simultaneously/concurrently, such as during the "blind spot" (or "contention window") N310 of FIG. 15—for example, detecting two or more replica update transmissions (sent by two or more machines) for a same replicated memory location which were each sent prior to the receipt of each other machine's transmission(s) (or prior to receipt of all transmission(s) of one or more of the other machine(s)).

Most solutions of such contention/inconsistency problems rely upon time stamping or a synchronizing clock signal (or other synchronization means) which is common to all machines/computers (entities) involved. However, in the multiple computer environment in which the preferred embodiment of the present invention arises, there is no synchronizing signal common to all the computers (as each computer is independent). Similarly, although each computer has its own internal time keeping mechanism, or clock, these are not synchronized (and even if they could be, would not reliably stay synchronized since each clock may run at a slightly different rate or speed, potentially resulting in undesirable clock-skew and/or clock-drift between the plural machines). Thus solutions based on time or attempted synchronization between plural machines are bound to be complex and/or inefficient and/or are not likely to succeed or will/may result in undesirable/unsatisfactory overhead. Instead, the preferred embodiment utilizes the concept of sequence, rather than time.

In conceiving of a means or method to overcome the above-described undesirable behaviour, it is desirable that such solution not impose significant overhead on the operation of the multiple computer system—either in terms of additional communication overhead (such as additional transmissions in order to detect the potential for conflicting updates, or avoid such conflicting updates from occurring in the first place), or in terms of additional or delayed processing by sending and/or receiving machine(s) (such as additional or delayed processing by receiving machines of one or more received transmissions, or additional or delayed processing by sending machines of one or more to-be-sent transmissions).

For example, it is desirable that receiving machines be permitted to receive and action packets/transmissions in any order (including an order different to the order in which such transmission/packets were sent), and potentially different orders for the same plural transmissions on different receiving machines. This is desirable, because a requirement to process/action received transmissions in specific/fixed orders imposes additional undesirable overhead and delay in processing of received transmissions, such as for example delayed processing/actioning of a later sent but earlier received transmission until receipt and processing/actioning of an earlier sent but later received (or yet-to-be-received) transmission.

Specifically, one example of a prior art method of addressing the above described problem would be to cause each receiving machine to store received replica update transmission in a temporary buffer memory to delay the actioning of such received replica update transmissions. Specifically, such received update transmissions are stored in such a temporary buffer memory for some period of time (for example one second) in which the receiving machine waits for potentially one or more conflicting replica update transmissions to be received. If no such conflicting replica update transmissions are received within such period of time, then the received transmission(s) stored in the temporary buffer memory may be proceeded to be actioned (where such actioning results in the updating of replica memory locations of the receiving machine). Alternatively, if one or more conflicting replica update transmissions are received, then signalling that a conflicting replica update transmission(s) has been received. However, such prior art method is undesirable as additional delay (namely, storing received transmissions in a temporary buffer memory and not processing/actioning them for a period of time) is caused by such prior art method.

Figure 8:
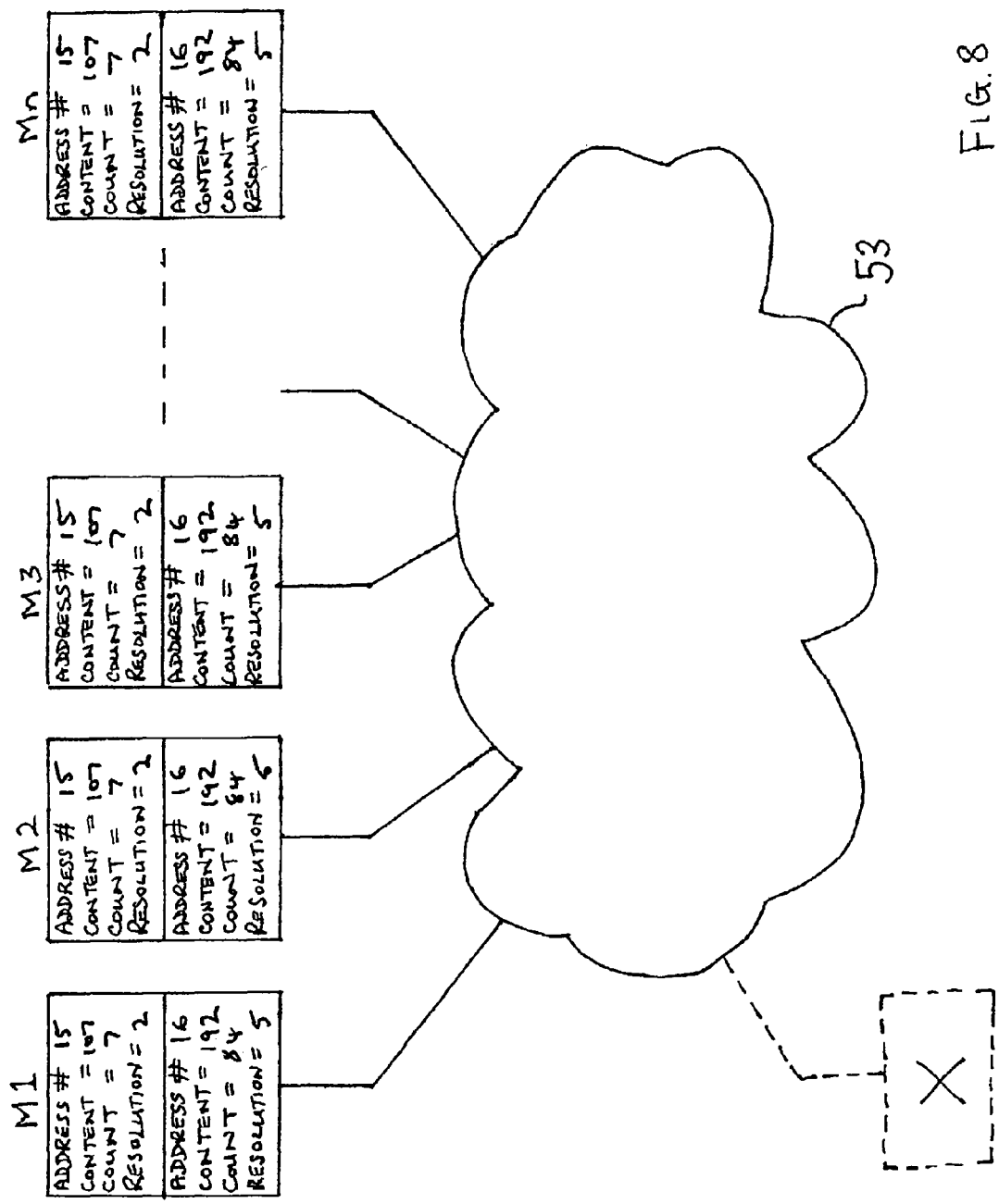
FIGS. 8, 9, 10, 11, and 12 illustrate the stages of an embodiment whereby contention can be detected, FIGS. 13-18 each illustrate various time graphs of replica update transmissions.

In accordance with a first embodiment of the present invention, this problem is addressed (no pun intended) by the introduction of a "count value" (or logical sequencing value) and a "resolution value" (or per node value) associated with each replicated memory location (or alternatively two or more replicated memory locations of a related set of replicated memory locations). The modified position is schematically illustrated in FIG. 8 where each of the replicated memory locations/addresses #15 and #16 is provided with a "count value" and a "resolution value". In the particular instance illustrated in FIG. 8, the content of replicated memory location/address #15 is 107, its "count value" is 7, and its "resolution value" is "2", whilst the content of replicated memory location/address #16 is 192 and its "count value" is 84 and its "resolution value" is "5".

Figure 9:
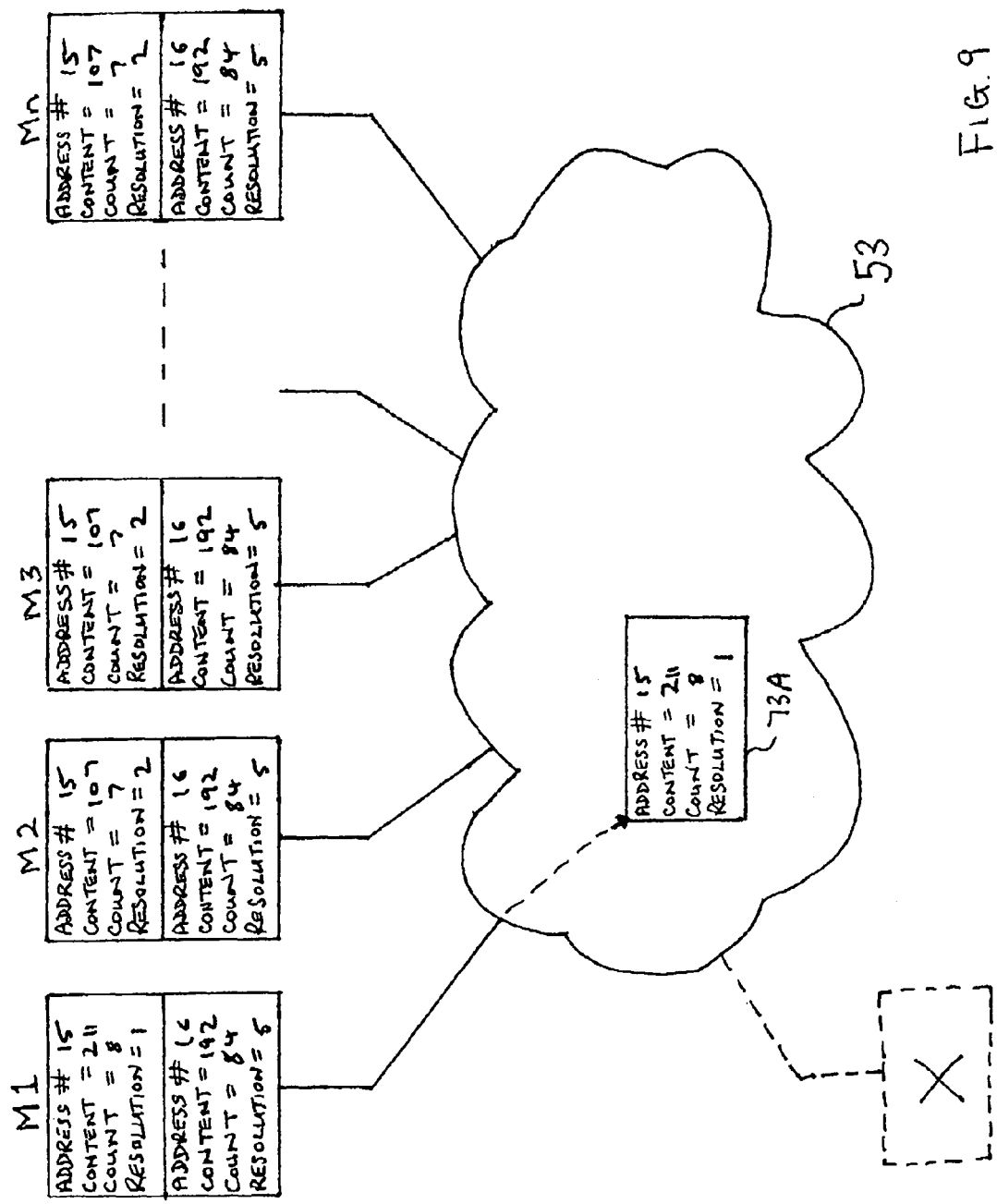

In FIG. 9, the operation of machine M1 causes the content of address #15 to be changed from 107 to 211. Following such write operation, such as upon transmission of message 73A (or some time prior to transmission of message 73A), the "count value" associated with address #15 is incremented from 7 to 8 and the "resolution value" is overwritten to the value of "1" (corresponding to the identity of machine M1). This incrementing of the "count value" indicates that message 73A is the next logical update message in the sequence of update messages of address #15 known to machine M1 at the time of transmission of message 73A, and the setting of the "resolution value" to "1" indicates that message 73A has been sent by machine M1. Machine M1 then sends a message 73 via the network 53 to all other application running machines M2, M3 . . . Mn to instruct them to update their content for their corresponding replica memory location/address #15.

More specifically, the "resolution value" of FIGS. 8-12 is a numerical (integer) identifier of the machine which transmitted an updated replica value. So for example, in the situation of FIG. 9, the "resolution value" of replica update transmission 73A is the value of "1" which is the numerical identifier of the machine M1. However, any other arrangement of numerical or content value may be employed as a "resolution value". Specifically, any arrangement of numerical value (or other content value) may be employed as a "resolution value" so long as the resolution value(s) employed by a transmitting machine for replica memory updates is unique to the transmitting machine and that no other replica memory update transmissions of any other machine may employ the same "resolution value(s)".

Additionally, it is not a requirement of this invention that replica memory updates associated with a single transmitting machine all carry the same "resolution value", or that only a single "resolution value" is associated with a transmitting machine. Instead, any number of discreet "resolution value(s)" may be employed be a transmitting machine and associated with replica memory update transmissions, so long as such employed "resolution value(s)" are unique to the transmitting machine and that no other replica memory update transmissions of any other machine may employ the same "resolution value(s)".

Figure 10:
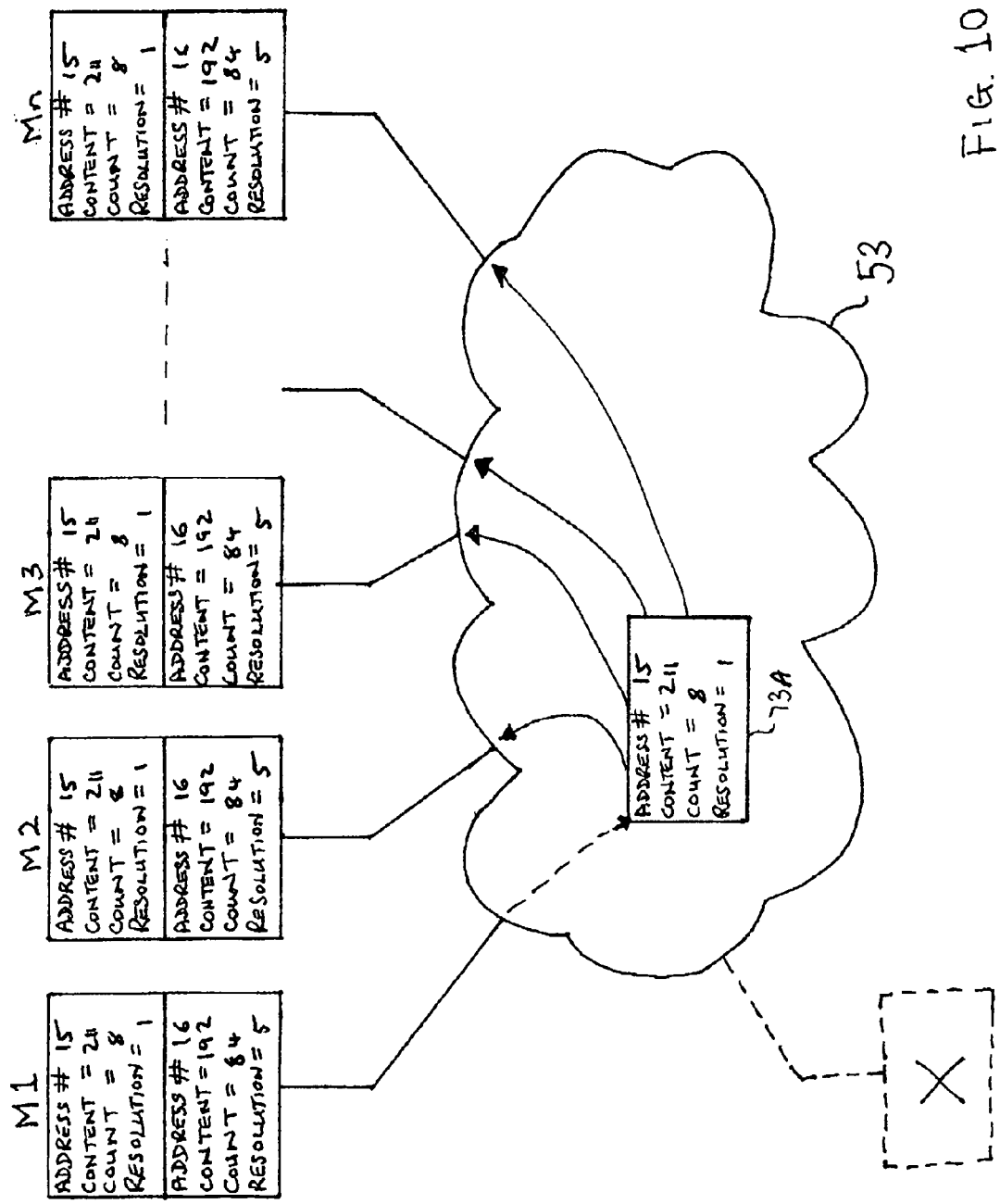

This is exactly what happens as illustrated in FIG. 10 in which the single message 73A is received by all of the other machines M2, M3 . . . Mn so that address #15 for all these receiving machines are updated with the new content 211, the new "count value" 8 and the new "resolution value" of "1". Thus, FIG. 10 indicates the receipt of message 73A by all other machines M2 . . . Mn, and the "actioning" of such received message 73A in accordance with the methods of this invention resulting in the updated "count value" of "8" and the updated "resolution value" of "1" for the replica memory locations of machines M2 . . . Mn. How exactly the "count value" and the "resolution value" for each of the replica memory locations/addresses #15 has been changed or overwritten to indicate that a change in content has occurred, will now be explained.

Specifically, upon receipt of message 73A, comprising an identifier of a replicated memory location(s), an associated updated value of the identified replicated memory location(s), an associated contention value(s) (that is, a "count value" or a "logical sequence value"), and an associated "resolution value", such associated contention value(s) and "resolution value" may be used to aid in the detection and resolution of a potential update conflict or inconsistency that may arise between two or more update messages for a same replicated memory location sent by two or more machines.

The use of the "count value" and "resolution value" in accordance with the methods of this invention, allows the condition of conflicting or inconsistent updates sent by two or more machines for a same replicated memory location to be detected and resolved independently by each receiving machine of a plurality of machines. Specifically, the associating of a "count value" and a "resolution value" with a replicated memory location makes it possible to detect when two or more update transmissions relating to the same replicated memory location were transmitted by two or more machines without each transmitting machine knowing in advance of its transmission that another machine has (or is) similarly attempting to update the same replicated memory location, and resolve which of the two or more replica memory update transmissions is to prevail (that is, which one of the two or more replica update transmissions is to become the ultimate updated value of the affected replicated memory location). In otherwords, the association of a "count value" and a "resolution value" with a replicated memory location makes it possible to detect when two or more updates of two or more machines relating to a same replicated memory location were transmitted without knowledge of one or more of the other update transmissions sent by some or all of the one or more other machines, and resolve which one or the two or more replica memory update transmissions will prevail.

Such a problem arises due to the latency and delay of network communication through the network 53, where there is a latency/delay between transmission and receipt of a replica update transmission, and consequently such delay may be described as a "blind-spot" for a transmitting machine in that a first machine attempting a replica update transmission for a specific replicated memory location is not able to know at the time of transmission whether a second (or more) machine is also attempting a replica update transmission for the same specific replicated memory location at substantially the same time. Such a "blind spot" (or potential "contention window") is illustrated in FIGS. 13-18.

Thus, through the use of a "count value" and a "resolution value" associated with a replicated memory location, where such "count value" indicates an approximate known update count of a replicated memory location by a transmitting machine, and where such "resolution value" is a unique value associated with a transmitting machine, the occurrence of two or more update transmissions for a same replicated memory location sent by two or more machines, each transmitted substantially simultaneously/concurrently, is able to be detected and resolved, and thus the potential inconsistency and/or conflict that may arise from such plural transmissions may be avoided and the replicated memory location updated in a consistent manner by all machines.

How exactly "count value(s)" and "resolution values" may be utilised during transmission of replica memory updates (comprising such "count value(s)" and "resolution value") to achieve this result, will now be described. Firstly, after a replicated memory location (such as memory location "A") is updated, such as written-to, or modified, during operation of the application program of a first machine (such as machine M1), then the updated value of such written-to replicated memory location is signalled or queued to be updated to other corresponding replica memory locations of one or more other machines of the plurality, so that such corresponding replica memory locations, subject to a updating and transmission delay, will remain substantially similar.

Sometime after such replicated memory location "A" has been written-to, and preferably before the corresponding replica update transmission has taken place, the local/resident "count value" and "resolution value" associated with the written-to replicated memory location (that is, the local copy of the "count value" and "resolution value" on machine M1 associated with replicated memory location "A") are updated. Specifically, such updating of the local/resident "count value" preferably comprises the local/resident "count value" being incremented, and the incremented value is consequently stored to overwrite the previous local/resident "count value" (that is, the local/resident "count value" is incremented, and then overwritten with the incremented "count value"). Such updating of the local/resident "resolution value" preferably comprises the local/resident "resolution value" being overwritten with a unique value associated only with machine M1 (such as for example a unique integer/numerical identity of machine M1, or some other unique value associated only with machine M1 and no other machines).

Either at substantially the same time as the "count value" and "resolution value" are updated, or at a later time, an updating transmission is prepared for the network 53. Such updating transmission preferably comprises four "contents" or "payloads" or "values", that is a first content/payload/value identifying the written-to replicated memory location (for example, replicated memory location "A"), the second content/payload/value comprising the updated (changed) value of the written-to replicated memory location (that is, the current value(s) of the written-to replicated memory location), the third content/payload/value comprising the updated (e.g. incremented) "count value" associated with the written-to replicated memory location, and finally the fourth content/payload/value comprising the updated "resolution value" associated with the written-to replicated memory location.

Preferably, a single replica update transmission comprises all four "contents", "payloads" or "values" in a single message, packet, cell, frame, or transmission, however this is not necessary and instead each of the four "contents"/"payloads"/"values" may be transmitted in two, three or more different messages, packets, cells, frames, or transmissions—such as each "content"/"payload"/"value" in a different transmission. Alternatively, two "contents"/"payloads"/"values" may be transmitted in a single first transmission and the third and fourth remaining "content"/"payload"/"values" in a second transmission. Further alternatively, other combinations or alternative multiple transmission and/or pairing/coupling arrangements of the four "contents"/"payloads"/"values" will be known to those skilled in the computing arts, and are to be included within the scope of the present invention.

Importantly, the "count value" and "resolution value" of a specific replicated memory location are updated only once per replica update transmission of such replicated memory location, and not upon each occasion at which the specific replicated memory location is written-to by the application program of the local machine. Restated, the "count value" and "resolution value" are only updated upon occasion of a replica update transmission and not upon occasion of a write operation by the application program of the local machine to the associated replicated memory location. Consequently, regardless of how many times a replicated memory location is written-to by the application program of the local machine prior to a replica update transmission, the "count value" and "resolution value" are only updated once per replica update transmission. For example, where a replicated memory location is written-to 5 times by the application program of the local machine (such as by the application program executing a loop which writes to the same replicated memory location 5 times), but only a single replica update transmission of the last written-to value is transmitted (that is, the value of the $5^{th}$ and last write operation), then the "count value" and "resolution value" associated with the written-to replicated memory location are updated once corresponding to the single replica update transmission.

How exactly the "count value" and "resolution value" are utilised during receipt of replica update transmissions comprising a "count value" and "resolution value" will now be described. The following steps upon receipt of a replica update transmission comprising an associated "count value" and "resolution value", are to take place on each receiving machine of the plurality of machines of a replicated shared memory arrangement on which a corresponding replica memory location resides. Importantly, the following steps are operable independently and autonomously by each machine (that is, are to preferably operate independently and autonomously by each receiving machine), such that no re-transmissions, conflict requests, or any other "resolving" or "correcting" or "detecting" transmissions between two or more machines are required or will take place in order to detect potentially conflicting transmissions and resolve such multiple conflicting transmissions to a single prevailing transmission (and therefore a single prevailing replica update value). This is particularly advantageous as each receiving machine is therefore able to operate independently and autonomously of each other machine with respect to receiving and actioning replica memory updates comprising "count value(s)" and "resolution values", and detecting and resolving "conflicting"/"contending" transmissions.

Firstly, a replica updating transmission comprising an identity of a replicated memory location to be updated, the changed value to be used to update the corresponding replica memory locations of the other machine(s), and finally an associated "count value" and "resolution value", is received by a machine (for example, machine M2). Before the local corresponding replica memory location may be updated with the received changed value, the following steps take place in order to ensure the consistent and "un-conflicted" updating of replica memory locations, and detect and resolve potentially "conflicting"/"contending" updates.

Firstly, the received associated "count value" is compared to the local/resident "count value" corresponding to the replica memory location to which the received replica update transmission relates. If the received "count value" of the received update transmission is greater than the local/resident "count value", then the changed value of the received replica update transmission is deemed to be a "newer" value (that is, a more recent value) than the local/resident value of the local corresponding replica memory location. Consequently, it is desirable to update the local corresponding replica memory location with the received changed value. Thus, upon occasion of updating (overwriting) the local corresponding replica memory location with the received value, so too is the associated local "count value" also updated (overwritten) with the received "count value", and the associated local "resolution value" also updated (overwritten) with the received "resolution value". Such a first case as this is the most common case for replica memory update transmission, and represents an "un-conflicted"/"un-contended" (or as yet un-contended/un-conflicted) replica update transmission.

On the other hand, if the received "count value" of the received update transmission is less than the local/resident "count value", then the changed value of the received replica update transmission is deemed to be an "older" value than the local/resident value of the local corresponding replica memory location. Consequently, it is not desirable to update the local corresponding replica memory location with the received changed value (as such value is a "stale" value), and as a result the received changed value may be disregarded or discarded.

However, a third condition is also possible—that is, where the received "count value" of the received transmission is equal to (the same as) the local/resident "count value". When such a case as this occurs, the received changed value of the received replica update transmission can be neither guaranteed to be "newer", nor "older" than the local/resident value of the local corresponding replica memory location. Consequently, when a condition such as this occurs (that is, the "count value" of a received replica update transmission is the same as the local/resident "count value" of the local corresponding replica memory location), then the received replica update transmission is deemed to be "in conflict" (or "contending") with the local corresponding replica memory location.

Such a potential "conflicting" condition between a received replica memory update and a local corresponding replica memory location will generally come about when two or more machines transmit a replica memory update for the same replicated memory location(s) at substantially the same time (that is, substantially simultaneously/concurrently). Such two or more transmissions are said to be "in contention", as they conflict with each other, and if not detected to be "in contention" (that is, in conflict), then there is a risk that the multiple corresponding replica memory locations of the affected replicated memory location (that is, the replicated memory location to which the contending/conflicting updating transmissions relate) will not be updated by the plural machines in a consistent and coherent manner. Such an example of substantially simultaneous/concurrent updating by two or more machines of a same replicated memory location resulting in inconsistent updating of replica memory locations of the plural machines is illustrated in FIGS. 6-7 and 15.

For example, upon occasion of two replica update transmission for the same replicated memory location occurring (being transmitted) substantially simultaneously/concurrently (that is, transmitted by two machines where each transmitting machine has not received the other transmitting machine's transmission prior to sending its own transmission), and each transmitted with the same associated "count value", then by utilising the abovedescribed methods it is possible for each receiving machine to independently detect such "conflicting" transmission independently (that is without the aid of) any other machine, and without requiring any additional transmissions by either the receiving or sending machine(s). Furthermore, each receiving machine is able to detect such "conflicting" transmissions regardless of the order in which they arrive at the receiving machine (and potentially in differing orders for different receiving machines).

Additionally, the abovedescribed methods also facilitate the detecting of conflicting transmissions by each of the sending machines. That is, for each of the plural conflicting sending machines, each one of such sending machines is able to similarly independently detect the conflicting replica memory updates of each other transmitting machine upon occasion of the receipt of each such update(s), and without requiring any additional transmissions by either the receiving or sending machine(s).

Thus, the "count value" associated with each replicated memory location (and replica memory update transmission) may be used to detect when a received replica update transmission is "in conflict" with a local/resident replica value. Upon such a condition where the "count value" of a received replica update transmission is the same as the local/resident "count value" of the local corresponding replica memory location, then the "resolution value" accompanying the received transmission may be used to resolve the detected "conflict" and determine whether or not the received "conflicting" replica update transmission is to be discarded or alternatively update the local corresponding replica memory location. How the "resolution value" may be used to resolve a detected "conflict" between a received replica update transmission and the local corresponding replica value, will now be explained.

The "resolution value" accompanying each replica update transmission may be used to resolve a detected conflict between a received replica memory update transmission and the local/resident value of the corresponding replica memory location (such as may be detected for example by the "count value" of a received replica memory update transmission being equal to the local/resident "count value" of the corresponding replica memory location). When such a "contention"/"conflicting" situation is detected for a received replica memory update transmission, the accompanying "resolution value" of the received replica memory update transmission and the corresponding local/resident "resolution value" may be examined and compared in order to determine which of the two replica values (that is, the local/resident replica value or the received updated replica value) will "prevail". Thus, the purpose of the "resolution value" accompanying each replicated memory location and each replica update transmission is to provide a means to determine which of two such replica values will prevail, and therefore, whether or not a received conflicting replica update transmission is to be updated to local memory or not.

Specifically, the use of "resolution values" and an accompanying comparison rule may be used to compare two "resolution values" in order to consistently select a single one of the two values as a "prevailing" value. If it is determined in accordance with such rule(s) that the "resolution value" of the received conflicting replica update transmission is the prevailing value (compared to the local/resident corresponding "resolution value"), then the receiving machine may proceed to update the local corresponding replica memory location with the received replica update value of the "prevailing" transmission (including overwriting the corresponding local/resident "count value" and "resolution value" with the received "count value" and "resolution value"). Alternatively, if it is determined that such "resolution value" of the received conflicting replica update transmission is not the prevailing value (that is, the local/resident "resolution value" is the prevailing value), then the receiving machine is not to update the local corresponding replica memory location with the received replica update value of the conflicting transmission, and such conflicting transmission may be discarded.

For example, in the case of FIGS. 8-12, the resolution rule may be as simple as choosing the higher of two "resolution values" as the "prevailing" value. Alternatively, a different employed resolution rule may be to chose the lower of the two "resolution values" as the prevailing value. Ultimately, the specific value(s) chosen to be used as "resolution values", and the specific resolution rule(s) chosen to determine a "prevailing" value, are not important to this invention, so long as the chosen "resolution values" are unique to each transmitting machine (that is, two transmissions of two machines may not have the same "resolution value"), and so long as the chosen resolution rule(s) consistently, chose a same prevailing "resolution value" upon each comparison of two specific "resolution values".

Combined, the "count value" and the "resolution value" in accordance with the abovedescribed methods facilitate/enable the detection of "conflicting" replica update transmissions received by a machine, and facilitate/enable the consistent updating of the effected replicated memory location(s) by plural receiving machines when receiving a "conflicting" replica update transmission. Importantly, the "count value" and "resolution value" when operated in accordance with the abovedescribed methods, facilitate the consistent updating of replicated memory locations by plural receiving machines, regardless of the receipt order of "conflicting" replica update transmissions, and without further communication or interaction between any two or more receiving and/or sending machines to ensure the consistent updating of the effected replica memory location(s). Altogether then, the abovedescribed methods for the operation of replica update transmissions comprising "count values" and "resolution values" achieve the desired aim of being able to detect and resolve contending/conflicting replica update transmissions without requiring re-transmissions by one, some, or all of the transmitting machines of the effected (that is, conflicting) transmissions.

Thus, the abovedescribed methods disclose a system of transmitting replica memory updates in such a manner in which consideration or allowance or special handling or other special steps (such as acquiring exclusive update permission for a replicated memory location) during transmission for detecting and resolving potentially conflicting transmissions by other machines, is not required. In otherwords, the abovedescribed use of associated "count value(s)" and "resolution values" with replicated memory locations, makes it possible to transmit "self-contained" replica memory updates to all receiving machines, where the values/information of such "self-contained" replica memory updates have all the necessary information to facilitate the detection and resolution of potential conflicting transmission (for a same replicated memory location) unknown to the transmitting machine at the time of transmission. Importantly, such "self-contained" replica memory updates comprising "count values" and "resolution values", may be transmitted by a sending machine without regard for potentially conflicting transmissions by one or more other machines, as such "self-contained" replica update transmissions (including "count values" and "resolution values") contain all the necessary information to facilitate the detection and resolution of conflicting updates of other machines for the same replicated memory location.

Consequently, each transmitting machine is able to operate independently and unfettered, and without requiring any "transmission authorization", transmission permissions (such as exclusive transmission permissions), exclusive update or write permissions or the like, and instead each transmitting machine (and each potentially simultaneously transmitting machine) may transmit replica memory updates whenever and however it chooses without regard for potential conflicting transmissions of other machines as the use of the abovedescribed methods are able to detect such potential conflicting transmissions on each receiving machine independently of each other machine, and resolve to a single common prevailing replica update transmission and associated updated replica value by the plural machines.

Thus, it will be appreciated by the reader, that the abovedescribed methods for replica update transmission (comprising "count values" and "resolution values") achieves a desired operating arrangement which allows the transmission of a single replica memory update transmission (such as a single message, cell, frame, packet, or other transmission unit) by a first transmitting machine whether or not such single transmission will ultimately "conflict" or contend with one or more other transmissions of one or more other machines. As a result, through the use of "count values" and "resolution values" as described above, transmitting machines may transmit single or plural replica memory updates at any time, and for any replicated memory location, to any one or more other machines regardless of whether or not such replica memory updates will or may conflict or contend with one or more other transmissions of one or more other machines.

Furthermore, it will be appreciated by the reader that the abovedescribed methods for replica update transmission (comprising "count values" and "resolution values") achieves an additional desired operating arrangement in which re-transmissions, re-tried transmissions, stalled transmissions or the like do not result from a condition of two or more update transmissions contending/conflicting.

Furthermore again, the abovedescribed methods for replica update transmission achieves a further desired operating arrangement/result in which, upon occasion of two or more conflicting replica update transmissions (such as a first replica update transmission of machine M1 for replicated memory location "A", and a conflicting second replica update transmission of machine M2 for the same replicated memory location "A"), that further ongoing replica update transmissions by machines M1 and M2 for either or both of the same replicated memory location "A", or any other replicated memory location(s), may continue in an uninterrupted and unhindered manner—specifically, without causing further/later replica memory update transmissions (including further/later update transmissions of replicated memory location "A") following such "conflicting" transmission(s) to be stalled, interrupted or delayed.

Furthermore again, the abovedescribed methods for replica update transmission achieves a further desired operating arrangement/result in which, upon occasion of two or more conflicting replica update transmissions (such as a first replica update transmission of machine M1 for replicated memory location "A", and a conflicting second replica update transmissions for machine M2 for the same replicated memory location "A"), will not effect the replica memory update transmissions of any other machine (for example, machines M3 . . . Mn) whether such other transmissions apply/relate to replicated memory location "A" or not. Thus, transmissions of other machines (for example, machines M3 . . . Mn) are able to also proceed and take place in an uninterrupted, unhindered and unfettered manner in the presence of (for example, substantially simultaneously to) two or more conflicting transmissions (such as of machines M1 and M2), even when such other transmissions of machines M3 . . . Mn relate/apply to replicated memory location "A".

Thus, the abovedescribed methods of detecting potentially conflicting or contending replica update transmissions addresses various problems.

Altogether, the operation of a multiple computer system comprising transmitting and receiving machines, and utilising the abovedescribed "count value" and "resolution value" to detect and resolve conflicting updates, will now be explained.

Figure 16:
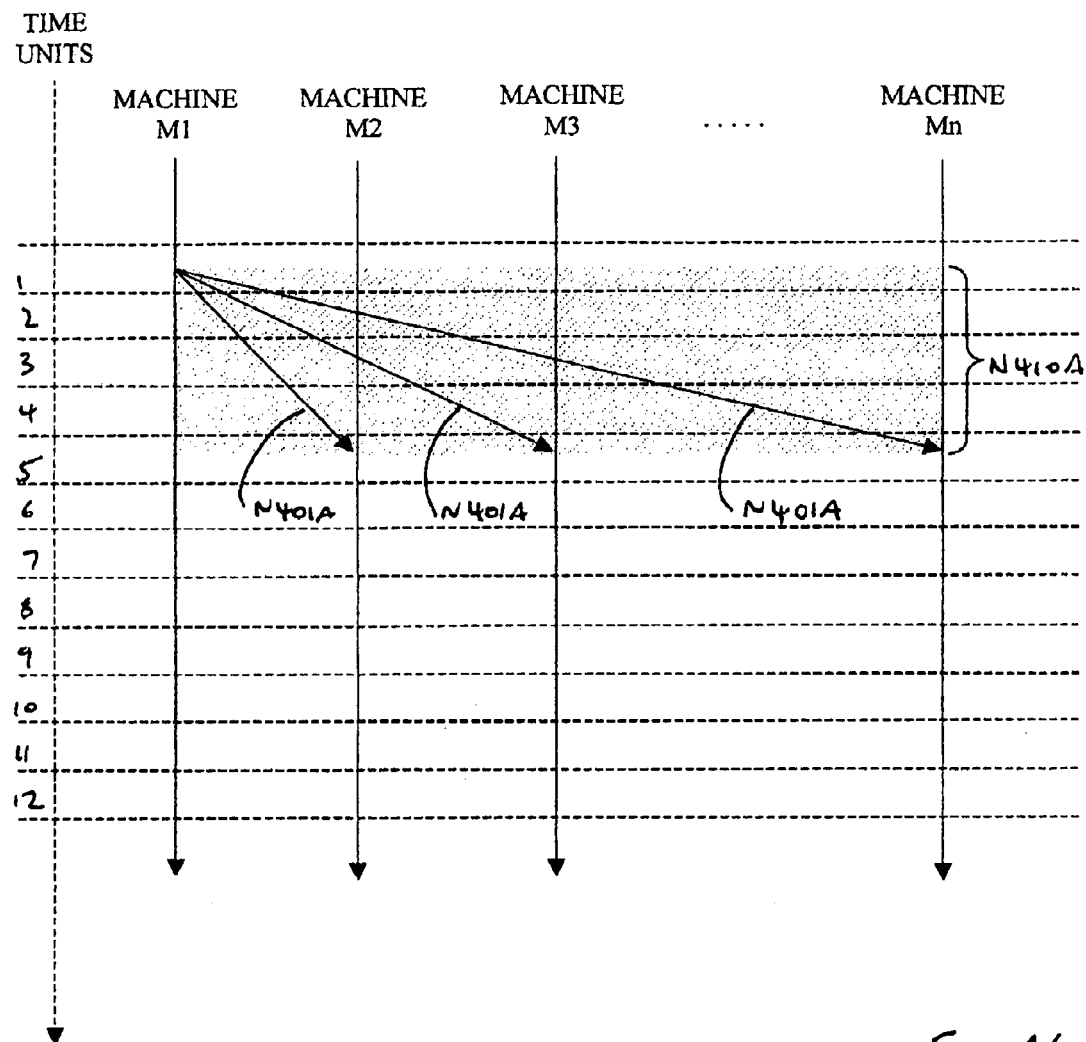

Turning now to FIG. 16, the example of FIGS. 9-10 is collectively illustrated in a time-diagram. Here, machine M1 transmits replica memory update N401A (which corresponds to replica update 73A of FIGS. 9 and 10) at time-unit 1, with the updated value "211" of address #15, the contention value ("count value") of "8" and the "resolution value" of "1", to machines M2, M3 . . . Mn on which corresponding replica memory locations reside.

Corresponding to transmission N401 by machine M1, in accordance with the abovedescribed rules, the "count value" of machine M1 of the updated replicated memory location/address #15 is incremented by 1 to become "8" (that is, the local/resident "count value" of "7" is incremented to become the new "count value" of "8"), and the "resolution value" is updated to become "1" (that is, the previous local/resident "resolution value" is overwritten with the new value of "1"). Replica memory update N401A is then transmitted to machines M2-Mn, taking the form of the updated value "211" of the written-to replicated memory location of machine M1 (that is, replicated memory location/address #15), the identity of the replicated memory location to which the updated value corresponds (that is, replicated memory location/address #15), the associated incremented "count value" of the replicated memory location to which the updated replica value corresponds (that is, the new resident "count value" of "8"), and the associated updated "resolution value" of the replicated memory location to which the updated replica value corresponds (that is, the new resident "resolution value" of "1").

Importantly, the specific choice of an updated integer/numeric value for the "resolution value" is not important to this invention, so long as the chosen numeric/integer value is a unique value to the transmitting machine, and for which no other replica update transmission sent by any other machine may have an identical "resolution value". In the examples of FIGS. 8-12, the numeric value chosen for each updated "resolution value" is the integer/numeric identifier of the transmitting machine (for example, the numeric value of "1" corresponding to replica update 73A transmitted by machine M1). So for example, were a replica update transmission to be sent by machine M5 for replicated memory location/address 16, then the associated "resolution value" for such replica update transmission would be a value of "5" corresponding to the numeric identity of machine M5 as the transmitting machine of such replica update transmission. Any other arrangement of values may be employed for use as "resolution values" of replica update transmissions and replicated memory locations, so long as each "resolution value" is unique to each transmitting machine and no two replica update transmissions from two machines may contain a same "resolution value".

However, as is indicated in FIG. 16, transmission N401A does not arrive at the receiving machines M2-Mn immediately (that is, at the same time-unit 1 of transmission). Instead, each receiving machine is indicated to receive replica update transmission N401A at time-unit 5 by the arrows shown for each machine M2-Mn. Thus, FIG. 16 illustrates a time-delay N410A that typically results between transmission and receipt of a replica memory update, due to latency and delay of the communications network used to interconnect and transmit the replica memory updates between the multiple computers of the multiple computer system. This period of delay, N410A, represents the "transmission latency/delay" between the sending or replica update transmission N401A by machine M1, and the receipt of the same replica update transmission N401A by machines M2-Mn.

Following transmission N401A by machine M1, the receiving machines M2-Mn each independently receive the transmission N401A, and proceed to independently "action" the received transmission according to the abovedescribed rules. Specifically, by comparing the "count value" of the received transmission N401A with the resident (local) "count value" of the corresponding replica memory location of each receiving machine (which is indicated to be "7" for all machines), it is able to be determined that the received "count value" of transmission N401A (that is, the count value "8") is greater than the resident "count value" of the corresponding replica memory location of each machine (that is, the resident count value "7").

As a result, the determination is made that the received updated value of transmission N401A is a newer value than the resident value of machines M2-Mn, and therefore receiving machines M2-Mn are permitted to update their local corresponding replica memory locations with the received updated replica value. Accordingly then, each receiving machine M2-Mn replaces the resident (local) "count value" of the local corresponding replica memory location with the received "count value" of transmission N401A (that is, overwrites the resident "count value" of "7" with the received "count value" of "8"), and also replaces the resident (local) "resolution value" of the local corresponding replica memory location with the received "resolution value" of transmission N401A (that is, overwrites the resident "resolution value" of "2" with the received "resolution value" of "1"), and updates the local corresponding replica memory location with the received updated replica memory location value (that is, overwrites the previous value "107" with the received value "211").

Thus, the use of the "count value" as described, allows a determination to be made at the receiving machines M2-Mn that the transmitted replica update N401A of machine M1 is newer than the local resident value of each receiving machine. Therefore, machines M2-Mn are able to be successfully updated in a consistent and coherent manner with the updated replica value of transmission N401A, and thus consistent and coherent updating of replicated memory location(s) is achieved.

Figure 17:
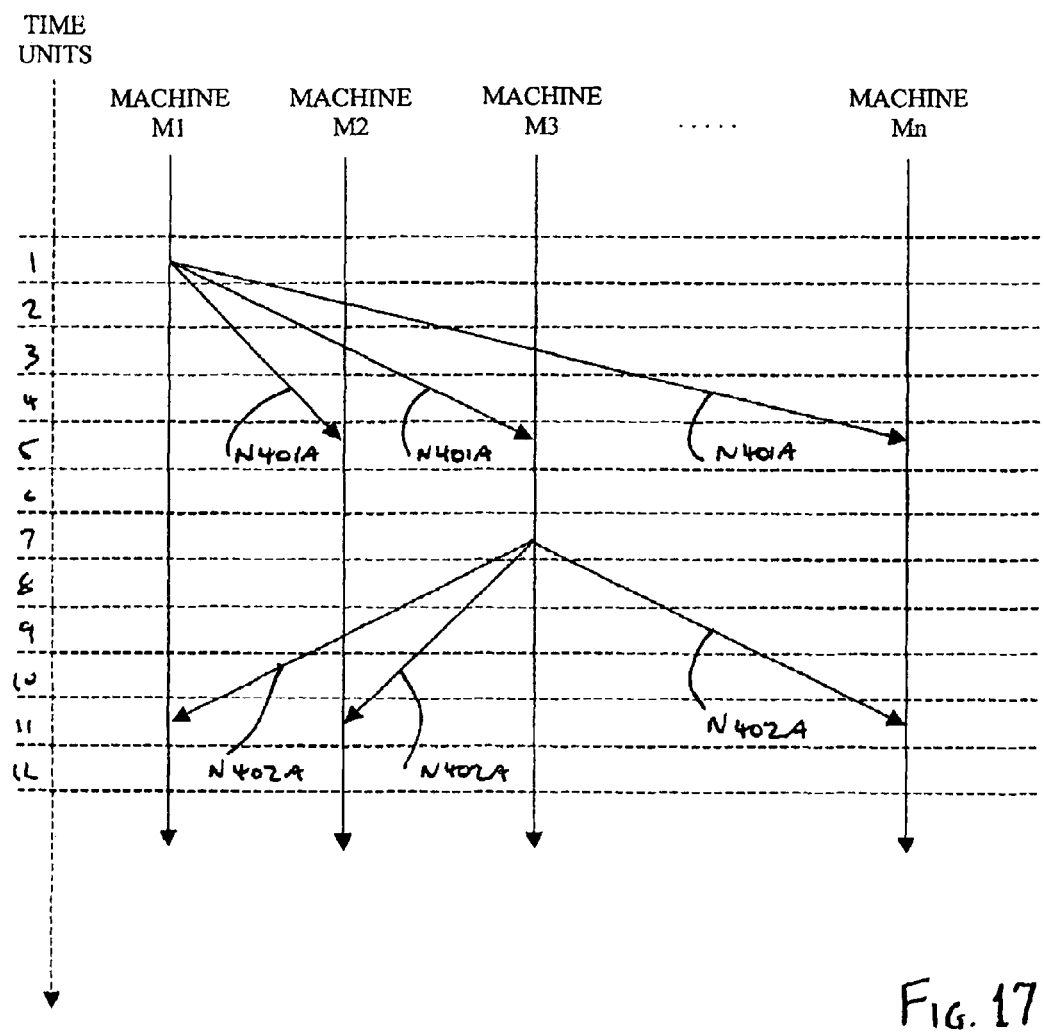

For example, consider FIG. 17. FIG. 17 follows on from FIG. 16, where at time-unit 7, and following receipt of transmission N401A, machine M3 transmits replica memory update N402A, with the updated value "999" of address #15, the updated "count value" of "9" and the "resolution value" of "3" to machines M1, M2, M4 . . . Mn. Specifically, the additional transmissions N402A by machine M3 to machines M1, M2, M4 . . . Mn is a transmission of an updated replica value generated by the operation of machine M3 for the same replicated memory location updated by transmission N401A (that is, replicated memory location/address #15).

Corresponding to transmission N402A by machine M3, in accordance with the abovedescribed rules the "count value" of machine M3 of the updated replicated memory location/address #15 is incremented by 1 to become "9" (that is, the resident "count value" of "8" is incremented to become the new "count value" of "9"), and the "resolution value" is updated with the value "3" (corresponding to the numerical identity of machine M3). Replica memory update N402A is then transmitted to machines M1, M2, M4 . . . Mn, comprising the updated value "999" of the written-to replicated memory location of machine M3 (that is, replicated memory location/address #15), the identity of the replicated memory location to which the updated value corresponds (that is, replicated memory location/address #15), the associated incremented "count value" of the replicated memory location to which the updated value corresponds (that is, the new resident "count value" of "9"), and the associated "resolution value" of "3" (as a unique numerical identity corresponding to machine M3).

Next, at time-unit 11 is indicated that machines M1, M2, M4 . . . Mn receive transmission N402A, and proceed to independently "action" the received transmission according to abovedescribed rules in a similar manner to the actioning of the received transmission N401A by machines M2-Mn. Specifically, by comparing the "count value" of the received transmission N402A with the resident (local) "count value" of the corresponding replica memory location of each receiving machine (which is indicated to be "8" for all machines), it is able to be determined that the received "count value" of transmission N402A (that is, the count value "9") is greater than the resident "count value" of the corresponding replica memory location of each machine (that is, the resident count value "8").

As a result, the determination is made that the received updated value of transmission N402A is a newer value than the resident value of machines M1, M2, M4-Mn, and therefore machines M1, M2, M4-Mn are permitted to update their local corresponding replica memory locations with the received updated replica value. Accordingly then, each receiving machine M1, M2, M4-Mn replaces the resident (local) "count value" of the local corresponding replica memory location with the received "count value" of transmission N402A (that is, overwrites the resident "count value" of "8" with the received "count value" of "9"), replaces the resident (local) "resolution value" of the local corresponding replica memory location with the received "resolution value" of transmission N402A (that is, overwrite the resident "resolution value" of "1" with the received "resolution value" of "3"), and updates the local corresponding replica memory location with the received updated replica memory location value (that is, overwrites the previous value "211" with the received value "999").

Thus, the use of the "count value" as described, allows a determination to be made at the receiving machines M1, M2, M4 . . . Mn that the transmitted replica update N402A of machine M3 is newer than the local resident value of each receiving machine. Therefore, machines M1, M2, M4 . . . Mn are able to be successfully updated in a consistent and coherent manner with the updated replica value of transmission N402A, and coherent updating of replicated memory location(s) is achieved.

Critically, what is accomplished through the use of an associated "count value" for each replica memory location (or set of replica memory locations), is that such "count value" may be used to signal when a replica update is newer or older (or neither newer nor older) than a replica memory location value already resident on a receiving machine. As can be seen in FIGS. 16 and 17, the first transmission N401A of machine M1 has a count value of "8", which is subsequently received by machines M2-Mn. Some time subsequent to the receipt of transmission N401A by machine M3 (e.g. time-unit 7), machine M3 transmits a replica update of a new value for the same replicated memory location of transmission N401A (that is, replicated memory location/address #15), and consequently associates with such transmission N402A a new "count value" of "9", indicating that such transmission N402A is "newer" (or "later") than transmission N401A (which had a "count value" of "8").

As a result, by using the abovedescribed methods, it is able to be ensured that for example were transmission N401A to be received by a machine (such as machine M2) after receipt of transmission N402A by the same machine (e.g. machine M2), that the "late" received transmission N401A would not cause the replica memory location value of machine M2 (in which is stored the value of the previously received transmission N402A) to be overwritten with the "older" (or "earlier") value of transmission N401A. This is because, in accordance with abovedescribed operation of "count values", the resident "count value" of machine M2 for replicated memory location/address #15 after receipt of transmission N402A would have been overwritten to become "9". Therefore upon receiving transmission N401A with a "count value" of "8" after receipt and actioning of transmission N402A, in accordance with the abovedescribed "count value" rules, such received transmission N401A would not cause the local replica memory location #15 of machine M2 to be updated with the received updated value of transmission N401A as the "count value" of transmission N401A would be less than the resident "count value" of "9" resulting from the previous receipt and actioning of transmission N402A. Thus, consistent and coherent replica updating is achieved.

Figure 11:
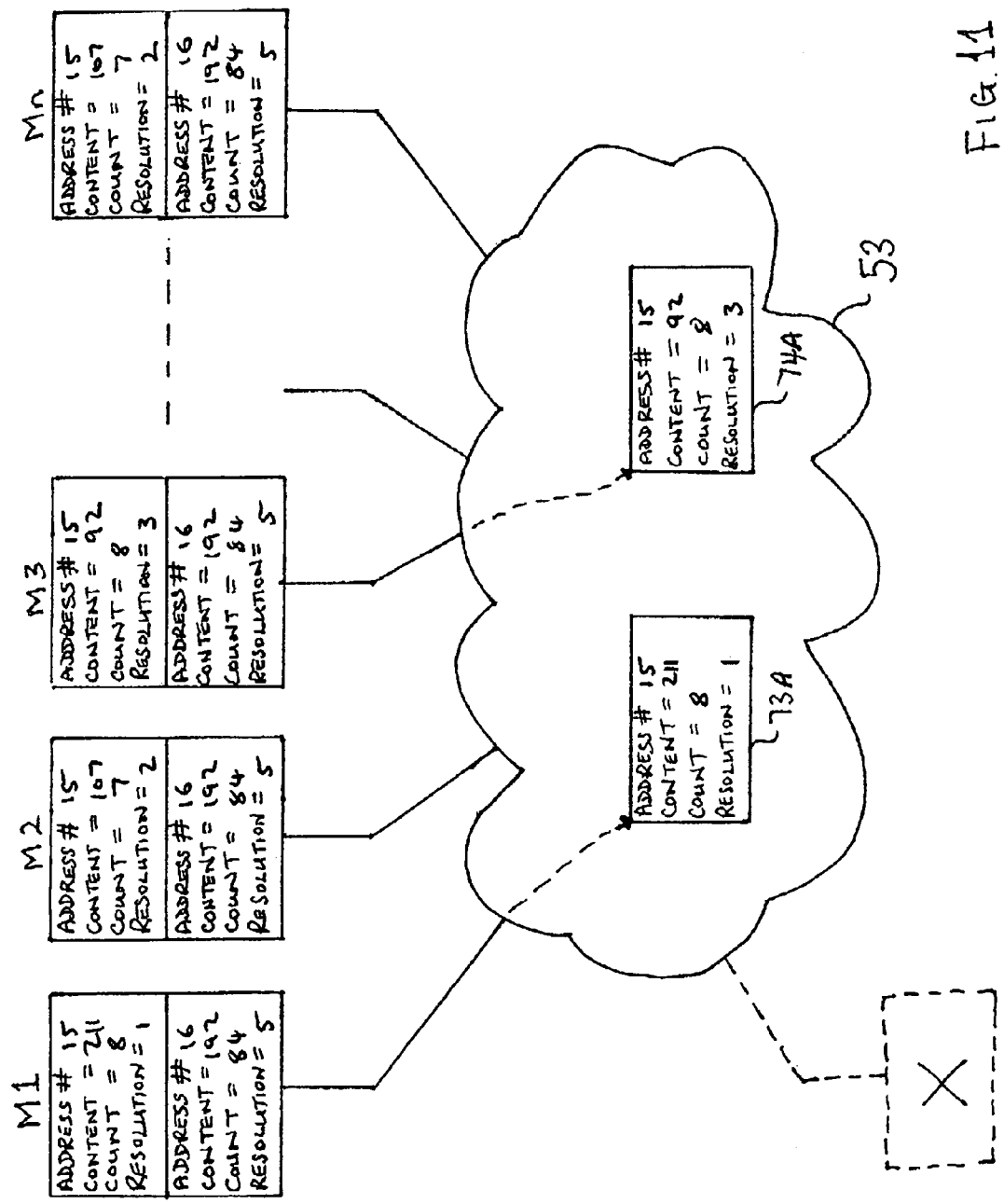

FIG. 11 illustrates what happens in the circumstance discussed above in relation to FIG. 6 where two (or more) machines M1 and M3 simultaneously, or substantially simultaneously, update the same replicated memory location/address. As in FIG. 10, machine M1 in executing its portion of the application program causes the contents of replicated memory location/address #15 to be written with a new content "211". As a result, the "count value" associated with replicated memory location/address #15 is incremented from "7" to "8", the "resolution value" is overwritten with a new value of "1" (corresponding to the numerical identity of machine M1), and message 73A is sent via the network 53 to all other machines M2, M3, . . . Mn comprising the updated value of replicated memory location/address #15 (that is, "211"), the identity of the written-to replicated memory location (that is, address #15), the associated incremented "count value" (that is, "8"), and the associated updated "resolution value" (that is "1"). Substantially simultaneously, machine M3 in executing its portion of the application program writes a new content "92" to the same replicated memory location/address #15, and as a result similarly increments its "count value" from "7" to "8", overwrites its "resolution value" with a new value of "3" (corresponding to the numerical identity of machine M3), and sends a message 74A containing these particulars (that is, the identity of the written-to replicated memory location, the updated value of the written-to replicated memory location, the associated incremented "count value", and the associated updated "resolution value") to all other machines M1, M2, M4, M5, . . . Mn. This is the situation illustrated in FIG. 11.

Figure 12:
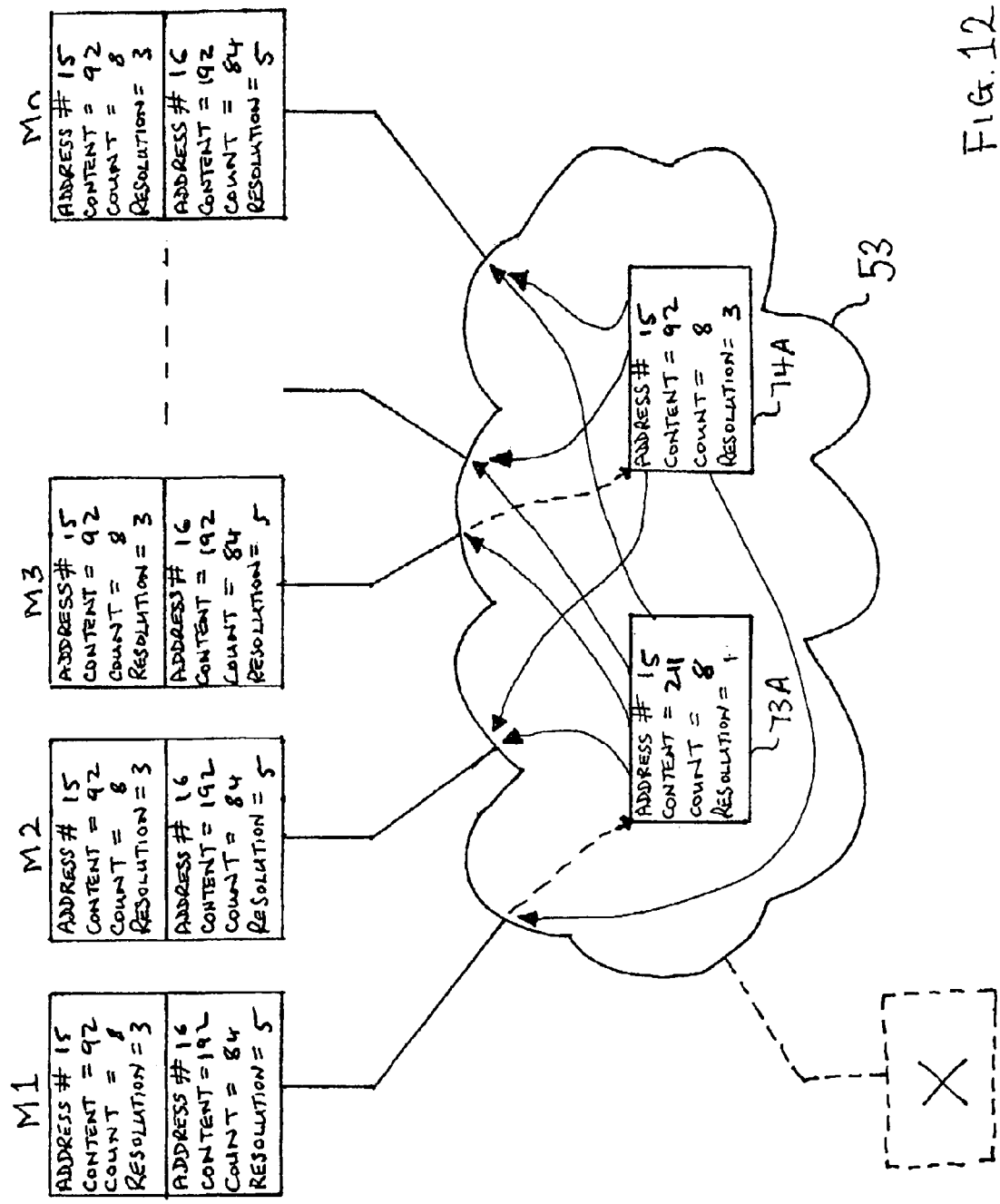

The consequence of the situation illustrated in FIG. 11 is illustrated in FIG. 12. As in FIG. 7, machines M2, M4, M5 . . . Mn which did not initiate any/either message will have received a first one of either messages 73A or 74A (in either order), and proceed to "action" such first received transmission in accordance with the abovedescribed methods. Specifically, regardless of whether message 73A or 74A is received first, such first received message will cause the updating of the local corresponding replica memory location, as such first received message will have a "count value" of "8" which is greater than the resident "count value" of "7" for each of the receiving machines (that is, the value of the first received transmission is deemed newer than current value of the local corresponding replica memory location). Therefore, in actioning the first received message/transmission, the resident "count value" will be caused to be overwritten from "7"

to "8", the resident "resolution value" will be caused to be overwritten with the received updated "resolution value" of the first received transmission, and the local corresponding replica memory location will be update/replaced (e.g. overwritten) with the received updated value of the first received transmission. Consequently, following such actioning of the first received transmission, the content stored (or overwritten) at the local memory corresponding to replicated memory location/address #15 will be either 211 or 92 depending upon which one of messages 73A or 74A is received first, the associated local/resident "count value" will be "8", and the associated local/resident "resolution value" will be either "1" or "3" depending upon which one of messages 73A or 74A respectively is received first.

However, upon occasion of each receiving machine M2, M4, M5 . . . Mn receiving the second of the two transmissions/messages 73A and 74A, and proceeding to "action" such second received transmission in accordance with the abovedescribed methods, a condition-of "conflict"/"contention" will be detected between the "count value" of the second received transmission and the corresponding local/resident "count value". Specifically, in actioning the second received message/transmission, a comparison of the resident "count value" (with a value of "8"), and the "count value" of the second received transmission (also with a value of "8"), will result in a determination that the second received transmission "conflicts"/"contends" with the resident "count value". Therefore, upon receipt and actioning of the second received transmission/message, each receiving machine M2, M4, M5 . . . Mn is able to detect and signal a condition of "conflict" between the first and second received transmissions, by detecting a "conflict" between the updated resident "count value" resulting from the actioning of the first received transmission, and the "count value" of the second received transmission (both values of which are identical).

It will thus be appreciated that the machines M2, M4, M5, . . . Mn having received the first one of messages 73A and 74A and thereby having an updated "count value" of "8" (resulting from the actioning of such first received message), when they receive the second of the messages 73A and 74A will have a resident "count value" which is the same as the "count value" of the second received message. Thus these machines can detect and signal contention.

However, for machines M1 and M3, each of which transmits message 73A and 74A respectively, only a single message will be received (that is, the other one of the two transmitted messages 73A and 74A). Specifically, in accordance with the abovedescribed methods, upon occasion of transmission of messages 73A and 74A by machines M1 and M3 respectively, each transmitting machine increments the local/resident "count value" for replicated memory location/address #15 (for example, from a value of "7" to a value of "8") and stores the incremented count value to overwrite/replace the previous resident "count value", and also transmits the incremented "count value" within (or otherwise a part of or associated with) message 73A and 74A respectively. Thus, upon transmission of messages 73A and 74A by machines M1 and M3 respectively, each transmitting machine (that is, machines M1 and M3) will each have a local/resident "count value" of "8" for replicated memory location/address #15 corresponding to the transmission of replica memory update message 73A and 74A respectively.

Thus by comparing the resident "count value" with the received "count value" of message 74A (by means of a comparator, for example) machine M1 is able to detect and signal that a "conflict"/"contention" situation has arisen because it detects the situation where the incoming message 74A contains a "count value" (that is, a "count value" of "8") which is identical to the existing state of the resident "count value" associated with replicated memory location/address #15 (which is also a "count value" of "8").

Similarly, machine M3 on receipt of message 73A also receives an incoming message with the same "count value" as the corresponding resident "count value". Thus, machine M3 is also able to detect and signal that a "conflict"/"contention" situation has arisen because it detects the situation where the incoming message 73A contains a "count value" (that is, a "count value" of "8") which is identical to the existing state of the resident "count value" associated with replicated memory location/address #15 (which is also a "count value" of "8").

It will thus be appreciated that the two transmitting machines M1 and M3 having transmitted messages 73A and 74A respectively, and thereby having an incremented "count value" of "8" (resulting from the transmission of the respective one of messages 73A and 74A), when they receive message 74A and 73A respectively will have a resident "count value" which is the same as the "count value" of the received message. Thus these machines too can detect and signal contention.

Corresponding to detection of such a contention situation by a receiving machine, where a received replica memory update transmission "contends" (or "conflicts") with the local/resident replica value (and associated local/resident "count value"), the associated "resolution value" of the received conflicting replica update transmission and the local/resident "resolution value" of the local replica memory location may be used together to resolve the conflict between the received replica update transmission and local resident value. Specifically, such a contention situation can be resolved by comparing the two "resolution values" (that is, the resident/local "resolution value" and the "resolution value" of the received conflicting transmission) according to specific resolution rules in order to chose a single "prevailing" resolution value, and therefore a prevailing replica update value (that is, the associated/corresponding replica update value of the prevailing "resolution value").

For example, in FIGS. 8-12, the employed resolution rules are as simple as the selection of the higher of the two compared "resolution values". In the situation of FIGS. 8-12, where the "resolution value" of a replica memory update transmission corresponds to the numerical identity of the transmitting machine, the consequences of the abovementioned simple resolution rule is that the replica update transmissions sent by the numerically highest identity machine will prevail. However, in alternative embodiments, any other rules or methods may be employed to chose a "prevailing" resolution value from two compared "resolution values" (that is, the "resolution value" of the received conflicting replica update transmission and the corresponding local/resident "resolution value"). Thus, any resolution rules or methods different to the ones described herein may alternatively be used and employed that will consistently chose a same prevailing value when comparing two "resolution values".

Returning-then to FIG. 12, upon occasion of each receiving machine M2, M4, M5 . . . Mn receiving the second of the two transmissions 73A and 74A, and proceeding to "action" such second received transmission in accordance with the abovedescribed methods, a condition of "conflict" will be detected between the updated "count value" of the first received transmission and the "count value" of the second received transmission, but by using the associated "resolution values" and the abovedescribed simple resolution rule, updating of replicated memory locations in a consistent manner can be achieved. Specifically, upon detecting a situation of "contention" between a second received replica update transmission and the resident/local replica value (as detected by the use of the associated "count values"), the associated "resolution values" (that is, the "resolution value" of the received conflicting replica update transmission and the local/resident "resolution value") may be compared in accordance with the abovedescribed simple resolution rule (or any other alternatively employed resolution rule) to chose a single prevailing replica update value—that is, either the local/resident replica update value, or the received replica update value of the received conflicting replica update transmission.

For example, were machine M2 to receive replica update transmission 74A as the second received replica update transmission (and therefore, replica update transmission 73A as the first received replica update transmission), and detect the second received transmission 74A as "contending"/"conflicting" with the resident replica value (that is, the resident replica value update by the first received transmission 73A), then by comparison of the local/resident "resolution value" and the received "resolution value" according to the abovedescribed simple rules, a determination would be made that the received replica update transmission 74A comprising the resolution value of "3" would prevail over the resident/local resolution value of "1" from the previous transmission 73A (as resolution value "3" is greater than resolution value "1"). As a result, the local corresponding replica memory location of machine M2 would be updated with the new replica update value "92" received from replica update transmission 74A, and the corresponding local/resident "resolution value" would be replaced with the received value of "3".

Alternatively, were machine M2 (or any other one of machines M4 . . . . Mn) to receive replica update transmission 73A as the second received replica update transmission (and therefore, replica update transmission 74A as the first received replica update transmission), and detect the second received transmission 73A as "contending"/"conflicting" with the resident replica value (that is, the resident replica value updated by the first received transmission 74A), then by comparison of the local/resident "resolution value" and the received "resolution value" according to the abovedescribed simple rules, a determination would be made that the received replica update transmission 73A comprising the resolution value of "1" would not prevail over the resident/local "resolution value" of "3" from the previous transmission 74A (as resolution value "1" is less than resolution value "3"). As a result, the local corresponding replica memory location of machine M2 would not be updated with the second received replica update value "211" received from replica update transmission 73A, and the corresponding local/resident "resolution value" would not be replaced with the received "resolution value" of "1".

Thus, regardless of the receipt order of conflicting replica update transmissions 73A and 74A by machines M2, M4 . . . Mn, the use of the associated "resolution value" and corresponding resolution rules enables the consistent updating of replicated memory locations to be achieved, so that the corresponding replica memory locations of each of the receiving machines M2, M4 . . . Mn are ultimately updated to remain substantially similar upon receipt of both transmissions 73A and 74A.

Similarly, the abovedescribed methods and rules of comparing "resolution values" for each of the receiving machines M2, M4 . . . Mn, also applies to each of the transmitting machines M1 and M3. Specifically, upon occasion of each transmitting machine M1 and M3 receiving the transmission 74A and 73A of the other machine respectively, and proceeding to "action" such received transmission in accordance with the abovedescribed methods, a condition of "conflict" will be detected between the resident/local "count value" and the "count value" of the received transmission of the other transmitting machine, but by using the associated "resolution values" and the abovedescribed simple resolution rule, updating of replicated memory locations in a consistent manner can be achieved. Specifically, upon detecting a situation of "contention" between a received replica update transmission and the resident/local replica value (as detected by the use of the associated "count values"), the associated "resolution values" (that is, the "resolution value" of the received conflicting replica update transmission and the local/resident "resolution value") may be compared in accordance with the abovedescribed simple resolution rule (or any other alternatively employed resolution rule) to chose a single prevailing replica update value—that is, either the local/resident replica update value, or the received replica update value of the received conflicting replica update transmission.

For example, when machine M1 receives replica update transmission 74A of machine M3, and detect such received transmission 74A as "contending"/"conflicting" with the resident replica value (that is, the resident replica value updated by machine M1's transmission of replica update transmission 73A), then by comparison of the local/resident "resolution value" and the received "resolution value" according to the abovedescribed simple rules, a determination would be made that the received replica update transmission 74A comprising the resolution value of "3" would prevail over the resident/local resolution value of "1" (as resolution value "3" is greater than resolution value "1"). As a result, the local corresponding replica memory location of machine M1 would be updated with the new replica update value "92" received from replica update transmission 74A, and the corresponding local/resident "resolution value" would be replaced with the received value of "3".

Alternatively, when machine M3 receives replica update transmission 73A of machine M1, and detect such received transmission 73A as "contending"/"conflicting" with the resident replica value (that is, the resident replica value updated by machine M3's transmission of replica update transmission 74A), then by comparison of the local/resident "resolution value" and the received "resolution value" according to the abovedescribed simple rules, a determination would be made that the received replica update transmission 73A comprising the resolution value of "1" would not prevail over the resident/local "resolution value" of "3" (as resolution value "1" is less than resolution value "3"). As a result, the local corresponding replica memory location of machine M3 would not be updated with the received replica update value "211" received from replica update transmission 73A, and the corresponding local/resident "resolution value" would not be replaced with the received "resolution value" of "1".

Thus, the use of the associated "resolution value" and corresponding resolution rules enables the consistent updating of replicated memory locations to be achieved for each of the transmitting machines M1 and M3, so that the corresponding replica memory locations of each of the transmitting machines M1 and M3 are ultimately updated to remain substantially similar upon receipt of both transmissions 74A and 73A respectively.

Thus altogether, the use of the associated "resolution value" and corresponding resolution rules as described above for both receiving and transmitting machines, enables the consistent updating of replicated memory locations to be achieved.

Figure 18:
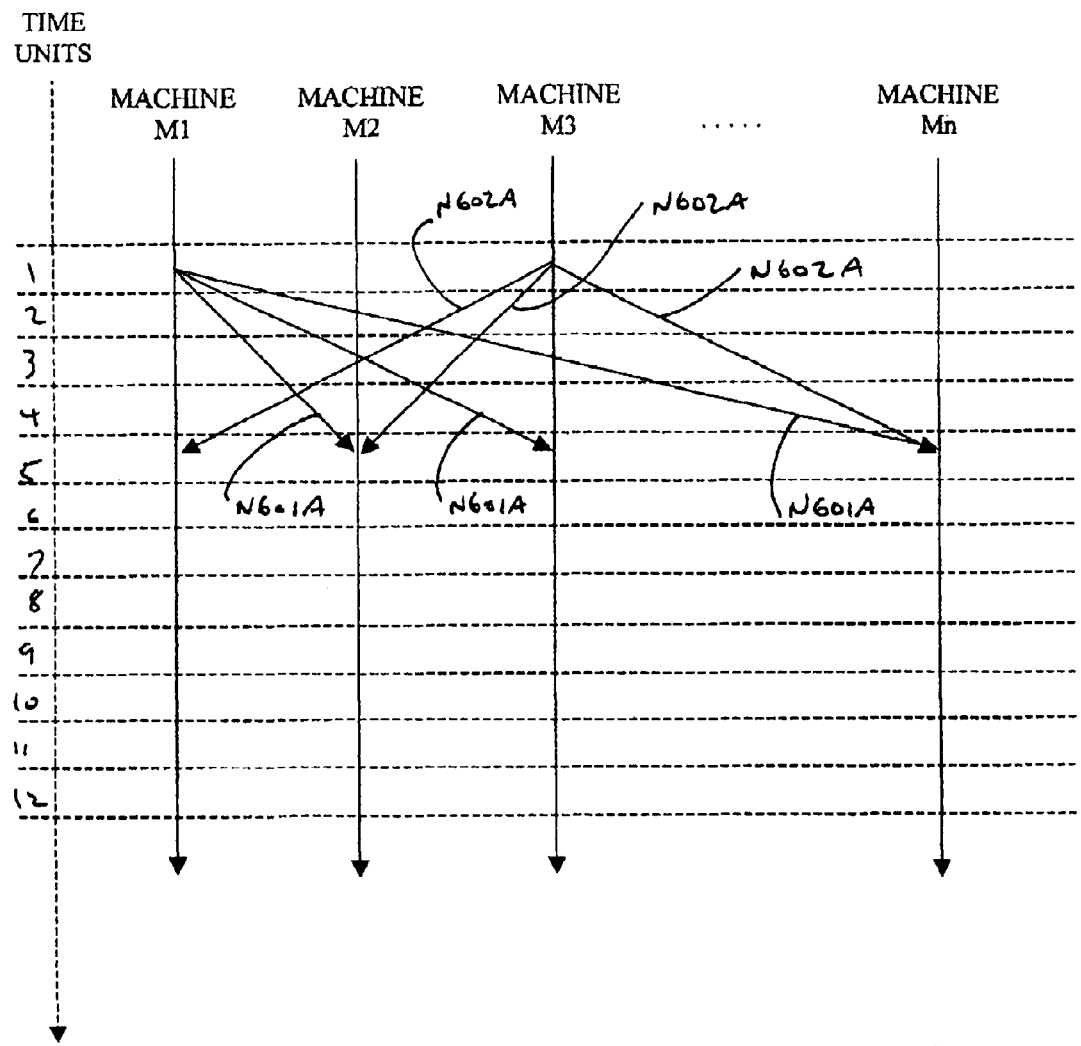

Turning thus to FIG. 18, the example of FIGS. 11-12 is collectively illustrated in a time-diagram. Here, machine M1 transmits replica memory update N601A (which corresponds to replica update 73A of FIGS. 11 and 12), with the updated value "211" of address #15, the contention value ("count value") of "8", and the "resolution value" of "1", to machines M2, M3 . . . Mn on which corresponding replica memory locations reside. Also, substantially simultaneously/concurrently machine M3 also transmits a replica memory update N602A (which corresponds to replica update 74A of FIGS. 11 and 12), with the updated value "92" of the same address #15, the contention value ("count value") of "8", and the "resolution value" of "3", to machines M1, M2, M4 . . . Mn on which corresponding replica memory locations reside.

Also, as is indicated in FIG. 18, transmissions N601A and N602A do not arrive at the receiving machines immediately (that is, at the same time-unit 1 of transmission). Instead, each receiving machine is indicated to receive replica update transmissions N601A and N602A at time-unit 5 by the arrows shown for each machine M1-Mn.

However, unlike the case of FIGS. 6 and 7, the use of the associated "count value" and "resolution value" for transmissions N601A and N602A together with the resident "count values" and "resolution values" of each receiving machine, is able to detect and resolve the two conflicting/contending replica update transmissions N601A and N602A. Specifically, regardless of which replica update transmission N601A or N602A is received first by machines M2, M4 . . . Mn, each machine will independently be able to detect that the second of the two received transmissions conflicts/contends with the first received transmission, and resolve the local corresponding replica memory value to a common and consistent updated replica memory value of a same prevailing one of the two conflicting transmissions (that is, the prevailing replica update transmission 74A of machine M3).

Furthermore, each transmitting machine M1 and M3, will independently be able to detect that the received transmission of the other machine conflicts/contends with the local value of the receiving machine, and resolve the local corresponding replica memory value to a common and consistent updated replica memory value of a the same prevailing one of the two conflicting transmissions (that is, the prevailing replica update transmission 74A of machine M3).

Thus, by using the abovedescribed methods of this invention to associate "count value(s)" and "resolution value(s)" with replicated memory location(s), and by using the rules described herein for the operation and comparison of such "count value(s)" and "resolution value(s)", consistent updating of replica memory locations of plural machines may be achieved, and detection and resolution of conflicting/contending replica update transmissions may also achieved.

Thus it will be seen from the above example that the provision of the "count value(s)" and "resolution value(s)" in conjunction/association with replicated memory location(s) provides a means by which contention between plural replica update transmissions for a same replicated memory location can be detected and resolved, and consistent updating of replicated memory locations be achieved/ensured.

Thus the provision of the "count value" and the provision of a simple rule, namely that incoming messages with updating content of a replicated memory location are valid if the resident "count value" is less than the received "count value", but are invalid if the resident "count value" is greater than the received "count value", enables consistent updating of replicated memory locations to be achieved.

Furthermore, the provision of the "count value" and "resolution value" and the provision of a further simple rule, namely that incoming messages with updating content of a replicated memory location are valid (that is, are to update the local corresponding replica memory location) if the resident "count value" and the received "count value" are equal and the received "resolution value" compared to the resident "resolution value" is determined according to the chosen/operated resolution rules to be the "prevailing value" (such as for example, a replica update transmission sent by a machine with a higher numerical identity prevailing against a replica update transmission sent by a machine with a lower numerical identity, and thereby causing the local corresponding replica memory location to be updated), enables consistent updating of replicated memory locations to be achieved (even in the presence of "conflicting" or "contending" replica update transmissions). Stated conversely, incoming messages with updating content of a replicated memory location are invalid (that is, are not to update the local corresponding replica memory location) if the resident "count value" and the received "count value" are equal but the received "resolution value" compared to the resident "resolution value" is determined according to the chosen/operated resolution rules not to be the "prevailing value" (such as for example, a replica update transmission sent by a machine with a lower numerical identity not prevailing against a replica update transmission sent by a machine with a higher numerical identity, and thereby not causing the local corresponding replica memory location to be updated).

Thus, as illustrated in FIGS. 11-12 and 18, when a replica update message/transmission is received with the same "count value" as the local/resident corresponding "count value", then the "resolution value" may be used to determine whether the received "conflicting" replica update transmission is to "prevail" or not (that is, will cause the local corresponding replica memory location(s) to be updated with the received replica update value). If a determination is made that such received conflicting replica update transmission does "prevail", then the update replica value, count value, and resolution value associated with such received conflicting replica update transmission is to replace/overwrite the corresponding local/resident replica value, count value, and resolution value of the receiving machine. Alternatively, if a determination is made that such received conflicting replica update transmission does not "prevail", then the local/corresponding replica value, count value, and resolution value is not to be updated with the received replica update value, count value, and resolution value, and instead the received replica memory update transmission is to be discarded or ignored or otherwise not updated to local memory. Altogether then, using the methods of the present invention, the situation of inconsistent replica updating illustrated in FIG. 7 is avoided and consistent updating of replica memory locations is achieved.

Figure 19:
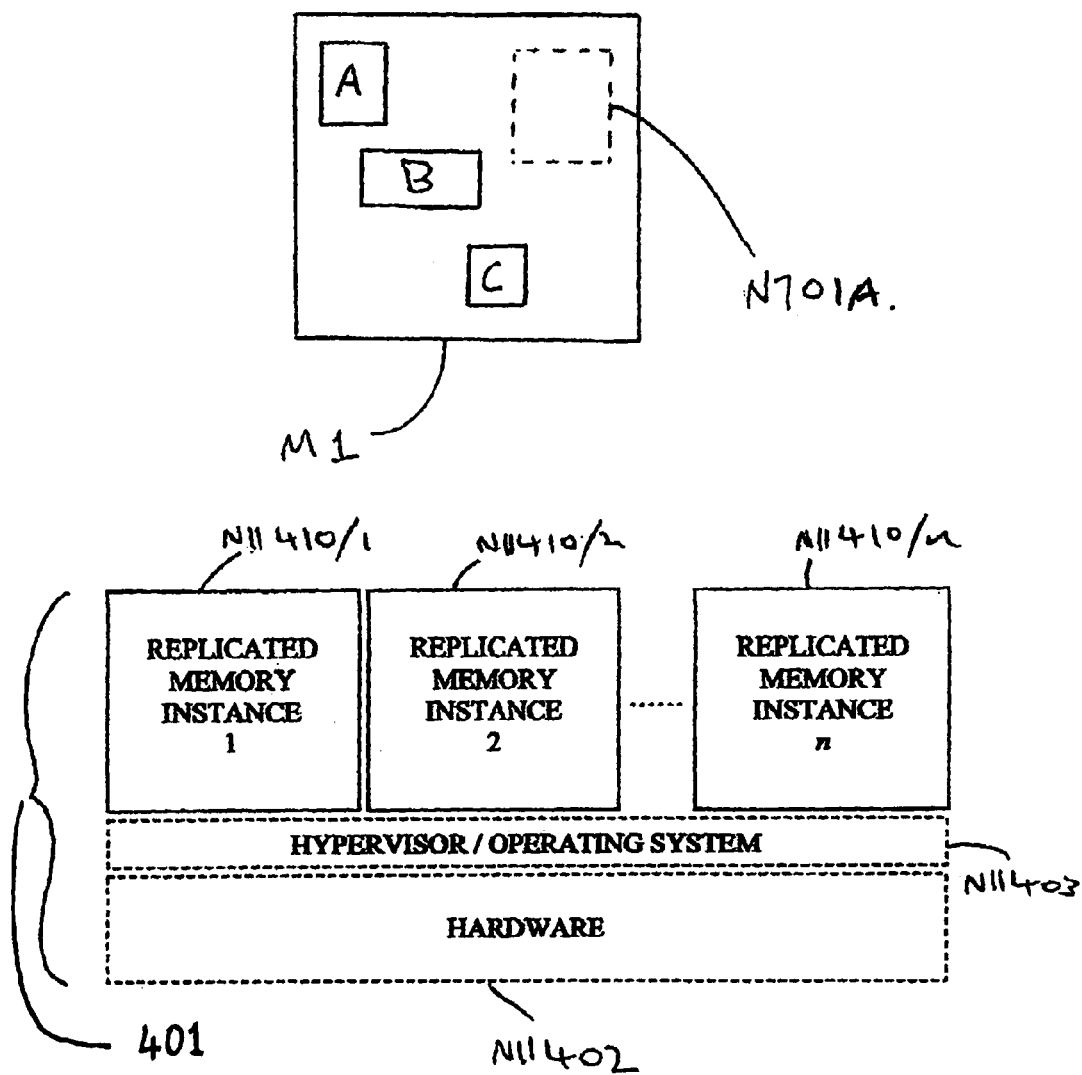
FIG. 19 illustrates a preferred arrangement of storing "count values"

Additionally provided is a preferred further improved arrangement of storing "count values" and "resolution values" corresponding to replica memory locations. Specifically, "count vales" and "resolution values" are preferably stored in such a manner so as to be inaccessible by the application program such as by the application program code. FIG. 19 describes this further preferred storage arrangement.

FIG. 19 depicts a single machine M1 of the plurality of machines depicted in FIG. 2. The other machines (M2-M4) have been omitted from this drawing for simplicity of illustration, though the depiction of the preferred storage arrangement of FIG. 19 is applicable to all such machines of such a plurality (such as machines M2-Mn of FIG. 2), as well as any other replicated, distributed, or multiple computer system arrangement.

Specifically, indicated in FIG. 19 is the memory of machine M1 in which is indicated a non-application memory region N701A, indicated as a dotted square. Such memory is preferably inaccessible to the application program executing on machine M1, in contrast to memory locations A, B and C, and the dotted outline is used in this drawing to indicate this and differentiate it from the accessible memory locations A, B and C.

In the preferred arrangement depicted in FIG. 19, the "count value(s)" and "resolution values" are stored in such a non-application memory region, so as to be inaccessible to the application program and application program code.

Various memory arrangements and methods for non-application-accessible memory regions is know in the prior art, such as using virtual memory, pages, and memory management units (MMUs) to create memory spaces or regions or address-ranges inaccessible to specific instructions or code (such as for example application program code). Other arrangements are also known in the prior art, such as through the use of namespaces, software or application domains, virtual machines, and segregated/independent memory heaps, and all such memory partitioning, segregation and/or memory access-control methods and arrangements are to be included within the scope of the present invention.

Such an arrangement is preferable so that the "count values" and "resolution values" stored in the non-application memory region N701A are not able to be tampered with, edited, manipulated, modified, destroyed, deleted or otherwise interfered with by the application program or application program code in an unauthorized, unintended, unexpected or unsupported manner.

Though only a single non-application memory region is indicated in FIG. 19, more than one non-application memory region may be used, and any such multi-region arrangement is to be considered included within the scope of the present invention.

In at least one embodiment of this invention, one, some, or all "count value(s)" and "resolution values" of a single machine, may be stored in internal memory, main memory, system memory, real-memory, virtual-memory, volatile memory, cache memory, or any other primary storage or other memory/storage of such single machine as may be directly accessed (or accessible) to/by the central processing unit(s) of the single machine.

Alternatively, in at least one further alternative embodiment of this invention, one, some, or all "count value(s)" and "resolution values" of a single machine, may be stored in external memory, flash memory, non-volatile memory, or any other secondary storage or other memory/storage of such single machine as may not be directly accessed (or accessible) to/by the central processing unit(s) of the single machine (such as for example, magnetic or optical disk drives, tape drives, flash drives, or the like).

Alternatively again, in at least one further alternative embodiment of this invention, some first subset of all "count value(s)" and "resolution values" of a single machine may be stored in internal memory, main memory, system memory, real-memory, virtual-memory, volatile memory, cache memory, or any other primary storage or other memory/storage of such single machine as may be directly accessed (or accessible) to/by the central processing unit(s) of the single machine, and some other second subset of all "count value(s)" and "resolution values" of the single machine may be stored in external memory, flash memory, non-volatile memory, or any other secondary storage or other memory/storage of such single machine as may not be directly accessed (or accessible) to/by the central processing unit(s) of the single machine (such as for example, magnetic or optical disk drives, tape drives, flash drives, or the like). Further alternatively again, in at least one further alternative embodiment of this invention, "count value(s)" and "resolution values" of such first subset and such second subset may be moved between/amongst (e.g. moved from or to) such first and second subsets, and thereby also moved between/amongst (e.g. moved from or to) such internal memory (e.g. primary storage) and such external memory (e.g. secondary storage).

Importantly, the above-described method of actioning replica update messages comprising a "count value" and a "resolution value" associated with an updated value of a replicated memory location, makes possible the detection, or the ability to detect, the occurrence of two or more conflicting replica update messages for a same replicated memory location. Furthermore, such "actioning" of received replica update messages by each receiving machine may occur independently of each other machine (and potentially at different times and/or different orders on different machines), and without additional communication, confirmation, acknowledgement or other communications of or between such machines to achieve the actioning of each received transmission.

For a plurality of corresponding replica memory locations of a plurality of machines (one of each corresponding replica memory locations on each one of such machines), there is only a single "count value" and "resolution value", and not multiple "per-machine" count-values or resolution-values—such as for example, a unique "count value" and/or "resolution value" of machine M1 for replica memory location A, and a second and different "count value" and/or "resolution value" of machine M2 for replica memory location A. As a result, each machine does not need to store multiple "count values" and/or "resolution values" for a single replica memory location (such as for example machine M1 storing a copy of machine M1's "count value" and/or "resolution value" for replica memory location A, as well as storing a local copy of machine M2's "count value" and/or "resolution value" for replica memory location A, as well as storing a local copy of machine M3's "count value" and/or "resolution value" for replica memory location A etc.), nor transmit with each replica update transmission more than one "count value" and/or "resolution value" for a single replica memory location. Consequently, as the number of machines comprising the plurality grows, there is not a corresponding growth of plural "count values" and/or "resolution values" of a single replicated memory location required to be maintained. Specifically, only one "count value" and "resolution value" is maintained for all corresponding replica memory locations of all machines, and not one "count value" and/or "resolution value" for each machine on which a corresponding replica memory location resides. Therefore, as the number of machines in the plurality grows, there is not a growth of per-machine "count-values" and/or "resolution values" for replicated memory locations.

Alternative associations and correspondences between "count value(s)" and "resolution values" and replicated memory location(s) is anticipated by this invention. Specifically, in addition to the above described "one-to-one" association of a single "count value" and a single "resolution value" with each single replicated memory location, alternative arrangements are anticipated where a single "count value" and/or a single "resolution value" may be associated with two or more replicated memory locations. For example, it is anticipated in alternative embodiments that a single "count value" and/or "resolution value" may be stored and/or transmitted in accordance with the methods of this invention for a related set of replicated memory locations, such as plural replicated memory locations comprising an array data structure, or an object, or a class, or a "struct", or a virtual memory page, or other structured data type comprising two or more related and/or associated replicated memory locations.

Preferably, "count value(s)" and "resolution values" are not stored and/or operated for non-replicated memory locations or non-replica memory locations (that is, the memory location(s) which are not replicated on two or machines and updated to remain substantially similar). Consequently, "count values" and "resolution values" are preferably not stored for such non-replicated memory locations and/or non-replica memory locations.

Also preferably, "count value(s)" and "resolution values" corresponding to a specific replicated memory location (or set of replicated memory location(s)) are only stored and/or operated on those machines on which such specific replicated memory location is replicated (that is, on those machines on which a corresponding local replica memory location resides).

Preferably, when a replicated memory location which is replicated on some number of machines (such as for example machines M1-M3), is additionally replicated on a further machine (such as a machine M4), then a local/resident "count value" and "resolution value" is created on such further machine (e.g. machine M4) corresponding to such additionally replicated memory location, and initialized with a substantially similar value of at least one of the "count value(s)" and "resolution value(s)" of the other machines on which the additionally replicated memory location was already replicated (e.g. machines M1-M3, though preferably the same machine from which was sourced the initialized replica memory value of the further machine). Preferably, such process of creating and initializing a "count value" and "resolution value" on such further machine (e.g. machine M4) does not cause the "count value(s)" and "resolution value(s)" of any other machine (e.g. machines M1-M3) to be incremented, updated or changed. Thereafter, replica update transmissions may be sent and received by all machines (including the further machine on which the replicated memory location was additionally replicated) on which a corresponding replica memory location resides (e.g. machines M1-M4), in accordance with the above-described methods and arrangements.

Preferably, when a non-replicated memory location of a first machine (such as for example machine M1), is replicated on one or more further machines (such as a machines M2-M4), then a local/resident "count value" and "resolution value" is created corresponding to such replicated memory location on both of such first machine (e.g. machine M1) and such further machines (e.g. machines M2-M4), and initialized with a substantially similar initial value. Preferably such initial value is zero ("0"), however any other alternative initial values may be used so long as such alternative initial value is substantially similar across all such corresponding resident "count values" and/or "resolution values" of all machines (e.g. machines M1-M4). Preferably also, such process of creating and initializing a "count value" and/or "resolution value" on such first machine (e.g. machine M1) and such further machines (e.g. machines M2-M4) does not cause the initial "count value(s)" and/or "resolution values" to be incremented, updated or changed. Thereafter, replica update transmissions may be sent and received by all machines (including the first machine and further machine(s)) on which a corresponding replica memory location resides (e.g. machines M1-M4), in accordance with the above-described methods and arrangements.

Thus altogether, using the above methods, each of the machines M1-Mn is able to update their corresponding replica memory locations in a consistent and coherent manner in the presence of multiple conflicting/contending replica update transmissions. Specifically, in the circumstances of FIG. 12, machine M3 on receipt of message 73A firstly detects contention because the count value of the incoming message 73A is compared with, and found to be the same as, the existing count value at address #15. Following detecting such contention, machine M3 then compares the resident "resolution value" and the received "resolution value" in order to determine a prevailing value, and since one is less than three, machine M3 rejects the incoming message from machine M1 and therefore retains the value 92. Conversely machine M1 on receipt of message 74A, firstly detects contention because the received message count 8 is equal to the existing memory count 8. However, machine M1 recognising that message 73A is being sent from machine M3 (which has a resolution value of "3"), accepts that message and overwrites the existing content 211 with the incoming content 92 because the number three is greater than the number one.

Similarly, each of the remaining machines M2, M4, M5 . . . Mn receives both message 73A and message 74A in either order. The first message to be received is accepted because its count 8 is compared with, and found to be greater than, the pre-existing count value in each of the machines M2, M4, M5 . . . Mn. Thus the first message received is accepted. However, the second message received triggers the detection of a contention state which is able to be resolved in the following way where the machines M1, M2, etc. are allocated the numbers 1, 2, etc. in a hierarchical order which culminates in "n". If the incoming message is from a machine with a higher number in the hierarchical order than the number of the machine that sent the previous message, then the message from the machine with a higher number is accepted. Stated another way, if the second (or subsequent) received message is from a machine with a lower number than that which sent the previous message, then the second (or subsequent) received message is rejected. In this way the contention situation is not only detected but also resolved and the actions of machine M3 take precedence over the actions of machine M1 and thus the content 92 is recorded in all machines at address #15.

Clearly the decision to allow the machine of higher number to prevail is entirely arbitrary, and the lower numbered machine could prevail instead, if desired.

In an alternative arrangement, instead of relying upon a number in a machine hierarchy, each machine can be provided with a locally generated random number, or pseudo-random number (which can be changed from time to time if desired). Thus different machines will take precedence from time to time irrespective of whether a higher, or lower, random number is to prevail.

Turning now to FIGS. 24-30, these drawings show various advantageous message formats to be used for the transmission of replica memory updates having "count values" and "resolution values". Specifically, the four alternative replica memory update message format arrangements shown may be employed as the data/packet format of replica memory update packets, messages, frames, cells, or any other replica memory update transmission. Each of the four replica memory update message formats show different formatting arrangements of "count values" and "resolution values" in replica memory update transmissions having one or more updated replica memory values.

Figure 24:
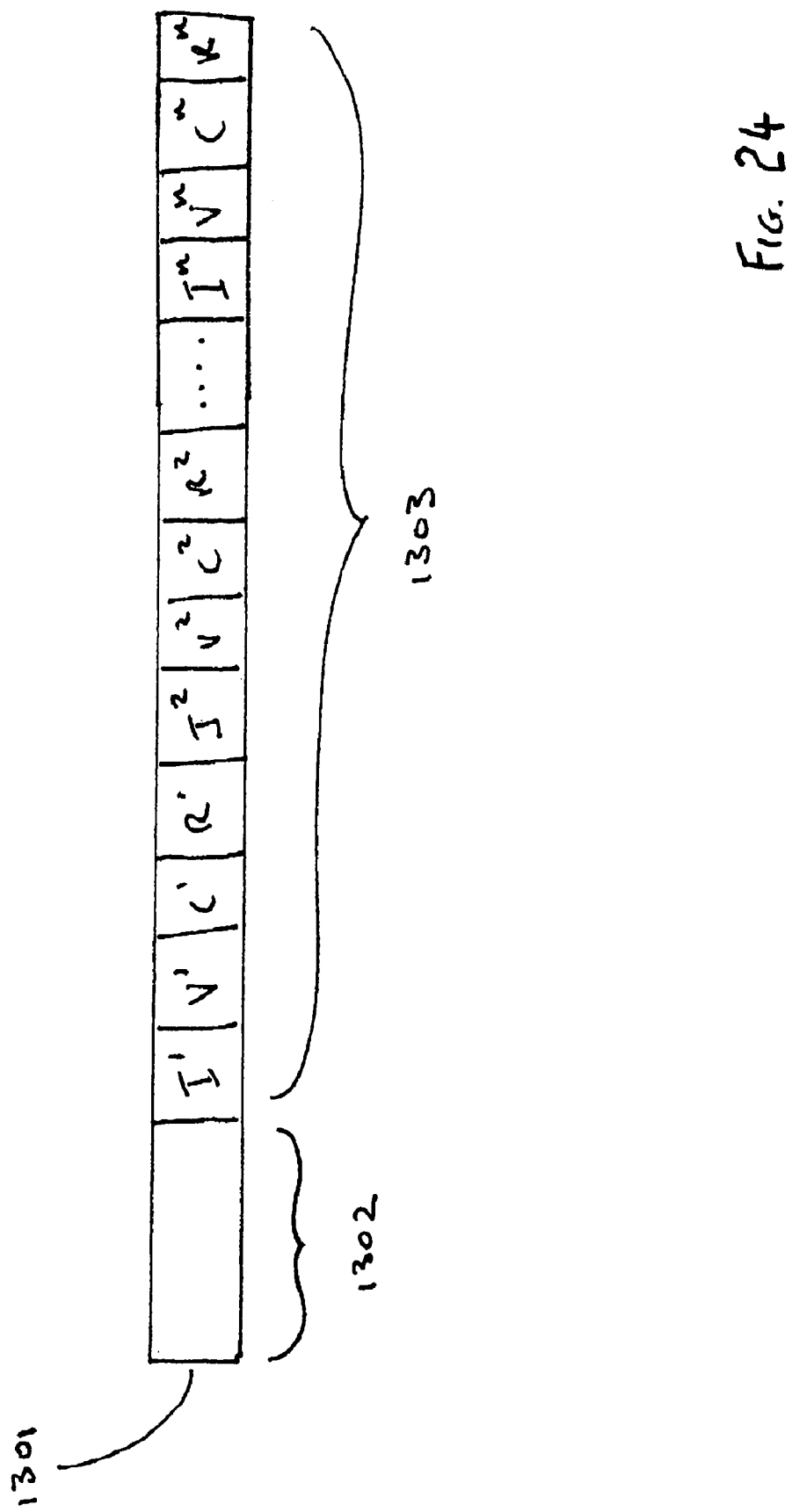
FIG. 24 illustrates a data format of a first embodiment.

FIG. 24 shows a first replica memory update message 1301 comprising "n" updated replica memory values. Specifically, replica update message 1301 is divided into a "header" portion 1302, and a "payload" portion 1303. Preferably within such payload portion 1303, are the indicated replica memory update values V1, V2 ... Vn. Associated with each replica memory update value, is a replica memory location identifier "I", a count value "C", and a resolution value "R". In the preferred message format arrangement depicted in FIG. 24, each indicated replica memory update value V1, V2 ... Vn is indicated to be stored together with an associated replica memory location identifier "I", count value "C", and resolution value "R", in groups 1310/1 (including I1, V1, C1, and R1), 1310/2 (including I2, V2, C2, and R2) ... 1310/n (including In, Vn, Cn, and Rn) respectively.

Figure 25:
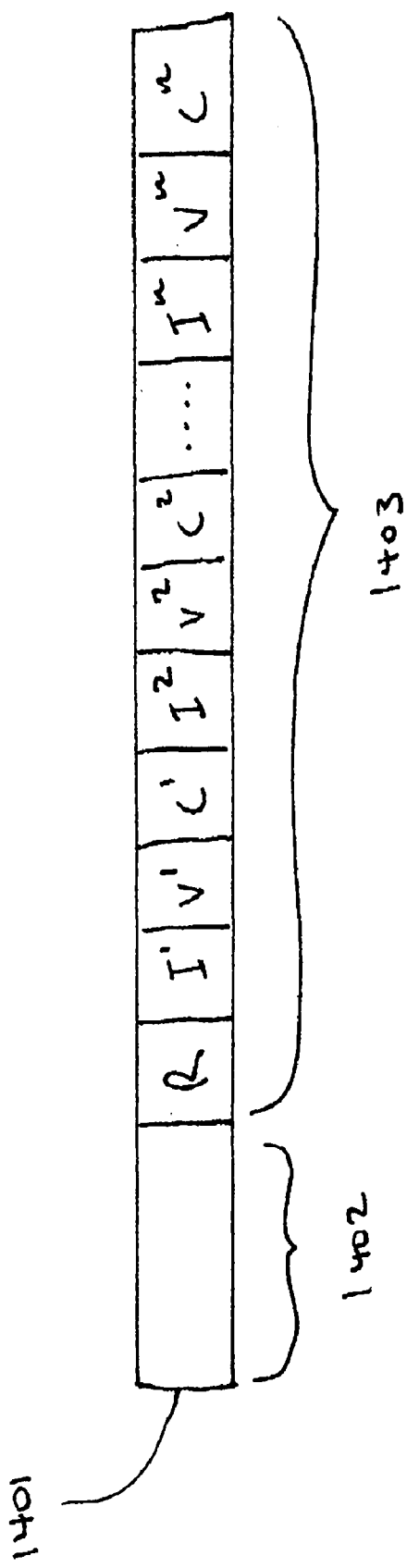
FIG. 25 illustrates a data format of a second embodiment which reduces the bandwidth requirements of the communication network.

Turning to FIG. 25, a more efficient replica memory update message format is shown. The more efficient replica memory update message 1401 has "n" updated replica memory values, Like the replica update message of FIG. 24, replica update message 1401 is divided into a "header" portion 1402, and a "payload" portion 1403. However, unlike FIG. 24, only a single resolution value "R" is stored in the replica update message 1401, where the single resolution value "R" is understood to be associated with, and therefore used by, all (or two or more) replica memory values V1, V2 ... Vn. Specifically, in the replica update message format of FIG. 25, the single resolution value "R" is to be understood to be associated with all replica memory update values, and therefore in accordance with such understanding, in the decoding of replica memory update message 1401 by a receiving machine, the single stored resolution value "R" is to be employed/examined as if the resolution value "R" was stored once for each replica memory update value as illustrated in FIG. 24 (such as for example were the single resolution value "R" stored once for each unique replica memory update value as was the case in FIG. 24 for resolution values R1, R2 ... Rn).

The improvement that the replica update message format 1401 represents over the replica memory update message format 1301 of FIG. 24, is the transmission of the resolution value "R" only once per replica update message, instead of multiple times for a single replica update message (as was the case in FIG. 24 for resolution values R1, R2 ... Rn), thereby reducing the size of replica memory update messages. This reduction in size enables more replica memory update values to be stored in a single replica memory update message by sharing a single resolution value "R" between all such stored replica memory update values, or alternatively to transmit a same number of replica memory update values in a replica update message format of a smaller size. Thus, the transmission of a single resolution value for multiple replica memory update values of a single transmission (or single packet, cell, frame, message or stream), represents a more efficient transmission arrangement and thereby requires less transmission capacity of the network 53 interconnecting the plural machines.

Figure 26:
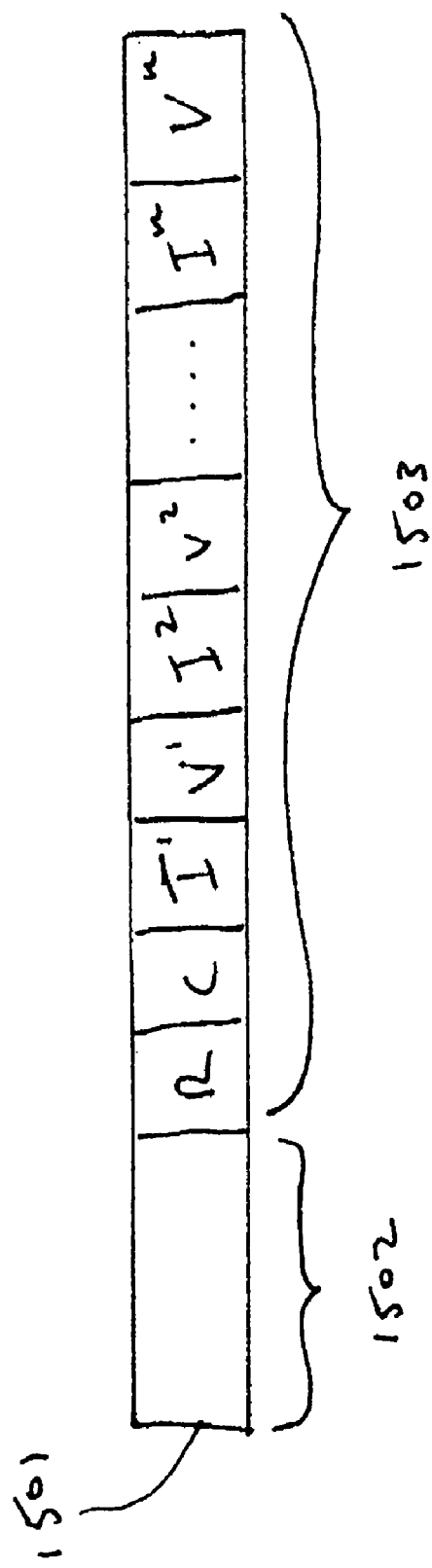
FIG. 26 illustrates a data format of a third embodiment which further reduces the bandwidth requirements of the communications network, FIGS. 27-29 each illustrate a stage of an embodiment utilising the data format of FIG. 26.

Next, at FIG. 26, a further alternative message format is shown. Specifically, FIG. 26 shows a further improved message format arrangement whereby only a single count value "C" is transmitted for multiple replica memory update values of a single replica memory update message/transmission. This is similar to the alternative arrangement of FIG. 25 where a single resolution value "R" is transmitted for all (or two or more) replica memory update values, and associated with each such value. In the case of FIG. 26, so too is the count value "C" stored once for all (or two or more) replica memory update values, and associated with each such value.

In particular, as for replica memory update messages 1401 and 1301 of FIGS. 25 and 24 respectively, replica memory update message 1501 is divided into a "header" portion 1502 and a "payload" portion 1503. However unlike replica memory update messages 1401 and 1301, only a single count value "C" is stored for all replica values V1, V2 ... Vn. In storing the single count value "C", it is necessary that such single count value "C" is consistent with the count value rules (that is, the abovedescribed rules of incrementing count values associated with a replica memory location upon transmission of a replica memory update) for all replica memory update values to which such single count value "C" is associated. Specifically then, when a single count value "C" is to be stored for two or more replica memory update values, it is necessary that such single stored count value "C" be the incremented value of the highest magnitude resident/local count value of all replica memory update values V1 ... Vn to which such single count value "C" is to be associated in replica memory update message 1501. Additionally, when transmitting replica memory updates comprising a single "count value", in a slight modification of the above rules for updating count values on occasion of a replica memory update transmission, the single count value "C" to be transmitted in a replica memory update message 1501 is to be stored to overwrite the resident/local count value of each replica memory location being updated.

Figure 27:
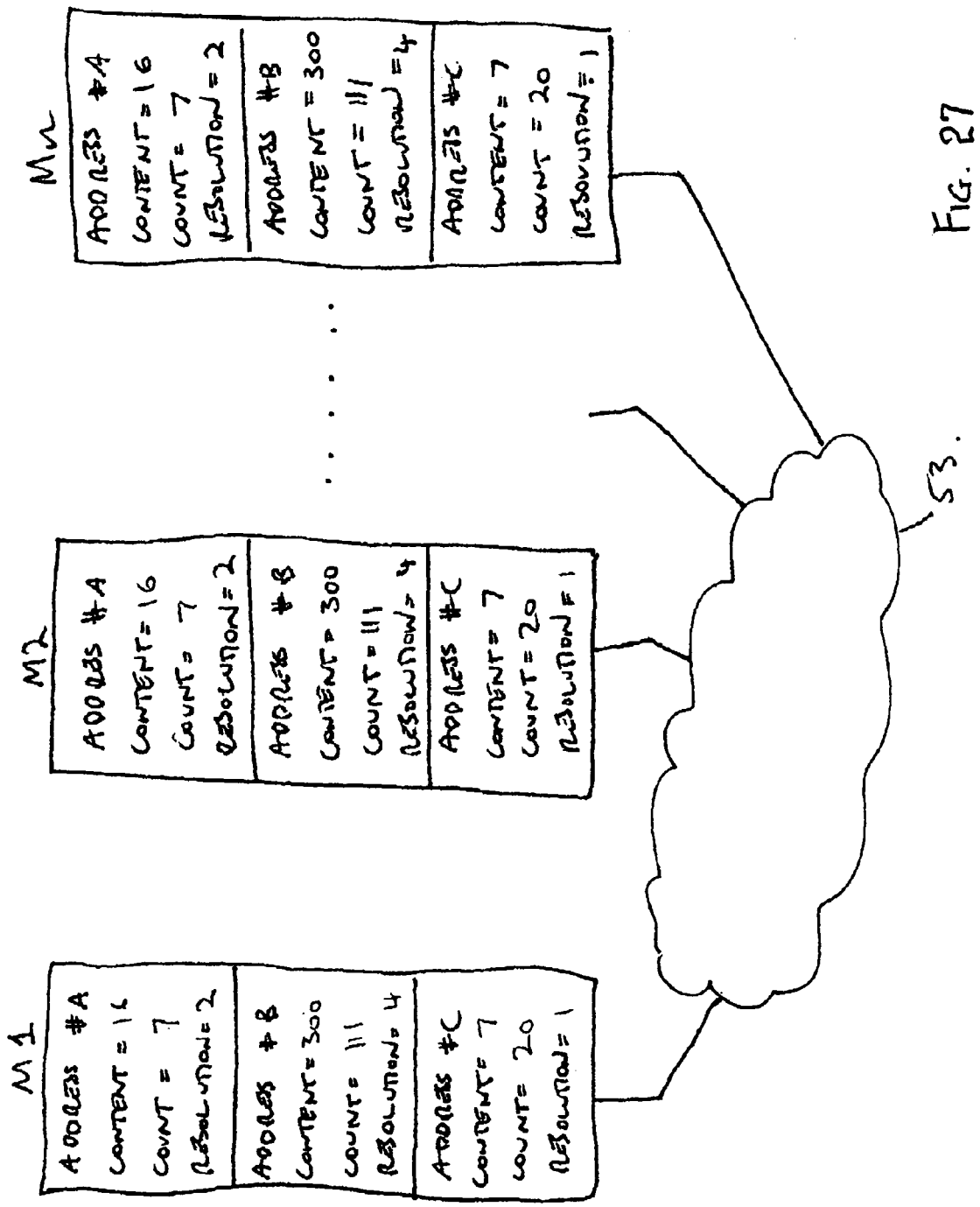
Figure 28:
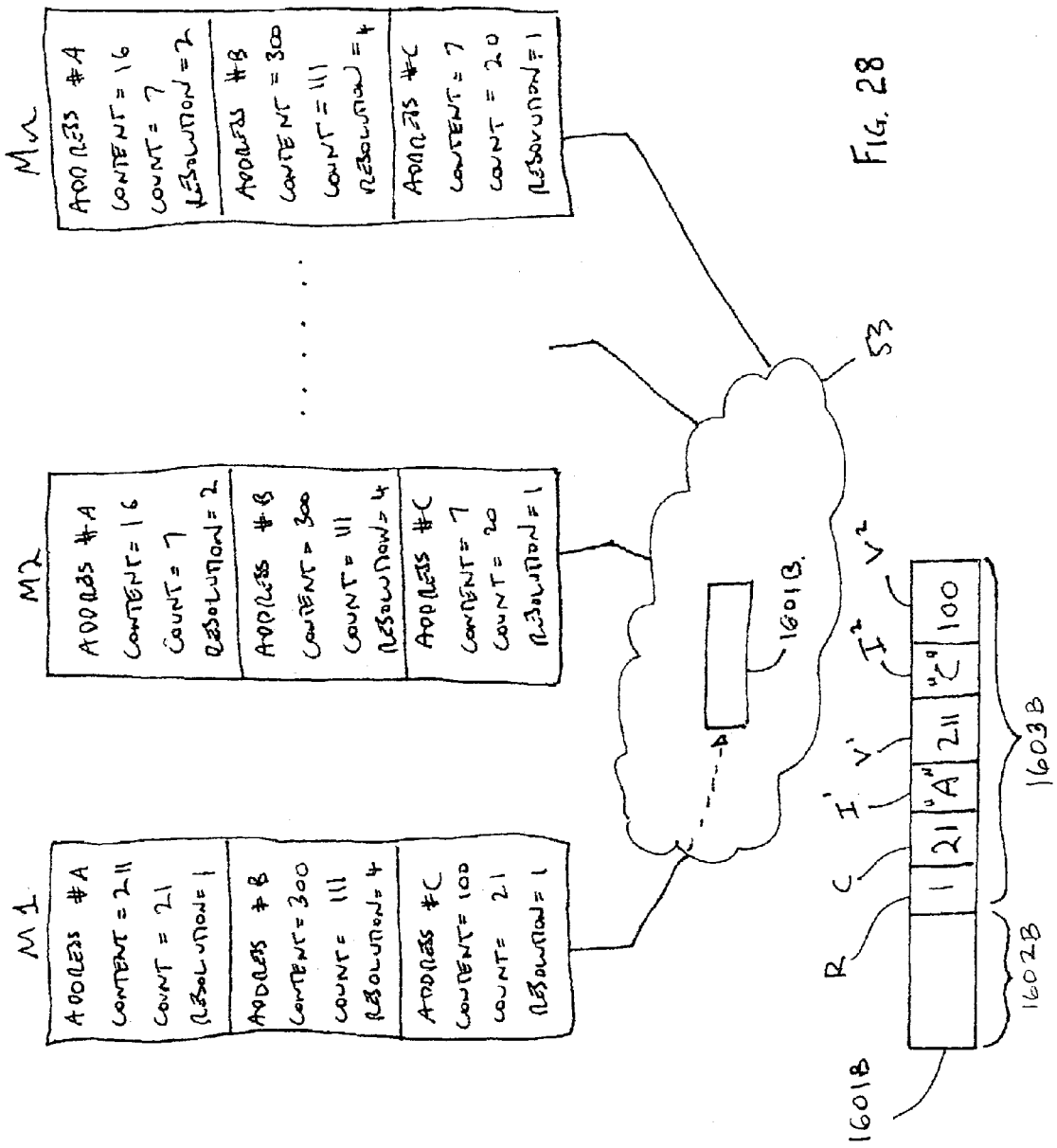
Figure 29:
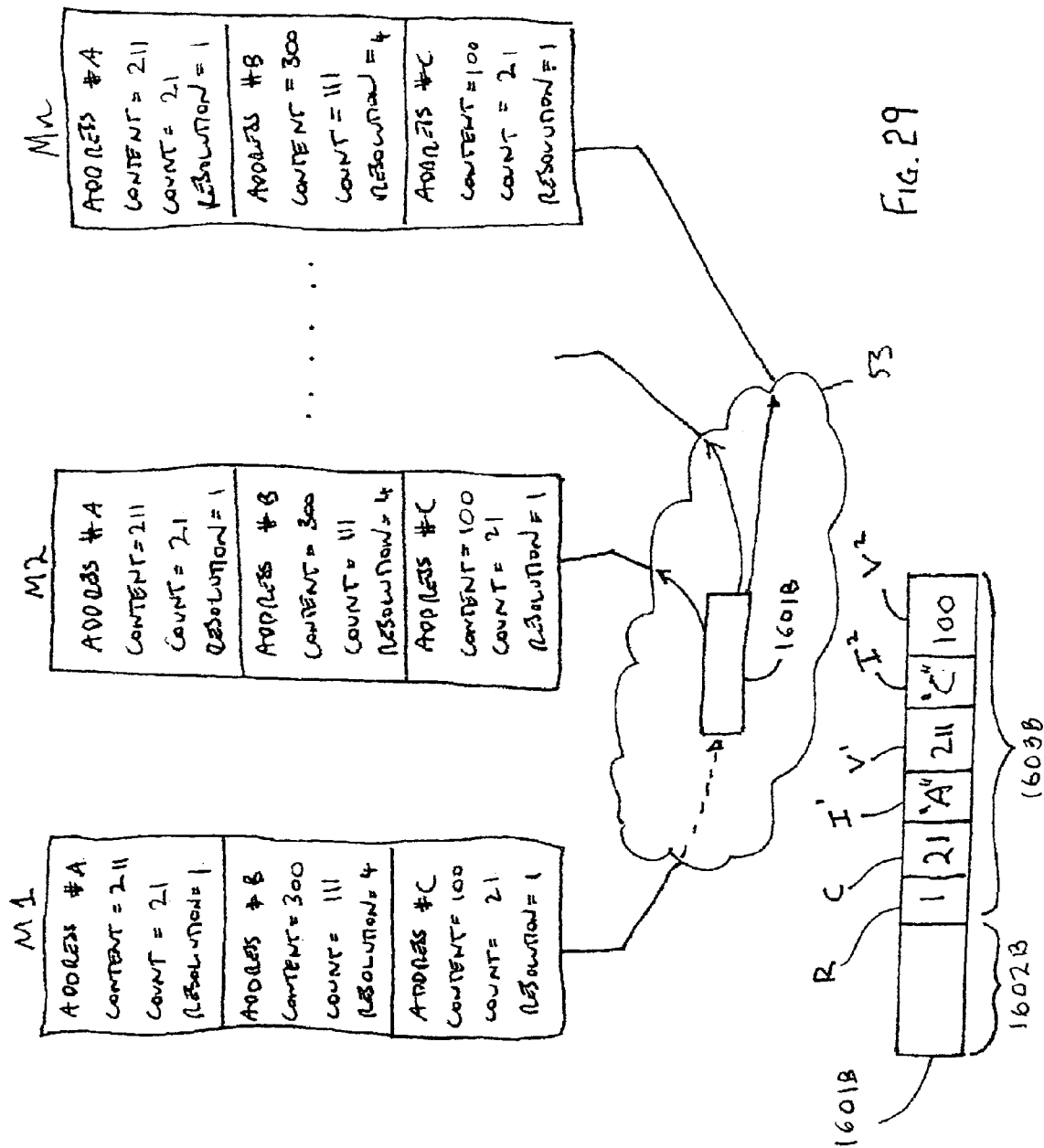

For example, consider FIGS. 27-29. In FIG. 27, the case of three replicated memory locations A, B, and C replicated on machines M1, M2 ... Mn is shown. Next in FIG. 28, the situation is shown where machine M1 has modified the values of replicated memory locations A and C, and proceeds to update the other corresponding replica memory locations A and C of machines M2 ... Mn. Utilising the single replica memory update message format of FIG. 26, machine M1 proceeds to transmit the replica memory update message 1601B via network 53 as shown. Also shown, are the values comprising the replica memory update message 1601B, where a header field 1602B and a payload field 1603B are indicated. Specifically indicated are the single resolution value R with a value of "1", a single count value C with a value of "21", a first identified replica memory location I1 with a value of "A" (that is, the identity of replicated memory location A), and the updated value V1 of replicated memory location A (which is the value "211"), followed by a second identified replica memory location I2 with a value of "C" (that is, the identity of replicated memory location C), and the updated value V2 of replicated memory location C (which is the value "100"). Thus, replica memory update message 1601B illustrates an applied example of the replica memory update message format 1501 of FIG. 26.

Attention is specially directed however to the updated count value and resolution value of replicated memory locations A and C of machine M1. Specifically, it will be observed that the updated count value and resolution value of the two updated replicated memory locations A and C of machine M1 are identical (that is, the count value and resolution value of each are identical). How this comes about will now be explained.

With reference to FIG. 27, the count value of replicated memory location A is indicated to be "7", whilst the count value of replicated memory location C is indicated to be "20". Also indicated in FIG. 27, the resolution value of replicated memory location A is indicated to be "2", whilst the resolution value of replicated memory location C is indicated to be "1". Thus, FIG. 27 illustrates the state of replicated memory locations A-C of machine M1 prior to the updated replica values 211 and 100 of replicated memory locations A and C respectively, being applied.

Following the operations of machine M1 which result in the modification of the values of replica memory locations A and C as indicated in FIG. 28 (that is, the updated value "211" of replicated memory location A, and the updated value of "100" of replicated memory location C), machine M1 prepares replica memory update message 1601B to comprise the updated replica memory values of A and C in accordance with the replica memory update message format 1501 of FIG. 26. Illustrated in message 1601B of FIG. 28 is a first identified replica memory location I1 with a value of "A" (which identifies replicated memory location "A"), and an associated updated value V1 (which is the updated value "211" of replicated memory location A). Similarly illustrated is a second identified replica memory location I2 with a value of "C" (which identifies replicated memory location "C"), and an associated updated value V2 (which is the updated value "100" of replicated memory location C). Also indicated is a single resolution value R (with a value of "1"), and a single count value C (with a value of "21"). Specifically, how such single resolution value R and single count value C are computed/generated will now be explained.

In this example, the single resolution value R, indicated with a value of "1" in message 1601B, is the numerical identity of the transmitting machine of the replica memory update message 1601B (which is machine M1). Thus, in accordance with the abovedescribed example of resolution values, the numerical identity of machine M1 to be used as the resolution value for message 1601B is stored/transmitted as the resolution value R. This single resolution value R is to be used by the receiving machine(s) upon receipt of message 1601B in the actioning of each replica memory update value (e.g. V1 and V2), as is illustrated in FIG. 29.

Also illustrated in FIG. 28, corresponding to the resolution value "1" being computed/generated for the single resolution value R of message 1601B, such resolution value "1" to be used as the single resolution value R is also to be stored to overwrite the resident resolution values of the replicated memory locations to be updated by message 1601B (that is, replicated memory locations A and C). Thus, as illustrated in FIG. 28, in accordance with the generated single resolution value R for message 1601B, such single resolution value (that is, a value of "1") is stored to replace the resident/local resolution values of replicated memory locations A and C, which are overwritten to be come "1" and "1" respectively.

Next, the single count value C is computed/generated from the set of resident/local count values of the replica memory locations to be updated by message 1601B (that is, replicated memory locations A and C). Specifically then, in accordance with the above description, the highest magnitude resident count value of the replicated memory locations to be updated by message 1601B (that is, replicated memory locations A and C) is sought to be determined by examining the resident count value of each to-be-updated replicated memory location of message 1601B in order to determine the largest (greatest) value to be used as the incremented single count value C of message 1601B. With reference to FIG. 27, such examination determines that the resident count value "20" of replicated memory location "C" is greater than any other resident count value of the replicated memory locations to be updated as part of message 1601B (that is, replicated memory location A with a resident count value of "7" and replicated memory location C with a resident count value of "20"). Therefore, the resident count value of replicated memory location C (that is, the value "20") is chosen as the count value to be incremented and subsequently used as the single count value C, and such value "20" is incremented becoming value "21" of the single count value C of message 1601B.

Once the single count value C to be used in message 1601B has been determined/calculated, such single count value C is then stored to replace/overwrite the resident/local count value of each replicated memory location to be updated by message 1601B—that is, replicated memory locations A and C. This is also illustrated in FIG. 28 where the resident count value of replicated memory location A is indicated to have been replaced with the value "21" of the single count value C of message 1601B, and so too is the resident count value of replicated memory location C also replaced with the value "21" of the single count value C of message 1601B.

Turning now to FIG. 29, the results of machines M2 ... Mn receiving and actioning replica memory update message 1601B is shown. In particular, it will be observed that replica memory location A of machines M2 ... Mn has an updated content of "211", and also an updated count value of "21" and an updated resolution value of "1". In a similar manner, replicated memory location C of machines M2 ... Mn has been updated with a value of "100", and also has an identical updated count value and resolution value as replica memory location A, which is "21" and "1" respectively. Specifically, what happens in FIG. 29 upon receipt of replica memory update message 1601B will now be explained.

Upon a receiving machine (such as machine M2) receiving replica memory update message 1601B, such receiving machine proceeds to action such received message 1601B. In actioning such replica update message 1601B, the receiving machine proceeds to compare the single count value C with the resident count value associated with each replicated memory location to be updated by message 1601B (that is, replica memory locations A and C). Thus, the receiving machine initially compares the single count value C of message 1601B with the resident count value associated with replica memory location A, in accordance with the above described rules for comparing count values. In accordance with the above described count value comparison rules, if the single count value C of message 1601B is greater than the resident count value associated with replica memory location A, then replica memory location A of the receiving machine is updated (overwritten) with the updated replica value V1 of message 1601B, and so too is the associated resident count value and resolution value of the receiving machine updated (overwritten) with the single count value C (that is, value "21"), and the single resolution value R (that is, value "1") respectively.

Alternatively, if the single count value C of message 1601B is less than the resident count value associated with replica memory location, A, then replica memory location A of the receiving machine is not updated (overwritten) with the updated replica value V1 of message 1601B, and neither is the associated resident count value and resolution value updated (overwritten).

Finally, a third situation is also possible where a comparison of the single count value C of message 1601B (that is, value "21") is the same as (e.g. equal to) the resident count value associated with replica memory location A of the receiving machine. When such a situation as this occurs, a contention situation is detected and signalled, and the single resolution value R of message 1601B (that is, value "1") is compared with the resident resolution value associated with replica memory location A of the receiving machine. In accordance with the resolution rules, a determination is then made which of the two compared resolution values is to prevail. If it is determined that the single resolution value R of message 1601B is to prevail over the resident resolution value associated with replica memory location A, then the receiving machine would proceed to update (overwrite) replica memory location A with the updated replica value V1 of message 1601B, and so too update (overwrite) the associated resident resolution value and optionally the associated count value with the single resolution value and single count value respectively. Alternatively, if it were determined that the resident resolution value associated with replica memory location A is to prevail over the single resolution value R of message 1601B, then the receiving machine would not update (overwrite) replica memory location A with the updated replica value V1 of message 1601B, and also not update the associated resident resolution value and/or count value.

Such a process of actioning replica update message 1601B as described for replica memory location A (that is, as related to identity 11 and associated value V1 of replica update message 1601B), is similar repeated mutatis mutandis for each identified replica memory location identified to be updated by message 1601B (that is, replicated memory location C). Thus, it will be observed in FIG. 29 that replica memory location C of each receiving machine (that is, machines M2 . . . Mn) has been updated with a new value of "100", and a new resolution value of "1" and count value of "21" which corresponds to the single resolution value R and single count value C of message 1601B (and which is common to replica memory location A). With reference to message format 1501 of FIG. 26, the above-described steps of receiving and actioning a replica update message comprising a single resolution value and/or a single count value is repeated for each separate identified replica memory location and associated value (such as for example, I1 and V1, I2 and V2, . . . , In and Vn)

Figure 30:
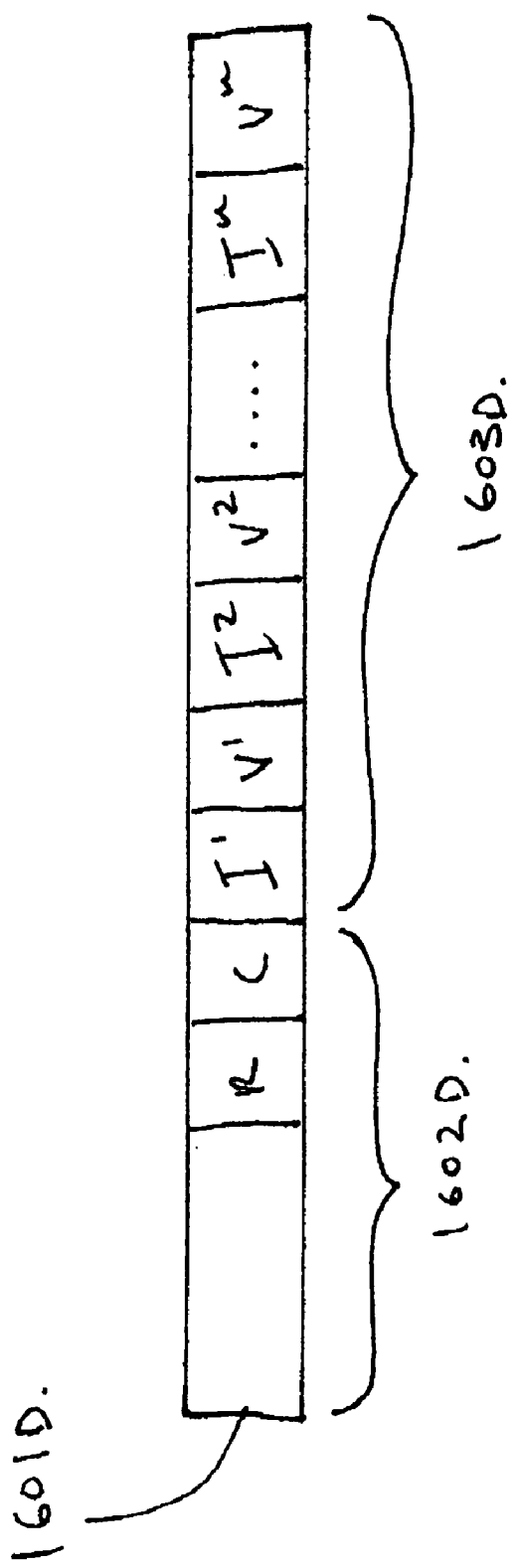
FIG. 30 illustrates a data format of a fourth embodiment with reduced bandwidth requirements of the communications network.

FIG. 30 shows an alternative arrangement of storing a single resolution value R and a single count value C in the replica update message 1601D. Specifically, replica update message 1601D shows the single resolution value R and the single count value C stored as part the header field 1602D (instead of the payload field 1603D as was the case in FIG. 26). In further alternative arrangements, either one of the single count value C or the single resolution value R may be stored in the header field 1602D, whilst the other of the two values may be stored in the "payload" field 1603D. Various other storage and transmission arrangements of the single resolution value R and single count value C will be apparent to those skilled in the computer and/or electrical engineering arts and are to be included within the scope of the present invention.

In an alternative embodiment of FIG. 24, rather than each of the machines M1, M2 . . . Mn sending an individual message to all other machines, the individual machines send only a single message to the server machine X which then prepares a broadcast message (such as message 1301 schematically illustrated in FIG. 24). In this example, "n" replicated memory locations/addresses are simultaneously updated by the message 1301 each with their individual content/value V11, V2 . . . Vn, and the corresponding identities of the replicated memory locations to which the values relate (that is, identities I1, I2. In respectively). Thus the broadcast or group message 1301 has "n" count values, in this example C1, C2 . . . Cn (corresponding to values V1, V2 . . . Vn respectively), and also has "n" resolution values (also corresponding to values V1, V2 . . . Vn respectively), and the group message is broadcast to all application running machines M1, M2 . . . Mn by the server machine X.

Importantly, in all arrangements of FIGS. 26 and 30, the single count value of the group message 1501 is compared with the identified (that is, via identifiers 11, 12 . . . In respectively) corresponding resident/local count value stored for each identified replicated memory location and the abovementioned rules of comparing count values and detection and resolution of contention are applied. Specifically, the rules for comparing count values and detection and resolution of contention are substantially the same mutatis mutandis as for the arrangement of FIG. 24 (where each replica memory update value is associated with a unique count value and a unique resolution value), but are based upon the single count value and single resolution value of the broadcast message 1301 which are understood to be associated with each replica memory update value as indicated schematically in FIG. 26.

In a still further embodiment of FIGS. 26 and 30, the individual machines send only a single message to the server machine X which then prepares a broadcast message (such as message 1501 schematically illustrated in FIG. 26, and message 1601D schematically illustrated in FIG. 30). In this example, "n" addresses are simultaneously updated by the message 1501/1601D each with their individual content/values. Thus the broadcast or group message 1501/1601D has a single count value "C" and a single resolution value "R", and the group message is broadcast to all application running machines M1, M2 . . . Mn by the server machine X. The single count value of the group message 1501/1601D is compared with the corresponding resident count value stored for each replicated memory location and the abovementioned rules of comparing count values and detection and resolution of contention are applied. The rules for detection and resolution of contention are the same and are based upon the single count value C and single resolution value R of the broadcast message 1501/1601D which are understood to be associated with each replica memory update value V1, V2 . . . Vn as indicated schematically in FIG. 26.

Importantly, in all arrangements of FIGS. 26 and 30, the single count value of the group message 1501/1601D is compared with the identified (that is, via identifiers I1, I2 . . . In respectively) corresponding resident/local count value stored for each identified replicated memory location and the abovementioned rules of comparing count values and detection and resolution of contention are applied. Specifically, the rules for comparing count values and detection and resolution of contention are substantially the same mutatis mutandis as for the arrangement of FIG. 24 (where each replica memory update value is associated with a unique count value and a unique resolution value), but are based upon the single count value and single resolution value of the broadcast message 1501/1601D which are understood to be associated with each replica memory update value of message 1501/1601D.

Preferably, as indicated in FIGS. 26 and 30, the count value "C" which becomes the single count value broadcast to be incremented, stored and transmitted, is chosen as the highest magnitude resident/local count value present for the "n" replicated memory location/addresses to be updated by message 1501/1601D. The highest magnitude count has the advantage that it will operate in accordance with the above described comparison rules for all "n" replicated memory locations to which it is to be associated, and additionally is less likely to encounter contention than a count value of lower magnitude.

It will be apparent that the grouping together of updating messages so as to provide a group message 1501/1601D as indicated in FIGS. 26 and 30 (and additionally in alternative arrangements of FIGS. 24 and 25), substantially reduces both the number of messages and total volume of data being sent over the network 53 and thus lightens the load on the network 53.

Finally, in alternative arrangements of replica memory update messages, a single count value and/or a single resolution value may be transmitted for a single replica memory update transmission, where such single transmission potentially includes a plurality of packets, cells, frames, or messages. Thus, in such alternative embodiments as this, where a single replica memory update transmission comprising a single transmitted count value and/or resolution value, then preferably only a single replica memory update message of the multiple messages having such single replica memory update transmission will include the single count value and/or resolution value.

It will also be apparent that the abovementioned arrangement substantially increases the volume of memory required on each machine, since the storing of a "count value" and/or "resolution value", for example a single combined 32 bit value, associated with each replicated application memory location/content, occupies substantial memory space/capacity which may approach that of the space/capacity occupied by the replicated application memory locations/contents themselves. Thus, such stored "count values" and/or "resolution values" associated with replicated application memory locations/contents represent a potentially substantial local memory overhead of each of the multiple computers operating together as a replicated shared memory arrangement. This is less than ideal, and thus it is desirable to conceive of a method for reducing this local memory overhead by reducing the local memory capacity occupied by local/resident "count values" and/or "resolution values" associated with replicated application memory locations/contents.

In accordance with a first embodiment there is disclosed a method of deleting "count values" and/or "resolution values" associated with replicated application memory locations/contents in the local memory of each machine in such a manner that the memory overhead which such stored "count values" and/or "resolution values" represent, may be reduced. The herein disclosed method utilizes the fact that during the processing of the application program by a multiple computer system operating as a replicated shared memory arrangement, there are often many more memory reads of replicated application memory locations/contents than memory writes of replicated application memory locations/contents, and thus writing to replicated application memory locations/contents is often relatively infrequent compared with reading of replicated application memory locations/contents. Specifically, non-commercial operation of a prototype multiple computer system operating as a replicated shared memory arrangement has revealed that for many application programs there are often bursts of writing activity during initialization of one or more replicated application memory locations/contents by the application program, followed thereafter by the remaining operation of the application program where no writing activity to the same replicated application memory location(s)/content(s) occurs at all. One such example (but not the sole example), is the initialization by the application program of replicated application memory contents/values which remain constant after initialization (that is, are not written to or modified after initialization).

In accordance with a preferred embodiment, a "count value" and/or "resolution value" associated with a replicated application memory location/content, and stored in the local memory of a member machine of multiple computer system operating as a replicated shared memory arrangement, is deleted after an elapsed period of time in which no replica memory update transmissions have been sent or received for the associated replicated application memory location/content.

For example, in one such arrangement the elapsed period of time chosen may be one hour, so that after a period of one hour has elapsed in which no replica memory update transmissions have been sent or received for a specific replicated application memory location/content, then the associated "count value" and/or "resolution value" stored in the local memory of the local machine may be deleted, reclaimed, garbage collected, or otherwise the local memory occupied by such associated "count value" and/or "resolution value" may be "freed" so as to be available to store other data/content (including potentially other application or non-application memory content or data).

Clearly the above arrangement can also be made to operate with any minimum elapsed period of time, including potentially variable or changing minimum periods of time, before effecting the above methods. In one example, an chosen minimum elapsed period of time may be 1 hour. In an alternative example, another chosen minimum elapsed period of time may be 1 second.

Additionally, it is not a requirement of this invention that the above methods be effected immediately upon the minimum elapsed period of time being reached. Instead, after the chosen minimum period of time has elapsed (including potentially variable or changing minimum periods of time), the above methods may be effected at any point thereafter without limitation or constraint. For example, after the minimum elapsed period of time has occurred, the effected results of the above methods (that is, the deleting of associated "count values" and/or "resolution values") may take place many seconds, many minutes, or even many hours later.

Furthermore, after the minimum elapsed period of time has occurred, the effected results of the above methods and embodiments may be deferred or postponed until such time where the local CPU or similar processing logic of the local machine is not busy (or substantially busy), and thus the deletion (or the like) of the associated "count value(s)" and/or "resolution value(s)" is undertaken as a housekeeping function without impacting the performance of the application program or the computer as a whole.

Additionally, or alternatively, after the minimum elapsed period of time has occurred, the effected results of the above methods and embodiments (that is, deletion of associated "count value(s)" and/or "resolution value(s)") can be carried out in the event that the available/spare/"free" memory for the application program or computer is low, and thus it is desirable that memory be consolidated and reduced in order to satisfy other legitimate needs or demands for local memory capacity.

It is also possible that instead of deleting a "count value" and/or "resolution value", they can instead be reduced in size to a single bit (or any lesser format or arrangement of bits than prior to the reduction).

In some application programming languages, application memory contents/values which are intended by the programmer not to change after initialization are able to be marked as "final" or the like to signal to the computing system that such value will not change after initialization. For application programs which utilise such "final" or the like markers or identifiers for specific application memory locations/contents, the abovedescribed method of deleting count values is able to be advantageously utilised to reduce the local memory overhead which "count values" and/or "resolution values" associated with such "final" or the like marked application memory locations/values represent.

Additionally, for application programming languages where such "final" or the like markers or identifiers are not provided or supported, the above described methods of deleting "count values" and/or "resolution values" are able to be advantageously used, as the above described methods do not rely on the programmer marking application memory locations/contents as "final" or the like in order to achieve the advantageous result of reduced local memory overhead for the multiple computers operating as a replicated shared memory arrangement.

However, non-commercial operation of a prototype multiple computer system operating as a replicated shared memory arrangement has also revealed that even when a programming language supports the use of "final" markers or the like for application memory locations/contents, programmers (and therefore the application programs they write) very often do not utilise the available "final" markers or the like. Instead, even when programmers could potentially make use of such "final" markers or the like, they often do not make use of such "final" markers or the like (either intentionally, or unintentionally). Thus, it is a further benefit of the above described methods and embodiments, that the use of "final" makers and the like is not necessary in order to achieve the advantageous benefits afforded by the above methods. Thus, in application programs where the application programmer omitted (either intentionally or unintentionally) the use of "final" markers or the like, the methods of this invention are able to be beneficially applied, thereby reducing the local memory overhead which associated "count values" and/or "resolution values" represent for such replicated application memory locations/contents.

A particular example of storing and updating "count value(s)" will now be described. Specifically, "count values" described above may be beneficially used to ensure the consistent updating of replicated application memory locations across plural machines of a replicated shared memory arrangement.

However, such "count value(s)" may substantially increase the volume of memory required on each machine, since the storing of a "count value", for example a 32 bit value, associated with each replicated application memory location/content, occupies substantial memory space/capacity which may approach that of the space/capacity occupied by the replicated application memory locations/contents themselves. Thus, such stored "count values" associated with replicated application memory locations/contents represent a potentially substantial local memory overhead of each of the multiple computers operating together as a replicated shared memory arrangement. This is less than ideal, and thus it is desirable to chose small values (that is, small values which occupy less local memory capacity) to be used as the "count values" so as to reduce the local memory overhead that stored count values represent.

For example, where the "count value" is a 32 bit integer value, then for each replicated application memory location there is associated a 32 bit "count value". This may represent a very considerable local memory overhead. On the other hand, where the "count values" are 16 bit, or even 8 bit values instead of 32 bit values, then the local memory overhead that such "count values" represent is effectively reduced by a factor of 2 or 4 respectively. Thus, the utilisation of reduced size/capacity "count values" is desirable.

However, as the value size of the "count value" reduces (such as for example, from 32 bits to 8 bits), so too does the maximum number of abovedescribed increment operations (that is, the abovedescribed increment operations performed to a local/resident "count value" upon occasion of a replica memory update transmission) that can be performed before the maximum value limit of the reduced "count value" is reached. When the value size is very large (such as for example 32 bits, or even 64 bits), then many millions, billions, or even more abovedescribed increment operations may take place without reaching the maximum incremented value supported by such very large value sizes. On the other hand, when small value sizes are used, such as for example 8 bit value sizes, then the maximum number of abovedescribed increment operations is dramatically reduced to just 256 discreet values and therefore a maximum of 255 discreet increments operations as described above. Thus, 8 bit "count values", whilst attractive as offering a reduced local memory overhead (compared to 32 bit values for example), will only work well so long as the maximum increments performed on such 8 bit "count value" does not exceed the maximum supported number of 255.

If an 8 bit unsigned byte value for the stored "count values" is used, and no strategy is employed to ensure that "arithmetic overflow" of the "count value" does not occur, then the following undesirable situation will arise when the $256^{th}$ increment operation takes places. Initially, for the first 255 increment operations, all operates correctly and the stored "count values" increase in value in accordance with the above description (for example 1, followed by 2, 3, 4 . . . 253, 254, 255). As a result, the incremented "count values" operate effectively as intended and described above to ensure the consistent updating of replicated application memory locations.

However, upon occasion of the $256^{th}$ increment operation when the "count value" is 255, instead of an incremented value of 256 being generated as the result of such $256^{th}$ increment operation and stored as the new local/resident "count value", a "count value" of "0" will result. This is termed "arithmetic overflow" in the computing arts, and occurs when a calculation (e.g. the increment operation) produces a result that is greater in magnitude than what a given register or data type or memory storage location can store or represent. Furthermore, upon occasion of the $257^{th}$ increment, the resulting value will be "1", and so on and so forth until a value of 255 is once again reached, at which point the next increment operation will cause an arithmetic overflow condition once more, and the process will continue.

As a result of such arithmetic overflow of a count value (such as an 8 bit "count value"), then if a replica memory update transmission associated with the $256^{th}$ increment operation is sent with the associated overflowed "count value" of "0", then such replica update transmission (and later replica update transmissions with "count values" 1, 2, 3 . . . 254) will be considered by the receiving machines to be "stale" or "old" values, as the "count values" of such replica memory update transmissions will be less than the corresponding local/resident "count values" of the receiving machine which will be for example "255" (that is, the last incremented value prior to the arithmetic overflow). Thus, this has the consequence of effectively "halting" replica memory updating events on the plural machines, as all later sent replica memory update transmissions with "overflowed count values" are discarded/rejected by the receiving machines when compared against the local/resident "count values" with a greater value prior to the arithmetic overflow. The result is chaos, or at least uncertainty, with the replica application memory locations/contents of the various computers no longer being updated, and/or no longer being consistent with each other. Obviously this is very undesirable.

In a first embodiment to overcome the above described undesirable consequences, a check is performed by each machine from time to time of one or more (or each or all) "count value(s)". When an examined "count value" reaches some threshold (such as for example a number such as 250 near to the maximum value of 255, or alternatively immediately upon or before occasion of an arithmetic overflow of a "count value"), then all replica memory updating transmissions of the replicated application memory location/content corresponding to such "count value" is/are temporarily halted. At the initiation of the temporary halt in transmission prior to an arithmetic overflow (or immediately upon occasion of an arithmetic overflow), all memory locations will be coherent (i.e. have the same value), and potentially inconsistent updating of replica application memory location(s)/content(s) will not have yet occurred due to the arithmetic overflow. During the halt in replica memory update transmissions for the effected replicated application memory location(s)/content(s), each corresponding "count value" of each machine for that (or those) effected replica application memory location(s)/content(s) are re-set or re-initialized to zero (or some other low magnitude number, such as 1, 2, or 3 etc). Once this re-setting or re-initialization is accomplished, the halt in transmissions is discontinued, and replica memory update transmissions for the effected replica application memory location(s)/content(s) resume. This cycle of events is repeated each time a "count value" reaches the predetermined threshold (such as for example 250 in the above described example).

In a second embodiment, a temporary halt to replica memory update transmissions for one or more replica application memory location(s)/content(s) occurs at regular or semi-regular or predetermined time intervals, such as for example every second, or once every 60 seconds. Again during each halt in replica memory updating transmissions, all associated "count values" are re-set or re-initialized to zero.

In a third embodiment, the two above described embodiments may be combined, where a temporary halt to replica memory update transmissions for one or more replica application memory location(s)/content(s) occurs at regular or semi-regular or predetermined intervals, however should a "count value" reach some threshold prior to the next regular or semi-regular or predetermined halt occurring, then all replica memory update transmissions-of the replicated application memory location/content corresponding to such "count value" is/are temporarily halted and res-set or re-initialized to zero.

Turning now to FIGS. 31-36, a still further problem in relation to a multiple computer system will now be described, the problem being that of "echoes" in memory updating.

Figure 31:
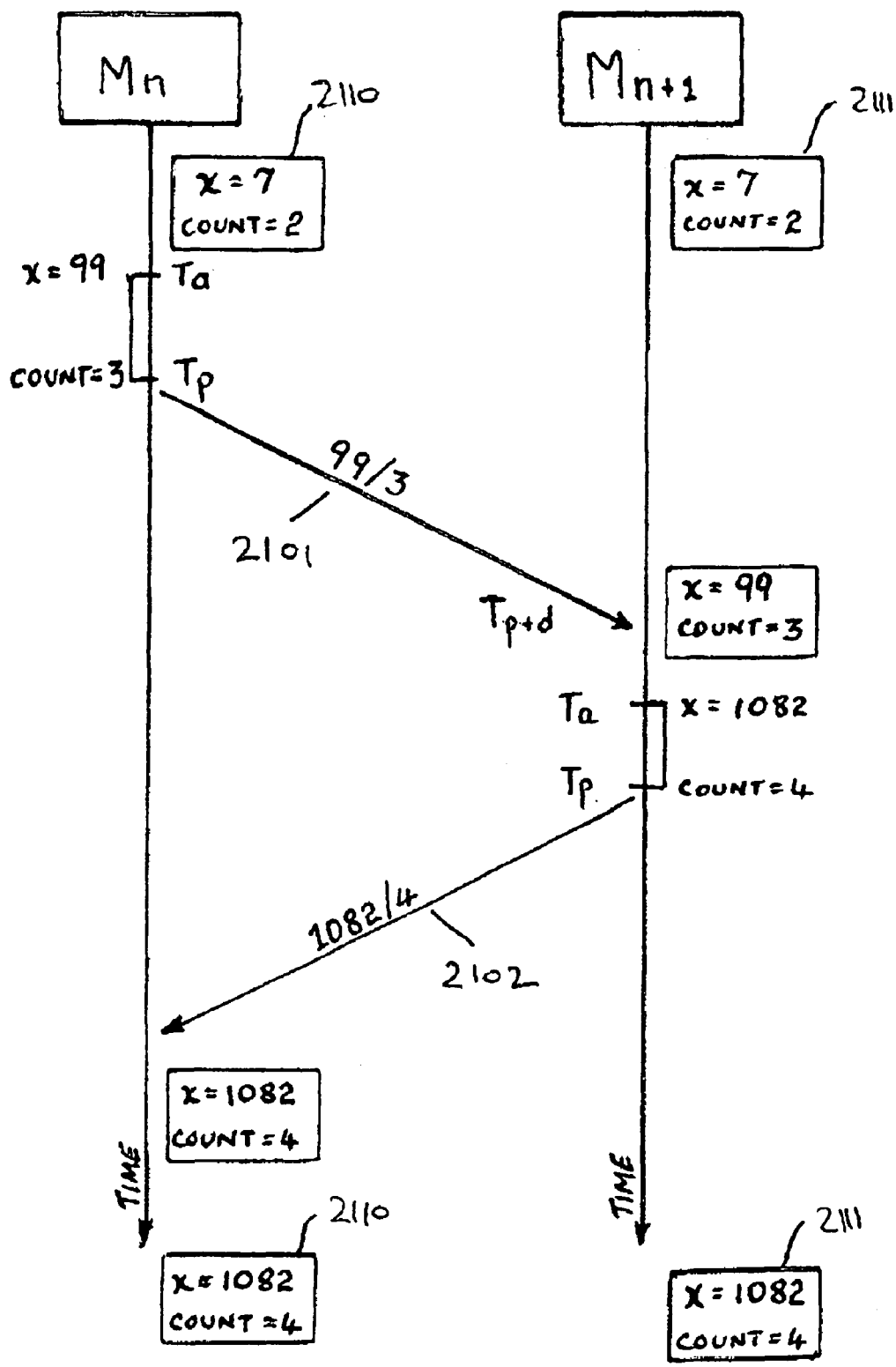
FIG. 31 illustrates the propagation of a new and/or changed value for a replicated application memory location.

As seen in FIG. 31, two machines Mn and Mn+1 of a multiple computer system initially have identical replicated application memory locations/contents "x" each of which has a value of 7 (but which could equally be some other content such as code or instructions) and an associated local count value of 2. FIG. 31 illustrates time extending from the top of the diagram towards the bottom. At some moment during the processing being carried out by machine Mn, a new/changed value/content for replicated application memory location/content "x" is generated, the new/changed value being 99. There are two distinct times indicated in the propagation of the new/changed value of 99 to all other machines (namely machine Mn+1). The first time Ta is the time at which the DRT of machine Mn is alerted that the portion of the application program executing on machine Mn has written-to replicated application memory location "x" and as a result the value of replicated application memory location "x" of machine Mn has changed. The second time Tp is the time at which the actual propagation is initiated by machine and a new count value, 3 in this example, created. That is, the second time Tp is the time at which machine Mn transmits replica memory update transmission 2101 comprising the identity and updated value (that is, "99") of replicated application memory location "x", and an associated "count value" of "3" (and preferably additionally comprising though not shown in FIG. 31, an associated "resolution value" of replica application memory location "x"). The delay between the two times Tp and Ta may be for example as small as a nanosecond or as large as a second. This delay depends very much upon the computational load of the machine Mn at the relevant time(s).

The replica memory update transmission/message 2101 to update the content of memory location "x" is sent from machine Mn to machine Mn+1 by means of the network 53 and arrives at the machine Mn+1 at a time Tp+d where "d" is the delay/latency inherent in the network for the propagation of transmission 2101 to take place. Upon receipt of transmission 2101 by machine Mn+1 at time Tp+d, the local content of the local replica application memory location/content "x" is changed in machine Mn+1 to the received value of transmission 2101 to be the same as machine Mn, namely a value/content of 99 and a "count value" of 3.

At some time thereafter, the executing portion of the same application program operating on machine Mn+1 carries out further processing which results in a new value being written into memory location "x", the new value being 1082. At time Ta the DRT of machine Mn+1 is alerted that the portion of the application program executing on machine Mn+1 has written to replicated application memory location "x" and as a result the value of replicated application memory location "x" of machine Mn+1 has changed. Consequently, at a further time thereafter Tp the new/changed value of replica application memory location "x" is propagated as transmission 2102, together with the incremented associated "count value" of "4". Subsequently, transmission 2102 arrives at machine Mn where the previous value of replica application memory location "x" (that is, 99) is overwritten by the received new value of transmission 2102 (that is, the value 1082) together with the "count value" of 4.

That is to say, in the circumstances illustrated in FIG. 31, the inherent delay between the creation of an alert and the initiation of a propagation, has not adversely impacted upon the intended correct functioning of the multiple machines.

Figure 32:
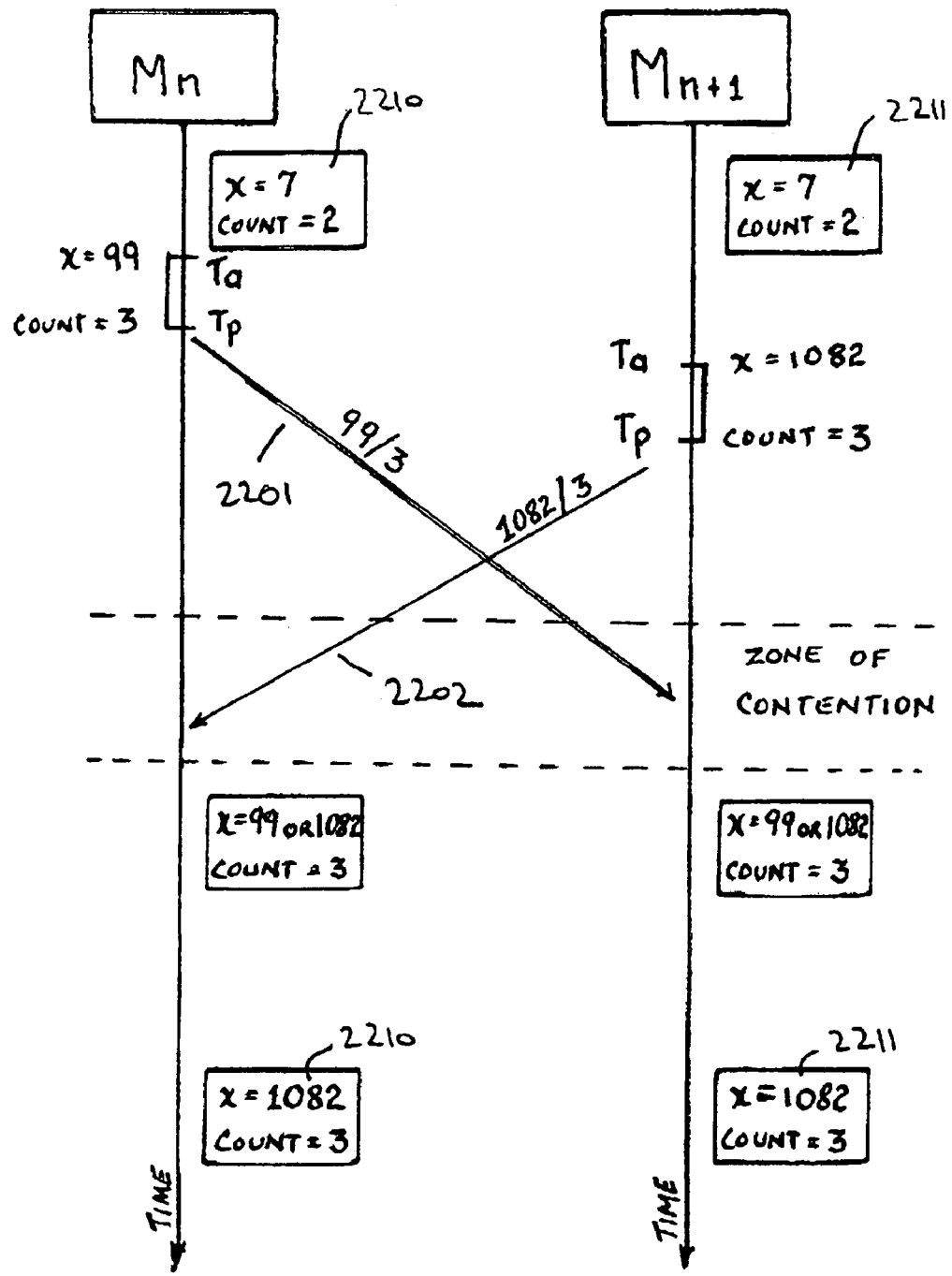
FIG. 32 illustrates the propagation of a new and/or changed value for a replicated application memory location in an alternative situation.

However, this is not always the case and in FIG. 32 an alternative situation is illustrated. In FIG. 32 initially both machines have the same value/content 7 for the replica application memory location/content "x" and a same associated count value of 2. As before, at time Ta the DRT of machine Mn is alerted that the portion of the application program executing on machine Mn has written to replicated application memory location "x" and as a result the value of replicated application memory location "x" of machine Mn has changed. Subsequently, at a time Tp machine Mn propagates the new/changed value of replica application memory location "x" together with the incremented "count value" of 3 as replica memory update transmission 2201. However, before time Tp+d at which replica memory update transmission 2201 arrives at machine Mn+1, machine Mn+1 has by carrying out its own processing of the portion of the application program executing on machine Mn+1 has written to replicated application memory location "x" and as a result has changed the value of replica application memory location "x" to 1082. Thus the DRT of machine Mn+1 is alerted at a substantially similar time Ta that the portion of the application program executing on machine Mn+1 has written to replicated application memory location "x" and as a result the value of replicated application memory location "x" on machine Mn+1 has changed. Subsequently, the DRT of machine Mn+1 transmits replica memory update transmission 2202 comprising the new/changed value of replica application memory location "x" of machine Mn+1 together with the incremented "count value" of 3. As indicated in FIG. 32, such transmission 2202 of machine Mn+1 is transmitted prior to the time Tp+d (which corresponds to receipt of transmission 2201 by machine Mn+1).

As a consequence of transmission 2201 by machine Mn and transmission 2202 by machine Mn+1 both being sent prior to receipt of the other transmission, machines Mn and Mn+1 will detect a contention/conflict situation upon receipt of the other machine's transmission, as the local/resident "count value" associated with replica application memory location "x" will contend/conflict (e.g. be equal to) the associated "count value" of the received replica update transmission of the other machine.

In accordance with the abovementioned rules for contention detection and resolution, a contention is able to be detected for above described case of FIG. 32, and is able to be resolved so that the contents of the memory location D are the same for both machines by the use of associated "resolution value(s)" as described above. Thus, when using the simple embodiment of "resolution values" described above (that is, the numerical/hierarchical numbering of machines), the situation of contention/conflict will be resolved such that the updated value generated (transmitted) by the higher numbered machine Mn+1 will prevail over the lower numbered machine Mn.

Figure 33:
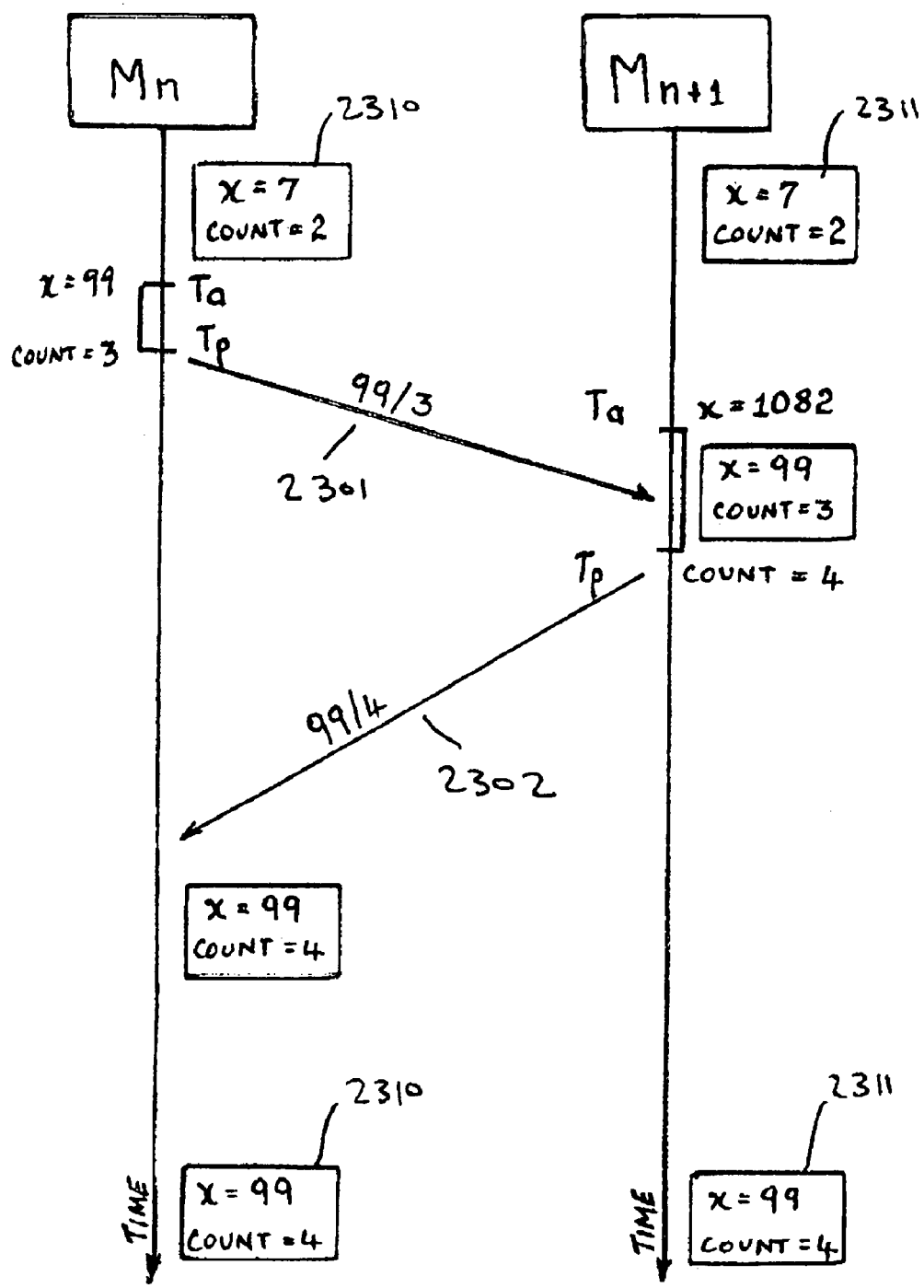
FIG. 33 illustrates the propagation of a new and/or changed value for a replicated application memory location for a situation dissimilar to that in FIG. 32.

A slightly dissimilar problem, is illustrated in FIG. 33. As before, both machines commence with the value of replicated application memory location/content "x" being 7 and the associated "count value" being 2. Optionally also though not indicated in FIG. 33, there may be stored a local/resident "resolution value" associated with replica application memory location/content "x". Again at time Ta the DRT of machine Mn is alerted that the execution of the portion of application program of machine Mn has written to replica application memory location/content "x", and as a result the content/value of replica application memory location "x" has changed. Consequently, the new/changed value of 99 for replica application memory location/content "x" is propagated by transmission 2301 at time Tp and arrives at machine Mn+1 at time Tp+d.

However, shortly before the arrival of replica memory update transmission 2301, the DRT of machine Mn+1 by means of its own processing of the portion of the same application program, is alerted that the executing portion of the same application program of machine Mn+1 has written to replica application memory location "x", and as a result the value/content of replica application memory location "x" has changed and DRT is to propagate the current/changed content/value of replica application memory location/content "x" to machine Mn. However, after time Ta of machine Mn+1 but before propagation can be carried out at time Tp+d, replica memory update transmission 2301 of machine Mn is received and actioned, causing the value/content of replica application memory location/content "x" to be overwritten with the received updated value of transmission 2301 (that is, the received updated value of "99"). As a result, when at time Tp+d the propagation of replica memory update transmission 2302 corresponding to the alert of time Ta takes place, it is this overwritten value 99 which is propagated together with the increased "count value" of 4 back to all other machines including Mn, and not the original written value "1082" of machine Mn+1. As a result as indicated in FIG. 33, replica memory update transmission 2302 sent by machine Mn+1 contains an "updated" value of 99 (which was originally received from machine Mn in transmission 2301) and not "1082", and an associated incremented "count value" of 4.

The consequence of the situation depicted in FIG. 33 is that machine Mn+1 transmits an "echo" of the received updated value of transmission 2301 of machine Mn, and not the original written value of machine Mn+1 (that is, value 1082). As a result, machine Mn receives an echo of an updated replica value it previously sent in transmission 2301, namely "99", and additionally, with a received increased "count value" of 4. This incoming message/transmission 2302 is correctly processed and actioned by machine Mn, and therefore overwrites the existing value of replica application memory location "x" with the received value of "99" (which happens to be the same as replica application memory location "x" prior to receipt of transmission 2302) and overwrites the associated resident "count value" with the received "count value" 4 of transmission 2302.

Following receipt of transmission 2302 by machine Mn, both machines have a same value/content for replica application memory location/content "x" of 99 and a count value of 4. Thus, on one level consistent updating of replica memory locations has been achieved. However, although the corresponding replica application memory locations/contents of machines Mn and Mn+1 are coherent (that is, substantially similar in value/content), the final value/content of both machines is the "echo"/"stale" value of "99" with an incremented count value of "4". This is undesirable for at least two reasons, as discussed below.

Firstly, the second transmission 2302 containing the "echoed" value of "99" from transmission 2301 represents a superfluous transmission as such transmission 2302 does not contain an updated value and instead contains an "already existing" value. This is undesirable as transmission 2302 transmits an "already existing" value and not new/changed value, and therefore transmission 2302 is an inefficient use-of the bandwidth and capacity of network 53.

Figure 35:
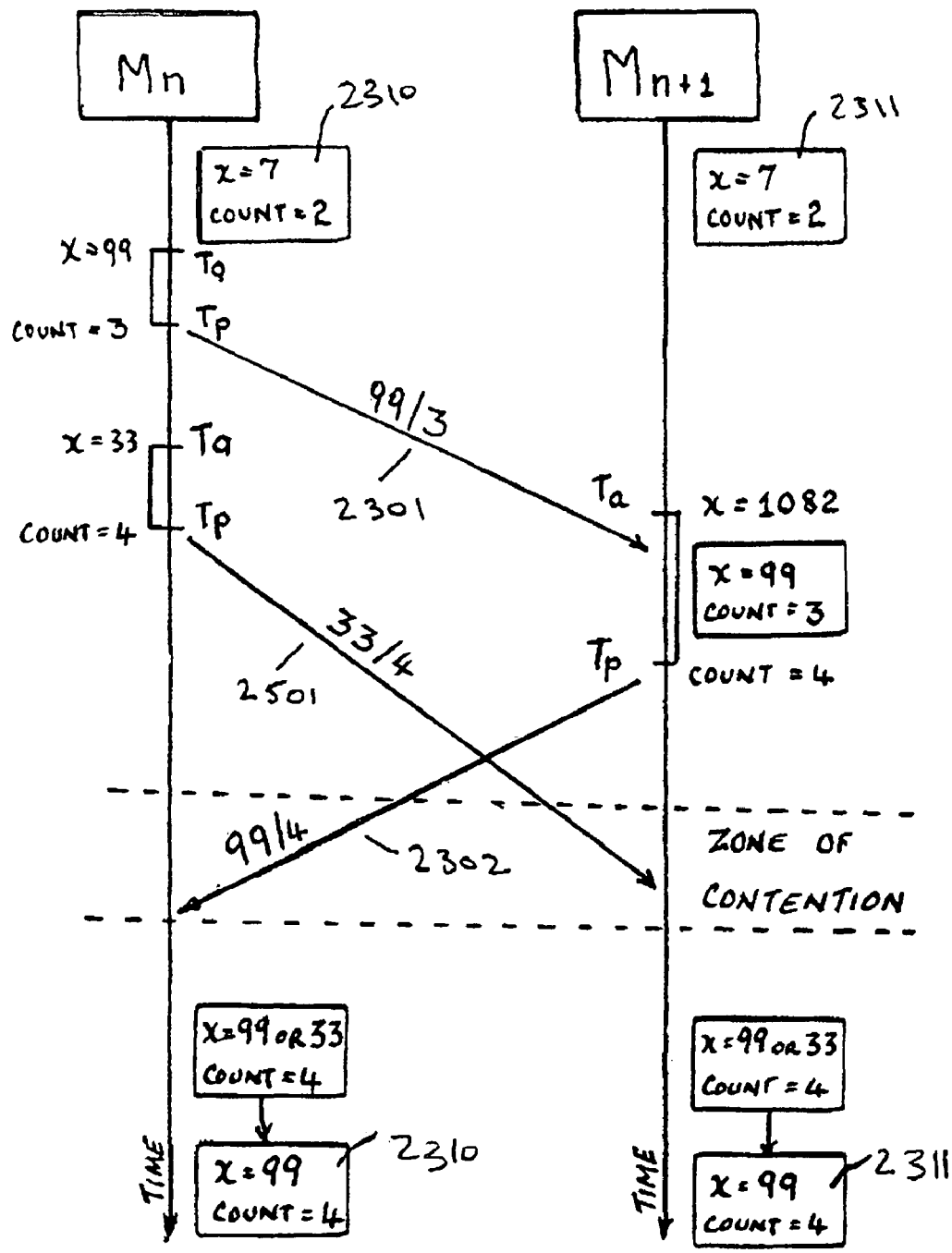
FIG. 35 illustrates an expanded case of that shown in FIG. 33.

Secondly, the second transmission 2302 containing the "echoed" value of "99" with an incremented "count value" of 4 can potentially cause inconsistent updating of replicated application memory locations, and such a potential situation is shown in FIG. 35. Thus, it is desirable to conceive an arrangement whereby such superfluous/"echo" replica memory update transmissions are disabled or otherwise do not take place.

Figure 34:
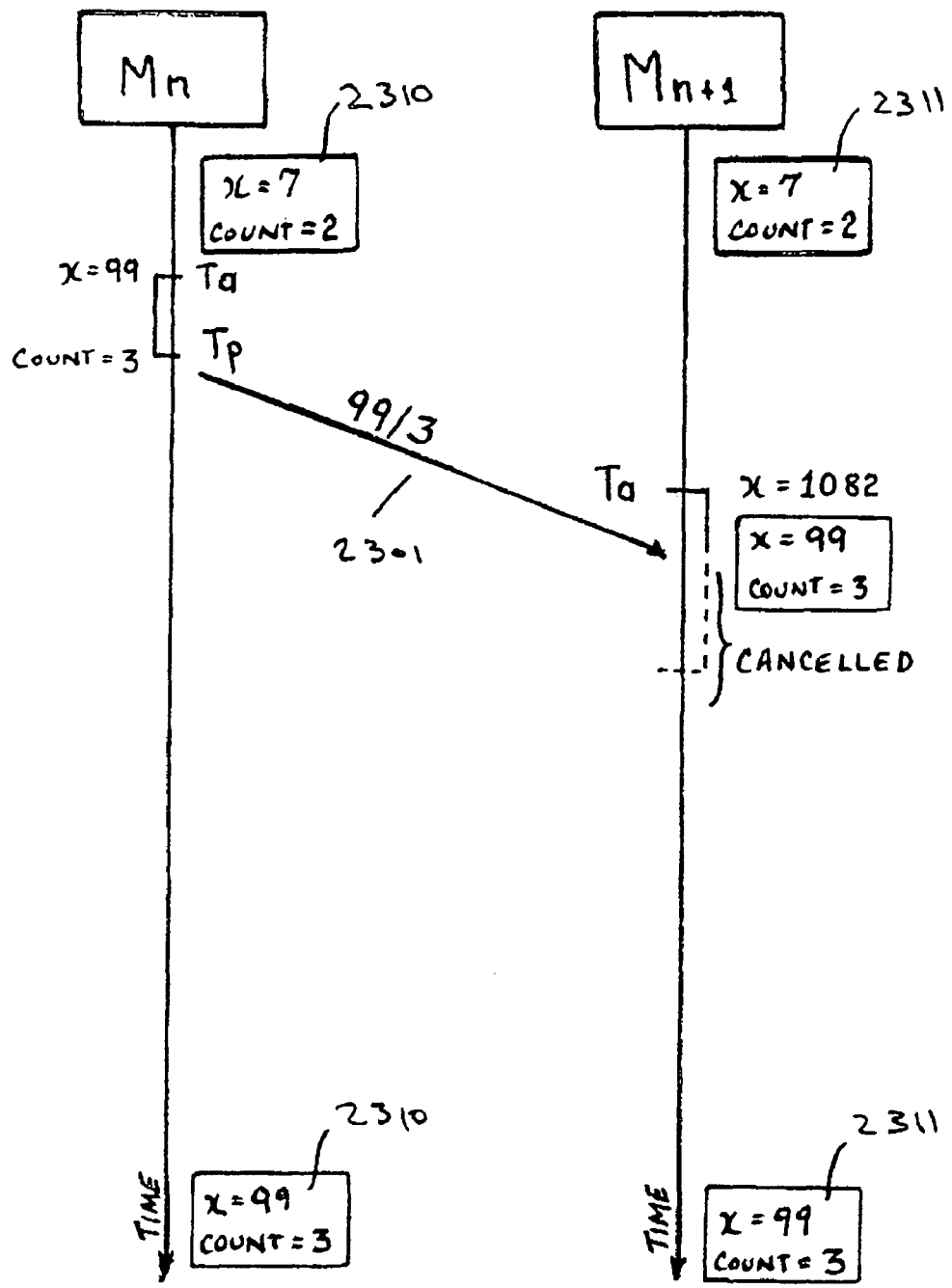
FIG. 34 illustrates a solution to the echo problem of FIG. 33.

With reference to FIG. 34, a first solution to the echo problem described in FIG. 33 is disclosed. The same timing situation as in FIG. 33 is present in FIG. 34 with replica memory update transmission 2301 from machine Mn reaching machine Mn+1 at a time Tp+d, after time Ta of machine Mn+1 when the DRT of machine Mn+1 has been alerted that the replica application memory location/content "x" has been written-to with a new value (that is, the new/changed value 1082). For this solution, the operation of all of the machines is changed to ensure that after receipt of a propagated replica memory update transmission/message, each receiving machine is to check to see if the DRT has been "alerted" (such as for example, if the DRT is in an alerted state) to carry out a replica memory update transmission/propagation for the local/resident replica application memory location/content corresponding to the received replica memory update transmission.

If the answer to this check is yes then the DRT of the receiving machine is "de-alerted" (or the previous "alert" is cancelled, revoked, or rescinded) thereby preventing the intended replica memory update transmission/propagation for the local/resident replica application memory location/content from being carried out. As a result, the situation of FIG. 33 is avoided as the potential "echo" transmission 2302 has been avoided by cancelling, revoking, rescinding, or "de-alerting" a previous "alert" of the DRT of the receiving machine. On the other hand, if the answer is no (that is, if there is no previous "alert" of the local/resident corresponding replica application memory location/content), then normal operation is resumed (that is, the received replica memory update transmission is actioned if not done so already).

This is the situation illustrated in FIG. 34 where the alert to propagate the new value 1082 of replica application memory location "x" of machine Mn+1 is cancelled (or revoked, rescinded, or de-alerted) upon receipt of transmission 2301 which corresponds to the "alerted" replica application memory location "x" of machine Mn+1. Additionally, the received value of 99 is written into the local/corresponding replica application memory location/content "x" for machine Mn+1 and, in addition, the resident "count value" associated with replica application memory location/content "x" is overwritten with the received count value of 3. As a result, as is indicated in FIG. 34 the second "echoed" transmission 2302 of FIG. 33 does not take place, as the previous "alert" to propagate a new/changed value of replica application memory location/content "x" of machine Mn+1 has been cancelled, rescinded, revoked, or otherwise "de-alerted".

As a consequence of this modification, the echo situation of FIG. 33 is prevented, and all machines are updated with replica memory update transmissions in a consistent and coherent manner. Additionally, by cancelling the second superfluous replica memory update transmission 2302, valuable bandwidth and capacity of network 53 is preserved, thereby increasing the performance and efficiency of the multiple computer system operating as a replicated shared memory arrangement as a whole.

A slightly more complex problem than that illustrated in FIG. 33 is illustrated in FIG. 35. In particular, FIG. 35 shows an expanded case of FIG. 33, whereby the problematic situation depicted in FIG. 33 is expanded to show how inconsistent updating of replica application memory locations/contents may result when the second transmission 2302 is not cancelled, revoked, rescinded, or otherwise "de-alerted" as described in the first solution above. Specifically shown in FIG. 35 is an additional replica memory update transmission 2501 occurring some time after transmission 2301 but before receipt of transmission 2302.

In FIG. 35, as in FIG. 33, replica memory update transmission 2301 is received at machine Mn+1 after the DRT of machine Mn+1 has been alerted to propagate a new written value "1082", but before that propagation can take place (in the form of replica memory update transmission 2302). As a consequence, as in FIG. 33, the subsequent replica memory update transmission/propagation 2302 at time Tp from machine Mn+1 contains the "echoed value" 99 together with the incremented "count value" of 4 as a result of the preceding receipt and actioning of replica memory update transmission 2301 by machine Mn+1.

In the meantime, the processing being carried out by machine Mn has resulted in a new value of 33 being written to replica application memory location/content "x" of machine Mn. This new written value of 33 together with an incremented associated count value of 4, is propagated by machine Mn as replica memory update transmission 2501.

However, as can be observed in FIG. 35, both replica memory update transmissions 2501 and 2302, both corresponding to the same replica application memory location "x", are transmitted with an identical incremented "count value" of 4. Thus, in accordance with the above description, these two replica memory update transmissions are said to be in contention, as upon receipt of transmission 2501 by machine Mn+1, and upon receipt of transmission 2302 by machine Mn, a situation of "contention"/"conflict" will be detected between the received transmission and the corresponding resident "count value" (both of which will have the same value of 4).

Specifically, such a circumstance as this is very undesirable as the contention situation between transmission 2501 and 2302, containing values "33" and "99" respectively, actually represents a contention situation between the two values "99" and "33" generated by the same machine Mn (as opposed to two different values, each generated by a different machine). Clearly the correct and intended value of the application program and application programmer for replica application memory location/content "x" should be "33" and not "99", as the value "99" is clearly an "older" and "inconsistent" value as expected by the application program and application programmer.

However, in accordance with the above description for contention detection and resolution, then resident and transmitted "resolution values" associated with replica application memory location "x" may be used to resolve such detected contention/conflict situations to a single prevailing transmission (and therefore a single prevailing value of such prevailing transmission). When a simple embodiment of "resolution values" utilising numerical/hierarchical identifiers of the transmitting machine(s) as described above is used in the situation of FIG. 35, then transmission 2302 of machine Mn+1 will prevail. This is indicated in FIG. 35 by boxes 2310 and 2311, where it is indicated that at the end of the time sequence each machine Mn and Mn+1 resolves to a consistent value of "99" for the replicated application memory location/content "x" (as the number/hierarchical value of machine Mn+1 is greater than the number/hierarchical value of machine Mn). Clearly, this is still an undesirable result, as a later written value "33" of machine Mn is overwritten by an earlier written value "99" of the same machine. Clearly, unintended and inconsistent application operation and behaviour of the application program may result from the circumstances and operation depicted in FIG. 35.

An alternative solution to the abovedescribed situation will now be described in relation to FIG. 36.

Figure 36:
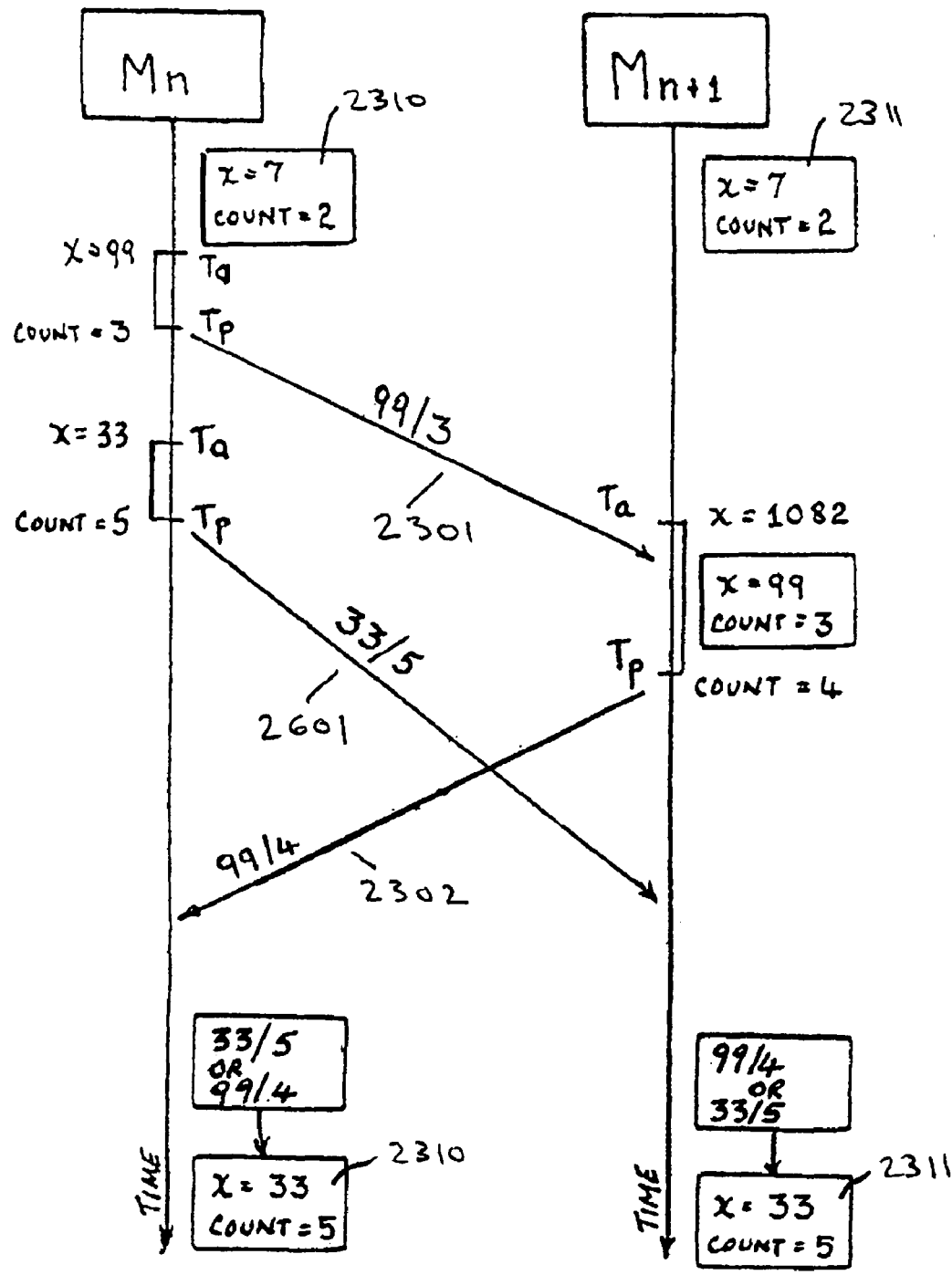
FIG. 36 illustrates an alternative arrangement similar to that shown in FIG. 35.

FIG. 36 shows a similar arrangement to FIG. 35, with the modification being the replacement of replica memory update transmission 2501 by machine Mn, with a new transmission 2601 in accordance with a second alternative embodiment. Specifically, as seen in FIG. 36, the initial actions and circumstances are the same as in FIG. 35 in relation to transmission 2301 and 2302, where machine Mn+1 transmits an "echo" of the received value of transmission 2301 back to all other machines including machine Mn as the second transmission 2302, the "echo" transmission including the "echo value" of "99" for replica application memory location/content "x" and an associated incremented "count value" of 4.

However, in the arrangement of FIG. 36, the operation of all machines has been modified by means of the introduction of a simple rule, namely that where a machine is about to transmit/propagate a new replica memory update transmission containing a new/changed value for a replica application memory location/content, and that same machine was the previous machine which generated the previous replica update transmission for the same replica application memory location/content, then the count value for the newly generated replica memory update transmission is not incremented by 1, but instead is incremented by 2 (or at least 2).

For example, such an advantageous rule can be accomplished by storing or recording on each machine an indication of whether or not the last replica memory update transmission (whether sent or received) corresponding to a replicated application memory location/content, was sent by the local machine. If such a stored record or indication indicates that the last replica memory update transmission sent or received by the local machine for a specific replica application memory location/content, was transmitted (sent) by this machine, then the associated local/resident "count value" (and so too the transmitted "count value") is incremented not by 1 (if "1" is the "regular" increment unit), but instead by 2 (or alternatively, incremented by any suitable value so as to be at least one increment (or decrement) unit higher (or lower respectively) than a "regular" increment). Alternatively, if such a stored record or indication indicates that the last replica memory update transmission sent or received by the local machine for a specific replica application memory location/content, was not transmitted (sent) by this machine, then the associated local/resident "count value" (and so too the transmitted "count value") is incremented by 1 (if "1" is the "regular" increment unit).

The results of such a rule applied to the circumstance of FIG. 35 are shown in FIG. 36. As a consequence of this new rule, the replica memory update transmission 2601 propagated by machine Mn includes the update/changed value "33" as before, but now includes a count value of 5 instead of 4 (the value 5 being generated by incrementing the resident/local "count value" of 3 by 2). This has the consequence that instead of a state of contention/conflict resulting between replica memory update transmissions 2601 and 2301, the replica memory update transmission 2601 containing the "correct" updated/changed value 33 for replica application memory location/content "x" prevails because it has the higher "count value" than transmission 2302. As a result, no contention/conflict situation arises between the two transmission 2302 and 2601, and consistent updating of replicated application memory location/content "x" is achieved.

Clearly the above arrangement can also be made to operate such that the normal increment to the updating count is, say 2, and the echo suppressing increment to the updating count is 3 (or 4, or more than 4).

The foregoing describes only some embodiments of the present invention and modifications, obvious to those skilled in the computing arts, can be made thereto without departing from the scope of the present invention. For example, reference to JAVA includes both the JAVA language and also JAVA platform and architecture.

Similarly, the "count values" and "resolution values" described above are integers but this need not be the case. Fractional "count values" and/or "resolution values" (i.e. using a float or floating point arithmetic or decimal fraction) are possible but are undesirably complex.

It will also be appreciated to those skilled in the art that rather than incrementing the "count value" for successive messages, the "count value" could be decremented instead. This would result in later messages being identified by lower "count values" rather than higher "count values" as described above.

Alternative arrangements of transmitted "resolution values" are provide by this invention. Specifically, it is anticipated that transmitted "resolution value(s)" of a replica memory update transmission may take the form of an header value of a packet or message, such as the address or identity or the source machine of the packet or message. Thus, the "resolution value" may take any transmitted form so long as such transmitted value may be used in accordance with the abovedescribed methods for resolving conflicting replica update transmissions by the use of "resolution value(s)".

It is also provided in alternative embodiments of this invention that "count values" and/or "resolution values" transmitted in replica memory update transmissions may take any form, including headers, or other packet fields.

In the various embodiments described above, local/resident "count value(s)" of written-to replicated memory location(s) are described to be incremented by a value of "1" prior to, or upon occasion of, a replica update transmission by a sending machine being transmitted. Such incremented "count value" is also described to be stored to overwrite/replace the previous local/resident "count value" of the transmitting machine (e.g. that is, the local/resident "count value" from which the incremented "count value" was calculated). However, it is not a requirement of the present invention that such incremented "count values" must be incremented by a value of "1". Instead, alternative arrangements are provided where such incremented "count value(s)" may be (or have been) incremented by a value of more than "1" (for example, "2", or "10", or "100"). Specifically, exactly what increment value is chosen to be employed to increment a "count value" is not important for this invention, so long as the resulting "incremented count value" is greater than the previous local/resident "count value".

Furthermore, alternative arrangements to incrementing the resident "count value" are also provided. Specifically, it is not a requirement of the present invention that such updated "count value(s)" of a replica update transmission must be incremented, and instead any other method or means or arrangement may be substituted to achieve the result of updated "count value(s)" which are greater than the previous local/resident "count value(s)". Consequently, what is important is that corresponding to a replica update transmission being transmitted, that such replica update transmission comprises an "updated count value" which is greater than the previous known "local/resident count value" of the transmitting machine (such as may be known for example at the time of transmission, or alternatively as may be known at a time when the replica update transmission is prepared for, or begins preparation for, transmission), and also that such previous known "local/resident count value" of the transmitting machine is overwritten/replaced with the transmitted "updated count value".

Also, alternative arrangements of the present invention provide that "count values" and "resolution values" may be stored and/or operated as a combined value, such as for example, the "count value" stored as the lower 24 bits of a single 32 bit value, and the "resolution value" stored as the upper 8 bits of the same single 32 bit value. Alternatively or additionally, such combined storage scheme may be employed during transmission of "count values" and "resolution values", such that a replica update transmission comprising a "count value" and a "resolution value" are transmitted as a single combined value (such as described above). Ultimately, the specific storage arrangement of "resolution values" and "counter values" for replicated memory locations and transmission of replica memory updates is not important to this invention, so long as both such values are transmitted and/or stored in a form compatible with the abovedescribed methods.

The term "distributed runtime system", "distributed runtime", or "DRT" and such similar terms used herein are intended to capture or include within their scope any application support system (potentially of hardware, or firmware, or software, or combination and potentially comprising code, or data, or operations or combination) to facilitate, enable, and/or otherwise support the operation of an application program written for a single machine (e.g. written for a single logical shared-memory machine) to instead operate on a multiple computer system with independent local memories and operating in a replicated shared memory arrangement. Such DRT or other "application support software" may take many forms, including being either partially or completely implemented in hardware, firmware, software, or various combinations therein.

The methods described herein are preferably implemented in such an application support system, such as DRT described in International Patent Application No. PCT/AU2005/000580 published under WO 2005/103926 (and to which U.S. patent application Ser. No. 11/111,946, however this is not a requirement. Alternatively, an implementation of the above methods may utilize a functional or effective application support system (such as a DRT described in the abovementioned PCT specification) either in isolation, or in combination with other softwares, hardwares, firmwares, or other methods of any of the above incorporated specifications, or combinations therein.

The reader is directed to the abovementioned PCT specification for a full description, explanation and examples of a distributed runtime system (DRT) generally, and more specifically a distributed runtime system for the modification of application program code suitable for operation on a multiple computer system with independent local memories functioning as a replicated shared memory arrangement, and the subsequent operation of such modified application program code on such multiple computer system with independent local memories operating as a replicated shared memory arrangement.

Also, the reader is directed to the abovementioned PCT specification for further explanation, examples, and description of various anticipated methods and means which may be used to modify application program code during loading or at other times.

Also, the reader is directed to the abovementioned PCT specification for further explanation, examples, and description of various anticipated methods and means which may be used to modify application program code suitable for operation on a multiple computer system with independent local memories and operating as a replicated shared memory arrangement.

Finally, the reader is directed to the abovementioned PCT specification for further explanation, examples, and description of various methods and means which may be used to operate replicated memories of a replicated shared memory arrangement, such as updating of replicated memories when one of such replicated memories is written-to or modified.

In alternative multicomputer arrangements, such as distributed shared memory arrangements and more general distributed computing arrangements, the above described methods may still be applicable, advantageous, and used. Specifically, any multi-computer arrangement where replica, "replica-like", duplicate, mirror, cached or copied memory locations exist, such as any multiple computer arrangement where memory locations (singular or plural), objects, classes, libraries, packages etc are resident on a plurality of connected machines and preferably updated to remain consistent, then the above methods apply. For example, distributed computing arrangements of a plurality of machines (such as distributed shared memory arrangements) with cached memory locations resident on two or more machines and optionally updated to remain consistent comprise a functional "replicated memory system" with regard to such cached memory locations, and is to be included within the scope of the present invention. Thus, it is to be understood that the aforementioned methods apply to such alternative multiple computer arrangements. The above disclosed methods may be applied in such "functional replicated memory systems" (such as distributed shared memory systems with caches) mutatis mutandis.

It is also provided and envisaged that any of the described functions or operations described as being performed by an optional server machine X (or multiple optional server machines) may instead be performed by any one or more than one of the other participating machines of the plurality (such as machines M1, M2, M3 . . . Mn of FIG. 1).

Alternatively or in combination, it is also further provided and envisaged that any of the described functions or operations described as being performed by an optional server machine X (or multiple optional server machines) may instead be partially performed by (for example broken up amongst) any one or more of the other participating machines of the plurality, such that the plurality of machines taken together accomplish the described functions or operations described as being performed by an optional machine X. For example, the described functions or operations described as being performed by an optional server machine X may broken up amongst one or more of the participating machines of the plurality.

Further alternatively or in combination, it is also further anticipated and envisaged that any of the described functions or operations described as being performed by an optional server machine X (or multiple optional server machines) may instead be performed or accomplished by a combination of an optional server machine X (or multiple optional server machines) and any one or more of the other participating machines of the plurality (such as machines M1, M2, M3 . . . Mn), such that the plurality of machines and optional server machines taken together accomplish the described functions or operations described as being performed by an optional single machine X. For example, the described functions or operations described as being performed by an optional server machine X may broken up amongst one or more of an optional server machine X and one or more of the participating machines of the plurality.

Various record storage and transmission arrangements may be used when implementing this invention. One such record or data storage and transmission arrangement is to use "lists" or "tables", or other similar data storage structures. Regardless of the specific record or data storage and transmission arrangements used, what is important is that the replicated written-to memory locations are able to be identified, and their updated values (and identity) are to be transmitted to other machines (preferably machines of which a local replica of the written-to memory locations reside) so as to allow the receiving machines to store the received updated memory values to the corresponding local replica memory locations.

Thus, the methods of this invention are not to be restricted to any of the specific described record or data storage or transmission arrangements, but rather any record or data storage or transmission arrangement which is able to accomplish the methods of this invention may be used.

Specifically with reference to the described example of a "table" or "list", the use of a "table" storage or transmission arrangement (and the use of the term "table" or "list" generally) is illustrative only and to be understood to include within its scope any comparable or functionally equivalent record or data storage or transmission means or method, such as may be used to implement the methods of this invention.

The terms "object" and "class" used herein are derived from the JAVA environment and are intended to embrace similar terms derived from different environments, such as modules, components, packages, structs, libraries, and the like.

The use of the term "object" and "class" used herein is intended to embrace any association of one or more memory locations. Specifically for example, the term "object" and "class" is intended to include within its scope any association of plural memory locations, such as a related set of memory locations (such as, one or more memory locations comprising an array data structure, one or more memory locations comprising a struct, one or more memory locations comprising a related set of variables, or the like).

Reference to JAVA in the above description and drawings includes, together or independently, the JAVA language, the JAVA platform, the JAVA architecture, and the JAVA virtual machine. Additionally, the present invention is equally applicable mutatis mutandis to other non-JAVA computer languages (including for example, but not limited to any one or more of, programming languages, source-code languages, intermediate-code languages, object-code languages, machine-code languages, assembly-code languages, or any other code languages), machines (including for example, but not limited to any one or more of, virtual machines, abstract machines, real machines, and the like), computer architectures (including for example, but not limited to any one or more of, real computer/machine architectures, or virtual computer/machine architectures, or abstract computer/machine architectures, or microarchitectures, or instruction set architectures, or the like), or platforms (including for example, but not limited to any one or more of, computer/computing platforms, or operating systems, or programming languages, or runtime libraries, or the like).

Examples of such programming languages include procedural programming languages, or declarative programming languages, or object-oriented programming languages. Further examples of such programming languages include the Microsoft.NET language(s) (such as Visual BASIC, Visual BASIC.NET, Visual C/C++, Visual C/C++.NET, C#, C#.NET, etc), FORTRAN, C/C++, Objective C, COBOL, BASIC, Ruby, Python, etc.

Examples of such machines include the JAVA Virtual Machine, the Microsoft NET CLR, virtual machine monitors, hypervisors, VMWare, Xen, and the like.

Examples of such computer architectures include, Intel Corporation's x86 computer architecture and instruction set architecture, Intel Corporation's NetBurst microarchitecture, Intel Corporation's Core microarchitecture, Sun Microsystems' SPARC computer architecture and instruction set architecture, Sun Microsystems' UltraSPARC III microarchitecture, IBM Corporation's POWER computer architecture and instruction set architecture, IBM Corporation's POWER4/POWER5/POWER6 microarchitecture, and the like.

Examples of such platforms include, Microsoft's Windows XP operating system and software platform, Microsoft's Windows Vista operating system and software platform, the Linux operating system and software platform, Sun Microsystems' Solaris operating system and software platform, IBM Corporation's AIX operating system and software platform, Sun Microsystems' JAVA platform, Microsoft's .NET platform, and the like.

When implemented in a non-JAVA language or application code environment, the generalized platform, and/or virtual machine and/or machine and/or runtime system is able to operate application code in the language(s) (including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine.

It will also be appreciated in light of the description provided herein that platform and/or runtime system may include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

In the JAVA language memory locations include, for example, both fields and elements of array data structures. The above description deals with fields and the changes required for array data structures are essentially the same mutatis mutandis.

Any and all embodiments of the present invention are to be able to take numerous forms and implementations, including in software implementations, hardware implementations, silicon implementations, firmware implementation, or software/hardware/silicon/firmware combination implementations.

Various methods and/or means are described relative to embodiments of the present invention. In at least one embodiment of the invention, any one or each of these various means may be implemented by computer program code statements or instructions (including by a plurality of computer program code statements or instructions) that execute within computer logic circuits, processors, ASICs, microprocessors, microcontrollers, or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by a combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

For ease of description, some or all of the indicated memory locations herein may be indicated or described to be replicated on each machine, and therefore, replica memory updates to any of the replicated memory locations by one machine, will be transmitted/sent to all other machines. Importantly, the methods and embodiments of this invention are not restricted to wholly replicated memory arrangements, but are applicable to and operable for partially replicated shared memory arrangements mutatis mutandis (e.g. where one or more replicated memory locations are only replicated on a subset of a plurality of machines).

All described embodiments and arrangements of the present invention are equally applicable to replicated shared memory systems, whether partially replicated or not. Specifically, partially replicated shared memory arrangements where some plurality of memory locations are replicated on some subset of the total machines operating in the replicated shared memory arrangement, themselves may constitute a replicated shared memory arrangement for the purposes of this invention.

Figure 22:
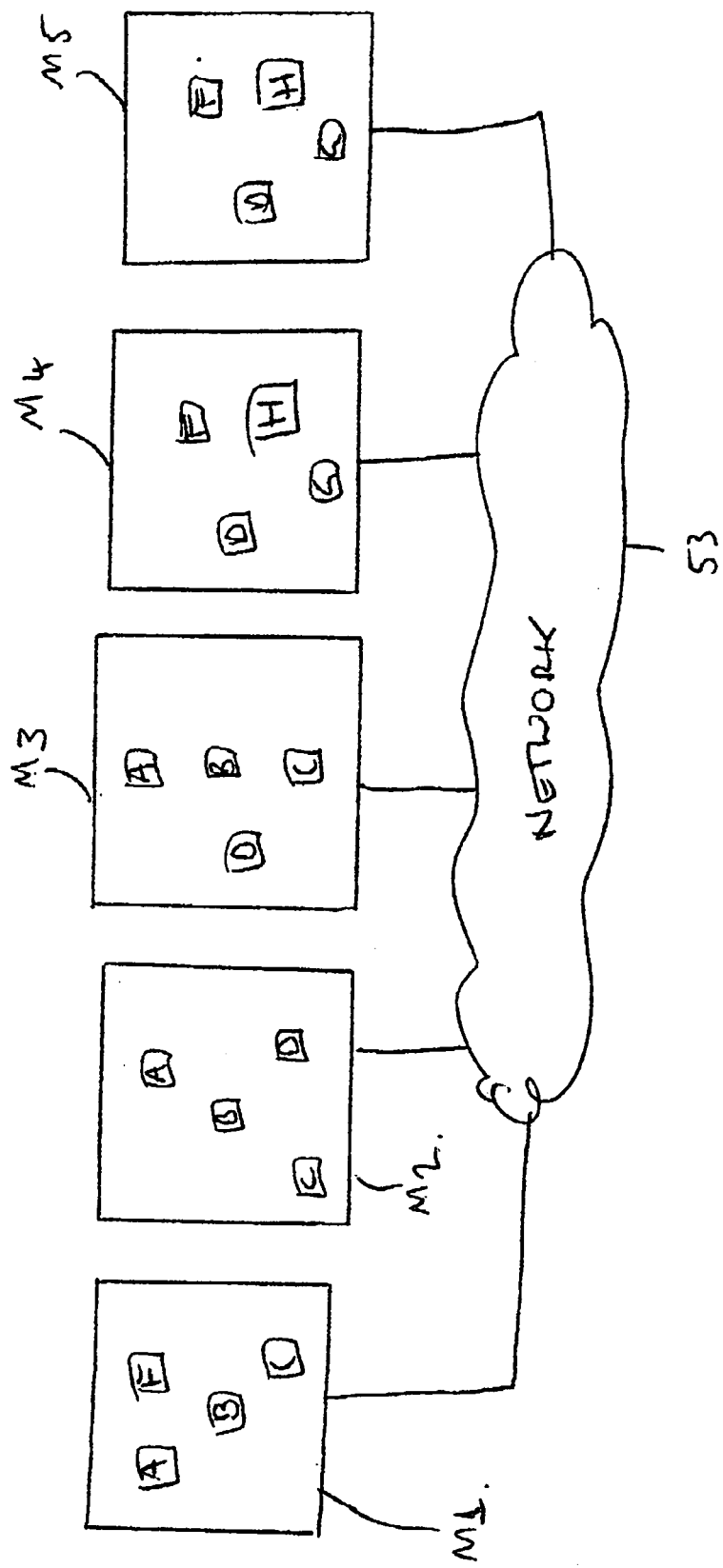

With reference to FIG. 22, where memory locations "A", "B", and "C" are replicated on three machines M1, M2, and M3 of a five machine replicated shared memory arrangement (having additional machines M4 and M5), then for the purposes of this invention the term replicated shared memory arrangement is not to be restricted to all 5 machines M1-M5, but may be also encompass any lesser plurality of machines (less than the total number of machines) in the operating arrangement, such as for example machines M1-M3. Thus, machines M1, M2 and M3 with replicated memory locations "A", "B" and "C" constitute a replicated shared memory arrangement in their own right (without machines M4 or M5).

Typically, the replicated shared memory arrangements described and illustrated within this invention generally are explained to include a plurality of independent machines with independent local memories, such as that depicted in FIGS. 2 and 22. However, various alternative machine arrangements including a replicated shared memory system are provided by, and included within the scope of, this invention.

Specifically, the term "machine" used herein to refer to a singular computing entity of a plurality of such entities operating as a replicated shared memory arrangement is not to be restricted or limited to mean only a single physical machine or other single computer system. Instead, the use of the term "machine" herein is to be understood to encompass and include within its scope a more broad usage for any "replicated memory instance" (or "replicated memory image", or "replicated memory unit") of a replicated shared memory arrangement.

Specifically, replicated shared memory arrangements as described herein include a plurality of machines, each of which operates with an independent local memory. Each such independent local memory of a participating machine within a replicated shared memory arrangement represents an "independent replicated memory instance" (whether partially replicated or fully replicated). That is, the local memory of each machine in a plurality of such machines operating as a replicated shared memory arrangement, represents and operates as an "independent replicated memory instance". Whilst the most common embodiment of such a "replicated memory instance" is a single such instance of a single physical machine comprising some subset, or total of, the local memory of that single physical machine, "replicated memory instances" are not limited to such single physical machine arrangements only.

For example, it is provided by this invention in the use of the term "machine" to include within its scope any of various "virtual machine" or similar arrangements. One general example of a "virtual machine" arrangement is indicated in FIG. 23. Such virtual machine arrangements may take the form of hypervisor or virtual machine monitor assisted arrangements such as VMWare virtual machine instances, or Xen paravirtualization instances. Alternative substantially equivalent virtual machine arrangements also include Solaris Containers, Isolated Software Domains, Parallel Operating System instances, substantially independent Application Processes or Tasks with independent and/or isolated and/or protected memories, or any other such independent virtual machine instance or such similar multi-program arrangement with an independent or isolated or protected memory. Those skilled in the computing arts will be familiar with various alternative "virtual machine" arrangements.

Utilising any of the various "virtual machine" arrangements, multiple "virtual machines" may reside on, or occupy, a single physical machine, and yet operate in a substantially independent manner with respect to the methods of this invention and the replicated shared memory arrangement as a whole. Essentially then, such "virtual machines" appear, function, and/or operate as independent physical machines, though in actuality share, or reside on, a single common physical machine. Such an arrangement of "n" "virtual machines" N11410 is depicted in FIG. 23.

In FIG. 23, a single physical machine N11401 is indicated comprising hardware N11402 and a hypervisor and/or operating system N11403. Shown to be operating within machine N11401 and above the hypervisor/operating system layer, are n "virtual machines" N11410 (that is, N11410/1, N11410/2 . . . N11410/n), each with a substantially independent, isolated and/or protected local memory (typically comprising some subset of the total memory of machine N11401).

Each such "virtual machine" N11410 for the purposes of this invention may take the form of a single "replicated memory instance", which is able to behave as, and operate as, a "single machine" of a replicated shared memory arrangement.

When two or more such "virtual machines" reside on, or operate within, a single physical machine, then each such single "virtual machine" will typically represent a single "replicated memory instance" for the purposes of replicated shared memory arrangements. In otherwords, each "virtual machine" with a substantially independent memory of any other "virtual machine", when operating as a member of a plurality of "replicated memory instance" in a replicated shared memory arrangement, will typically represent and operate as a single "replicated memory instance", which for the purposes of this invention comprises a single "machine" in the described embodiments, drawings, arrangements, description, and methods contained herein.

Thus, it is provided by this invention that a replicated shared memory arrangement, and the methods of this invention applied and operating within such an arrangement may include a plurality of "replicated memory instances", which may or may not each correspond to a single independent physical machine. For example, replicated shared memory arrangements are provided where such arrangements comprise a plurality (such as for example 10) of virtual machine instances operating as independent "replicated memory instances", where each virtual machine instance operates within one common, shared, physical machine.

Alternatively for example, replicated shared memory arrangements are provided where such arrangements comprise some one or more virtual machine instances of a single physical machine operating as independent "replicated memory instances" of such an arrangement, as well as some one or more single physical machines not operating with two or more "replicated memory instances".

Further alternatively arrangements of "virtual machines" are also provided and to be included within the scope of the present invention, including arrangements which reside on, or operate on, multiple physical machines and yet represent a single "replicated memory instance" for the purposes of a replicated shared memory arrangement.

Any combination of any of the above described methods or arrangements are provided and envisaged, and is to be included within the scope of the present invention.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

It is advantageous to use a global identifier is as a form of 'meta-name' or 'meta-identity' for all the similar equivalent local objects (or classes, or assets or resources or the like) on each one of the plurality of machines M1, M2 . . . . Mn. For example, rather than having to keep track of each unique local name or identity of each similar equivalent local object on each machine of the plurality of similar equivalent objects, one may instead define or use a global name corresponding to the plurality of similar equivalent objects on each machine (eg "globalname7787"), and with the understanding that each machine relates the global name to a specific local name or object (eg "globalname7787" corresponds to object "localobject456" on machine M1, and "globalname7787" corresponds to object "localobject885" on machine M2, and "globalname7787" corresponds to object "localobject111" on machine M3, and so forth).

It will also be apparent to those skilled in the art in light of the detailed description provided herein that in a table or list or other data structure created by each DRT 71 when initially recording or creating the list of all, or some subset of all objects (eg memory locations or fields), for each such recorded object on each machine M1, M2 . . . Mn there is a name or identity which is common or similar on each of the machines M1, M2 . . . Mn. However, in the individual machines the local object corresponding to a given name or identity will or may vary over time since each machine may, and generally will, store memory values or contents at different memory locations according to its own internal processes. Thus the table, or list, or other data structure in each of the DRTs will have, in general, different local memory locations corresponding to a single memory name or identity, but each global "memory name" or identity will have the same "memory value or content" stored in the different local memory locations. So for each global name there will be a family of corresponding independent local memory locations with one family member in each of the computers. Although the local memory name may differ, the asset, object, location etc has essentially the same content or value. So the family is coherent.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:
 (i) re-compilation at loading,
 (ii) a pre-compilation procedure prior to loading,
 (iii) compilation prior to loading,
 (iv) "just-in-time" compilation(s), or
 (v) re-compilation after loading (but, for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language.

Those skilled in the programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Microsoft.NET platform and architecture (Visual Basic, Visual C/C++, and C#) FORTRAN, C/C++, COBOL, BASIC etc.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to memory updating means and/or memory replicating means, distributed run time means, modifier or modifying means, and the like. Any one or each of these various means may be implemented by computer program code statements or instructions (possibly including by a plurality of computer program code statements or instructions) that execute within computer logic circuits, processors, ASICs, microprocessors, microcontrollers or other logic to modify the operation of such logic or circuits to accomplish the recited operation or function. In another arrangement, any one or each of these various means may be implemented in firmware and/or in hardware. Furthermore, any one or each of these various means may be implemented by a combination of computer program software, firmware, and/or hardware.

Any and each of the above described methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer in which it executes or on a computer coupled with, connected to, or otherwise in signal communications with the computer on which the computer program or computer program product is present or executing. Such a computer program or computer program product modifies the operation and architectural structure of the computer, computing machine, and/or information appliance to alter the technical operation of the computer and realize the technical effects described herein.

The invention may therefore be constituted by a computer program product comprising a set of program instructions stored in a storage medium or existing electronically in any form and operable to permit a plurality of computers to carry out any of the methods, procedures, routines, or the like as described herein including in any of the claims.

Furthermore, the invention includes a plurality of computers interconnected via a communication network or other communications link or path and each operable to substantially simultaneously or concurrently execute the same or a different portion of an application code written to operate on only a single computer on a corresponding different one of computers. The computers are programmed to carry out any of the methods, procedures, or routines described in the specification or set forth in any of the claims, on being loaded with a computer program product or upon subsequent instruction. Similarly, the invention also includes within its scope a single computer arranged to co-operate with like, or substantially similar, computers to form a multiple computer system.

To summarize, there is disclosed a method of updating the contents of at least one memory location at each of at least two physical locations interconnected by a communications link over which memory updating messages are sent, the method comprising the step of:
(i) associating with each memory updating message verification data which enables the physical location to be updated to verify the updating messages.

Preferably the verification data comprises a count value indicative of the position of the corresponding message in a sequence of updating messages.

Preferably the verification data further comprises a resolution count indicative of the source of the updating message.

Preferably the method includes the further step of:
(ii) from time to time re-setting the count value.

Preferably the method includes the further step of:
(iii) incrementing, or decrementing, the count value for successive messages from the same source.

Preferably the method includes the further step of:
(iv) incrementing, or decrementing respectively, the count value by one.

Preferably the method includes the further step of:
(v) in circumstances likely to cause an echo updating message to be generated, incrementing, or decrementing respectively, the count value by more than one.

Also there is disclosed a multiple computer system adapted to carry out the above method or methods, each computer of the system comprising one of the physical locations.

Further there is disclosed a single computer adapted to communicate with other computes to form the above multiple computer system.

A computer program product is also disclosed which when loaded into a computer enables the computer to carry out the above method.

Furthermore there is disclosed a system for updating the contents of at least one memory location at each of at least two physical locations interconnected by a communications link over which memory updating messages are sent, wherein each the memory updating message has verification data associated with it, the verification data enabling the physical location to be updated to verify the updating messages.

Preferably the verification data comprises a count value indicative of the position of the corresponding message in a sequence of updating messages.

Preferably the verification data further comprises a resolution count indicative of the source of the updating message.

Preferably the method includes resetting means to reset the count value from time to time.

Preferably the method includes count means to increment, or decrement, the count value for successive messages from the same source.

Preferably the count means increments, or decrements respectively, the count value by one.

Preferably in circumstances likely to cause an echo updating message to be generated, the count means increments, or decrements respectively, the count value by more than one.

To summarize, there is disclosed a method of detecting contention in addressed memory updating in which a memory location having a specific location identifier can be updated substantially simultaneously from a plurality of sources, the method comprising the steps of:
(i) utilizing an updating format for the signal or packet carrying out the updating, the format comprising the specific identifier of the memory location to be updated, the content with which the memory location is to be updated, and a resident updating count of the updating source, the count comprising a number indicative of the position of the updating message in the sequence of occasions on which the updating source has been updated inclusive of the current updating,
(ii) storing for each receiving memory location the updating count of the previously received updating,
(iii) comparing the updating count presently resident at the receiving memory location with the updating count of any currently received updating signal or packet, and
(iv) indicating a contention situation if the compared updating counts are the same.

Preferably the method includes the further step of:
(v) incrementing the resident updating count of the updating source on each occasion on which the updating source is locally updated.

Preferably the method includes the further step of:
(vi) incrementing the updating source resident updating count by one.

Preferably the memory location is one of a plurality of memory locations resident in one of a plurality of computers and each of the plurality of computers has substantially the same structure of memory locations.

Preferably each the updatable memory location in one of the computers has a corresponding memory location in each of the others of the computers.

Preferably each the updatable memory location has a local memory address which is different from the location identifier.

There is also disclosed a system for detecting contention in addressed memory updating, the system comprising at least one memory location having a specific location identifier; a plurality of sources each of which can update the memory location(s) and each of which utilizes an updating format for the signal or packet carrying out the updating, the format comprising the specific identifier of the memory location to be updated, the content with which the memory location is to be updated, and a resident updating count of the updating source, the count comprising a number indicative of the position of the updating message in the sequence of occasions on which the updating source has been updated inclusive of the current updating; a storage means associated with each the memory location and in which the updating count of the previously received updating is stored; comparison means to compare the previously stored updating count with the updating count of any currently received updating signal or packet; and contention indicating means connected with the comparison means and operable to indicate a contention situation if the compared updating counts are the same.

Preferably the method includes incrementing means to increment the resident updating count of the updating source on each occasion on which the updating source is locally updated.

Preferably the incrementing means increments the resident updating count by one.

Preferably the memory location is one of a plurality of memory locations resident in one of a plurality of computers and each of the plurality of computers has substantially the same structure of memory locations.

Preferably each the updatable memory location in one of the computers has a corresponding memory location in each of the others of the computers.

Preferably each the updatable memory location has a local memory address which is different from the location identifier.

In addition, there is also disclosed in a multiple computer system comprising a multiplicity of computers, each interconnected via at least one communications network, and each executing a different portion of an applications program written to execute on a single computer and, each having an independent local memory with at least one memory location being replicated in each the local memory, and a method of detecting contention in replica memory updating in which a memory location having a specific location identifier and replicated on at least two of the computers, can be updated substantially simultaneously from a plurality of sources, the method comprising the steps of:
(i) utilizing an updating format for the signal or packet carrying out the updating, the format comprising the specific identifier of the memory location to be updated, the content with which the memory location is to be updated, and a resident updating count of the updating source, the count comprising a number indicative of the sequence of occasions on which the updating source has been updated inclusive of the current updating,
(ii) storing for each replicated memory location the updating count of the previously sent or received updating,
(iii) comparing the resident updating count associated with the replicated memory location to be updated with the updating count of the currently received updating signal or packet, and
(iv) indicating a contention situation if the compared updating counts are the same.

Furthermore there is also disclosed a multiple computer system comprising a multiplicity of computers, each interconnected via at least one communications network, and each executing a different portion of an applications program written to execute on a single computer, and each having an independent local memory with at least one memory location being replicated in each the local memory, and a detection means for detecting contention in replica memory updating, the detection means comprising at least one memory location having a specific location identifier and replicated on at least two machines, and updated to remain substantially similar upon occasion of a machine modifying its replica value; a plurality of sources each of which can update the memory location(s) and each of which utilizes an updating format for the signal or packet carrying out the updating, the format comprising the specific identifier of the memory location to be updated, the content with which the memory location is to be updated, and a resident updating count of the updating source, the count comprising a number indicative of the sequence of occasions on which the updating source has been updated inclusive of the current updating; a storage means associated with each the memory location and in which the updating count of the previously received updating is stored; comparison means to compare the previously stored updating count with the updating count of the currently received updating signal or packet; and contention indicating means connected with the comparison means and operable to indicate a contention situation if the compared updating counts are the same.

Still further, there is disclosed a multiple computer system comprising a multiplicity of computers, each interconnected via at least one communications network, and each executing a different portion of an applications program written to execute on a single computer, each having an independent local memory with at least one memory location being replicated in each the local memory, a method of replica memory updating in which a memory location having a specific location identifier and replicated on at least two computers, can be updated substantially simultaneously from a plurality of sources, the method comprising the steps of:
(i) utilizing an updating format for the signal or packet carrying out the updating, the format comprising the specific identifier of the memory location to be updated, the content with which the memory location is to be updated, and a resident updating count of the updating source, the count comprising a number indicative of the sequence of occasions on which the updating source has been updated inclusive of the current updating,
(ii) storing for each replicated memory location the updating count of the previously sent or received updating,
(iii) comparing the presently resident updating count associated with the replicated memory location to be updated with the updating count of the currently received updating signal or packet, and
(iv) if the currently received updating count is greater than the presently resident updating count, overwriting the associated replicated memory location with the currently received data content, and overwriting the presently resident updating count with the currently received updating count, or
(v) if the currently received updating count is less than the presently resident updating count, not overwriting the associated replicated memory location with the currently received data content, and not overwriting the presently resident updating count with the currently received updating count, or (vi) if the currently received updating count is equal to the presently resident updating count, indicating a contention situation.

Still further yet, there is disclosed a multiple computer system comprising a multiplicity of computers, each interconnected via at least one communications network, and each executing a different portion of an applications program written to execute on a single computer, and each having an independent local memory with at least one memory location being replicated in each the local memory, and an updating for replica memory updating, the updating means comprising at least one memory location having a specific location identifier and replicated on at least two machines, and updated to remain substantially similar upon occasion of a machine modifying its replica value; a plurality of sources each of which can update the memory location(s) and each of which utilizes an updating format for the signal or packet carrying out the updating, the format comprising the specific identifier of the memory location to be updated, the content with which the memory location is to be updated, and a resident updating count of the updating source, the count comprising a number indicative of the sequence of occasions on which the updating source has been updated inclusive of the current updating; a storage means associated with each the memory location and in which the updating count of the previously received updating is stored; comparison means to compare the currently received updating count value with the presently resident updating count value and overwriting the associated replicated memory location with the currently received data content and overwriting the presently resident updating count with the currently received updating count, if the currently received updating count exceeds the presently resident updating count, or not overwriting the associated replicated memory location with the currently received data content and not overwriting the presently resident updating count with the currently received updating count, if the currently received updating count is less than the presently resident updating count; and contention indicating means connected with the comparison means and operable to indicate a contention situation if the compared updating counts are the same. Preferably the count comparison means is a comparator.

Additionally, there is also disclosed an a single computer for use in cooperation with at least one other computer in a multiple computer system, wherein the multiple computer system comprising a multiplicity of computers, each interconnected via at least one communications network, and each executing a different portion of an applications program written to execute on a single computer, each having an independent local memory with at least one memory location being replicated in each the local memory, a method of replica memory updating in which a memory location having a specific location identifier and replicated on at least two computers, can be updated substantially simultaneously from a plurality of sources, the method comprising the steps of:

(i) utilizing an updating format for the signal or packet carrying out the updating, the format comprising the specific identifier of the memory location to be updated, the content with which the memory location is to be updated, and a resident updating count of the updating source, the count comprising a number indicative of the sequence of occasions on which the updating source has been updated inclusive of the current updating, (ii) storing for each replicated memory location the updating count of the previously sent or received updating, (iii) comparing the presently resident updating count associated with the replicated memory location to be updated with the updating count of the currently received updating signal or packet, and (iv) if the currently received updating count is greater than the presently resident updating count, overwriting the associated replicated memory location with the currently received data content, and overwriting the presently resident updating count with the currently received updating count, or (v) if the currently received updating count is less than the presently resident updating count, not overwriting the associated replicated memory location with the currently received data content, and not overwriting the presently resident updating count with the currently received updating count, or (vi) if the currently received updating count is equal to the presently resident updating count, indicating a contention situation.

Still further disclosed is stored data updated by the method as defined above.

There is also disclosed a single computer adapted to communicate with at least one other computer to form a multiple computer system and arranged to carry out the above methods.

Similarly disclosed is a computer program product which when loaded into a computer enables the computer to carry out the above methods.

To summarize there is disclosed a method of resolving contention in addressed memory updating in which a memory location having a specific location identifier can be updated substantially simultaneously from a plurality of sources, the method comprising the steps of:

(i) utilizing an updating format for the signal or packet carrying out the updating, the format comprising the specific identifier of the memory location to be updated, the content with which the memory location is to be updated, and a resident updating count of the updating source, the count comprising a number indicative of the position of the updating message in the sequence of occasions on which the updating source has been updated inclusive of the current updating, (ii) storing for each receiving memory location the updating count of the previously received updating, (iii) comparing the updating count presently resident at the receiving memory location with the updating count of any currently received updating signal or packet, and (iv) if the currently received updating count is greater than the presently resident updating count, not actioning the incoming signal or packet, or (v) if the currently received updating count is less than the currently resident updating count, actioning the incoming signal or packet, or (vi) if the currently received updating count is equal to the presently resident updating count, instituting a contention resolution.

Preferably actioning the incoming signal or packet includes the steps of replacing the content of the specific memory location with the content of the incoming signal or packet, and replacing the presently resident updating count with the updating count of the incoming signal or packet.

Preferably the instituted contention resolution procedure is substantially independent of time.

Preferably the contention resolution procedure comprises the steps of:

(vii) determining the identity of each updating source, the updating sources being assigned a hierarchical order, and (viii) accepting the updating signal or packet from the source with the higher ranking in the hierarchical order.

Preferably the contention resolution procedure comprises the steps of:

(ix) determining the identity of each updating source, the updating sources being assigned a hierarchical order, and (x) accepting the updating signal or packet from the source with the lower ranking in the hierarchical order.

Preferably in the contention resolution procedure comprises the steps of:

(xi) allocating a substantially random number to each updating source, and (xii) accepting the updating signal or packet from the source with the higher random number.

Preferably in the contention resolution procedure comprises the steps of:

(xiii) allocating a substantially random number to each updating source, and (xiv) accepting the updating signal or packet from the source with the lower random number.

Also there is disclosed a system for detecting contention in addressed memory updating, the system comprising at least one memory location having a specific location identifier; a plurality of sources each of which can update the memory location(s) and each of which utilizes an updating format for the signal or packet carrying out the updating, the format comprising the specific identifier of the memory location to be updated, the content with which the memory location is to be updated, and a resident updating count of the updating source, the count comprising a number indicative of the position of the updating message in the sequence of occasions on which the updating source has been updated inclusive of the current updating; a storage means associated with each the memory location and in which the updating count of the previously received updating is stored; comparison means to compare the previously stored updating count with the updating count of any currently received updating signal or packet; contention indicating means connected with the comparison means and operable to indicate a contention situation if the compared updating counts are the same, to not act upon the currently received updating signal or packet if the comparison indicates that the currently received updating count is greater than the presently resident updating count, or to act upon the currently received updating signal or packet if the comparison indicates that the currently received updating count is less than the presently resident updating count, and contention resolution means connected with the contention indicating means to institute a contention resolution procedure.

Preferably the contention indicating means includes an overwrite means which acts upon the currently received updating signal or packet to replace the content of the specific memory location with the content of the incoming signal or packet, and replaces the presently resident updating count with the updating count of the incoming signal or packet.

Preferably the operation of the contention resolution means is substantially independent of time.

Preferably the contention resolution means includes a comparator means, each the updating source is assigned an indicative number, the indicative numbers of the last updating source and the currently updating, but contention indicated, source are compared by the comparator means, and the currently received updating signal or packet is acted upon only if the comparison is positive.

Preferably the contention resolution means includes a comparator means, each the updating source is assigned an indicative number, the indicative numbers of the last updating source and the currently updating, but contention indicated, source are compared by the comparator means, and the currently received updating signal or packet is acted upon only if the comparison is negative.

Preferably the indicative number represents the number of a computer in a hierarchy of computers.

Preferably the indicative number is a substantially random number.

Preferably the memory location is one of a plurality of memory locations resident in one of a plurality of computers and each of the plurality of computers has substantially the same structure of memory locations.

Preferably each the updatable memory location in one of the computers has a corresponding memory location in each of the others of the computers.

Preferably each the updatable memory location has a local memory address which is different from the location identifier.

Further there is disclosed a method of resolving contention in replica memory updating for a multiple computer system comprising a multiplicity of computers, each interconnected via at least one communications network, and each executing a different portion of an applications program written to execute on a single computer, each having an independent local memory with at least one memory location being replicated in each the local memory, and in which a memory location having a specific location identifier can be updated substantially simultaneously from a plurality of sources, the method comprising the steps of:

(i) utilizing an updating format for the signal or packet carrying out the updating, the format comprising the specific identifier of the replicated memory location to be updated, the content with which the replicated memory location is to be updated, a resident updating count of the updating source associated with the replicated memory location, the count comprising a number indicative of the sequence of occasions on which the updating source has been updated inclusive of the current updating, and a resident, and a resolution value of the updating source associated with the replicated memory location, the resolution value comprising a unique value to or of the updating source, (ii) storing for each receiving memory location the updating count and resolution value of the previously received updating, (iii) comparing the updating count presently resident at the receiving memory location with the updating count of any currently received updating signal or packet, and (iv) if the currently received updating count associated with the replicated memory location to be updated is equal to the presently resident updating count, not actioning the incoming signal or packet, or (v) if the currently received updating count is less than the currently resident updating count, actioning the incoming signal or packet, or (vi) if the currently received updating count is equal to the presently resident updating count, comparing the presently resident resolution value associated with the replicated memory location to be updated with the updating resolution value of the currently received updating signal or packet, and (vii) if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or (viii) if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

Furthermore, there is disclosed a system for resolving contention in replica memory updating for a multiple computer system comprising a multiplicity of computers, each interconnected via at least one communications network, and each executing a different portion of an applications program written to execute on a single computer, each having an independent local memory with at least one memory location being replicated in each the local memory, the system comprising at least one memory location having a specific location identifier; a plurality of sources each of which can update the replicated memory location(s) and each of which utilizes an updating format for the signal or packet carrying out the updating, the format comprising the specific identifier of the replicated memory location to be updated, the content with which the replicated memory location is to be updated, and a resident updating count of the updating source associated with the replicated memory location, the count comprising a number indicative of the sequence of occasions on which the updating source has been updated inclusive of the current updating, and a resolution value of the updating source associated with the replicated memory location, the resolution value the resolution value comprising a unique value to or of the updating source; a storage means associated with each the replicated memory location and in which the updating count and resolution value of the previously received updating is stored; comparison means to compare the previously stored updating count associated with the replicated memory location to be updated with the updating count of the currently received updating signal or packet; contention indicating means connected with the comparison means and operable to indicate a contention situation if the compared updating counts are the same, contention resolution means connected with the contention indicating means to institute a contention resolution procedure, wherein the resolution procedure comprises comparing the presently resident resolution value associated with the replicated memory location to be updated with the updating resolution value of the currently received updating signal or packet, and if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

Still further there is disclosed a multiple computer system comprising a multiplicity of computers, each interconnected via at least one communications network, and each executing a different portion of an applications program written to execute on a single computer, each having an independent local memory with at least one memory location being replicated in each the local memory, and a method of resolving contention in replica memory updating in which a memory location having a specific location identifier and replicated on at least two computers, can be updated substantially simultaneously from a plurality of sources, the method comprising the steps of:

(i) utilizing an updating format for the signal or packet carrying out the updating, the format comprising the specific identifier of the memory location to be updated, the content with which the memory location is to be updated, a resident updating count of the updating source, the count comprising a number indicative of the sequence of occasions on which the updating source has been updated inclusive of the current updating, and a resolution value of the updating source, the resolution value comprising a unique value to or of the updating source, (ii) storing for each replicated memory location the updating count and resolution value of the previously sent or received updating, (iii) comparing the presently resident updating count associated with the replicated memory location to be updated with the updating count of the currently received updating signal or packet, and (vi) if the currently received updating count is equal to the presently resident updating count, comparing the presently resident resolution value associated with the replicated memory location to be updated with the updating resolution value of the currently received updating signal or packet, and (v) if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or (vi) if the currently received resolution value is less than the presently resident resolution value, not overwriting the associated replicated memory location with the currently received data content; and not overwriting the presently resident updating count with the currently received updating count, and not overwriting the presently resident resolution value with the currently received resolution value.

Further yet there is disclosed a multiple computer system comprising a multiplicity of computers, each interconnected via at least one communications network, and each executing a different portion of an applications program written to execute on a single computer, each having an independent local memory with at least one memory location being replicated in each the local memory, and a system for resolving contention in replica memory updating, the system comprising at least one memory location having a specific location identifier and replicated on at least two machines, and updated to remain substantially similar upon occasion of a machine modifying its replica value; a plurality of sources each of which can update the memory location(s) and each of which utilizes an updating format for the signal or packet carrying out the updating, the format comprising the specific identifier of the memory location to be updated, the content with which the memory location is to be updated, and a resident updating count of the updating source, the count comprising a number indicative of the sequence of occasions on which the updating source has been updated inclusive of the current updating, and a resolution value of the updating source, the resolution value comprising a unique value to or of the updating source; a storage means associated with each the replicated memory location and in which the updating count and resolution value of the previously sent or received updating is stored; comparison means to compare the currently received updating count value associated with the replicated memory location to be updated with the presently resident updating count value and if the compared updating counts are the same, comparing the presently resident resolution value associated with the replicated memory location to be updated with the updating resolution value of the currently received updating signal or packet, and if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

Preferably the count comparison and resolution comparison means is a comparator.

Finally, there is disclosed a single computer for use in cooperation with at least one other computer in a multiple computer system, wherein the multiple computer system comprising a multiplicity of computers, each interconnected via at least one communications network, and each executing a different portion of an applications program written to execute on a single computer, each having an independent local memory with at least one memory location being replicated in each the local memory, and a method of resolving contention in replica memory updating in which a memory location having a specific location identifier and replicated on at least two computers, can be updated substantially simultaneously from a plurality of sources, the method comprising the steps of:

(i) utilizing an updating format for the signal or packet carrying out the updating, the format comprising the specific identifier of the memory location to be updated, the content with which the memory location is to be updated, a resident updating count of the updating source, the count comprising a number indicative of the sequence of occasions on which the updating source has been updated inclusive of the current updating, and a resolution value of the updating source, the resolution value comprising a unique value to or of the updating source, (ii) storing for each replicated memory location the updating count and resolution value of the previously sent or received updating, (iii) comparing the presently resident updating count associated with the replicated memory location to be updated with the updating count of the currently received updating signal or packet, and (vii) if the currently received updating count is equal to the presently resident updating count, comparing the presently resident resolution value associated with the replicated memory location to be updated with the updating resolution value of the currently received updating signal or packet, and (v) if the currently received resolution value is greater than the presently resident resolution value, overwriting the associated replicated memory location with the currently received data content, and overwriting the presently resident updating count with the currently received updating count, and overwriting the presently resident resolution value with the currently received resolution value, or (vi) if the currently received resolution value is less than the presently resident resolution value, not overwriting the associated replicated memory location with the currently received data content, and not overwriting the presently resident updating count with the currently received updating count, and not overwriting the presently resident resolution value with the currently received resolution value.

Still further there is disclosed a single computer adapted to communicate with other computers to form any one of the abovementioned multiple computer systems.

In addition there is disclosed a single computer adapted to communicate with other computers to form a multiple computer system and carry out any one of the abovedescribed methods of contention resolution.

Still further yet a computer program product is disclosed to carry out any one of the above methods or form any one of the above multiple computer systems.

Furthermore, stored data stored in accordance with the above methods is also disclosed.

To summarize there is disclosed a method of broadcasting a memory updating signal or packet over a communications network interconnecting a plurality of computers each of the computers having addressed memory locations each of which has a specific location identifier and can be updated substantially simultaneously from a plurality of sources, the method comprising the steps of:

(i) utilizing an updating format for the signal or packet carrying out the updating, the format comprising the specific identifier of each memory location to be updated, the content with which the each memory location is to be updated, and at least one resident updating count of the updating source, each the count comprising a number indicative of the position of the updating message in the sequence of occasions on which the updating source has been updated inclusive of the current updating, and (ii) following receipt of the broadcast updating signal or packet by each of the application executing computers, storing in the local memory of each the computer at each specific memory location both the corresponding updated content and the updating count.

Preferably the number of updating counts is equal to the number of memory locations to be updated.

Preferably the number of updating counts is equal to one.

Preferably the single updating count is selected from the group consisting of the updating count of each updated memory location included in the broadcast signal or packet.

Preferably the single updating count is the count of highest magnitude in the group.

Preferably each the memory location is one of a plurality of memory locations resident in one of the plurality of computers and each of the plurality of computers has substantially the same structure of memory locations.

Preferably each the updatable memory location in one of the computers has a corresponding memory location in each of the others of the computers.

Preferably each the updatable memory location has a local memory address which is different from the location identifier.

Preferably each of the plurality of computers executes a different portion of a single applications program written to be executed on a single computer.

There is also disclosed a system for broadcasting an addressed memory updating signal or packet over a communications network interconnecting a plurality of computers, the system comprising at least one memory location having a specific location identifier in each the computer; a plurality of sources each of which can update the memory location(s) and each of which utilizes an updating format for the signal or packet carrying out the updating, the format comprising the specific identifier of each memory location to be updated, the content with which the each memory location is to be updated, and at least one resident updating count of the updating source, each the count comprising a number indicative of the position of the updating message in the sequence of occasions on which the updating source has been updated inclusive of the current updating; and a storage means associated with each the memory location and in which the updating count of the previously received updating is stored.

Preferably the system includes the incrementing means to increment the resident updating count of the updating source on each occasion on which the updating source is locally updated.

Preferably the incrementing means increments the resident updating count by one.

Preferably the memory location is one of a plurality of memory locations resident in one of a plurality of computers and each of the plurality of computers has substantially the same structure of memory locations.

Preferably each the updatable memory location in one of the computers has a corresponding memory location in each of the others of the computers.

Preferably each the updatable memory location has a local memory address which is different from the location identifier.

In addition there is disclosed a method of broadcasting a memory updating signal or packet over a communications network interconnecting a plurality of computers each executing a different portion of an applications program written to execute on a single computer, and each having an independent local memory with at least one addressed memory location being replicated in each the local memory, each of which has a specific location identifier and can be updated substantially simultaneously from a plurality of sources, the method comprising the steps of:

(i) utilizing an updating format for the signal or packet carrying out the updating, the format comprising the specific identifier of each memory location to be updated, the content with which the each memory location is to be updated, and at least one updating count of the updating source, each the count comprising a number indicative of the sequence of occasions on which the updating source has been updated inclusive of the current updating, and at least one resolution value of the updating source, each the resolution value comprising a unique value of the updating source.

Furthermore there is disclosed a system for broadcasting an addressed memory updating signal or packet over a communications network interconnecting a plurality of computers, each the computer executing a different portion of an applications program written to execute on a single computer, and each having an independent local memory with at least one, the system comprising at least one replicated memory location being replicated in each the local memory having a specific location identifier in each the computer; a plurality of sources each of which can update the replicated memory location(s) and each of which utilizes an updating format for the signal or packet carrying out the updating, the format comprising the specific identifier of each replicated memory location to be updated, the content with which the each replicated memory location is to be updated, and at least one updating count of the updating source, each the count comprising a number indicative of the sequence of occasions on which the updating source has been updated inclusive of the current updating; and at least one resolution value of the updating source, each the resolution value comprising a unique value of the updating source.

Similarly there is disclosed a method of broadcasting a memory updating signal or packet over a communications network interconnecting a plurality of computers each executing a different portion of an applications program written to execute on a single computer, and each having an independent local memory with at least one addressed memory location being replicated in each the local memory, each of which has a specific location identifier and can be updated substantially simultaneously from a plurality of sources, the method comprising the steps of:

(i) utilizing an updating format for the signal or packet carrying out the updating, the format comprising the specific identifier of at least two replicated memory locations to be updated, the content with which the each replicated memory location is to be updated, and one updating count of the updating source for all the replicated memory locations, the count comprising a number indicative of the highest magnitude sequence of occasions on which all the replicated memory locations have been updated inclusive of the current updating, and at least one resolution value of the updating source, the resolution value comprising a unique value of the updating source.

Also disclosed is stored data updated by the above methods.

Furthermore there is disclosed a single computer adapted to communicate with other computers to form the above multiple computer system or systems.

Still furthermore there is disclosed a computer program product adapted to carry out the above method or methods or form the above multiple computer system or systems.

To summarize, there is disclosed a method of data consolidation in a system for detection and/or resolution of contention in addressed memory updating in which a memory location having a specific address or identifier can be updated substantially simultaneously from a plurality of sources, the method comprising the steps of:

(i) utilizing an updating signal/packet format comprising the specific address of the memory location to be updated, the content with which the memory location is to be updated, and an updating count indicative of the cumulative number of occasions on which the memory location will have been updated inclusive of the current updating.

(ii) storing for each the memory location the updating count of the previously received updating.

(iii) from time to time on the occurrence of a predetermined condition, consolidating the stored updating count.

Preferably the method includes the further step of:

(iv) re-initializing the system by re-setting all the updating counts to a predetermined number.

Preferably the method includes the step of:

(v) setting the predetermined number as zero.

Preferably the predetermined condition comprises the absence of any updating signal/packet for a predetermined period of time.

Preferably the predetermined condition comprises available spare memory space falling below a predetermined threshold.

Preferably the predetermined condition comprises the activity of a central processing unit associated with the memory location falling below a predetermined threshold.

Preferably the method includes the further step of:

(vi) consolidating the stored updating count by reducing the number of bits thereof.

Preferably the method includes the further step of:

(vii) reducing the number of bits of the stored updating count to one bit.

Preferably the method includes the further step of:
(viii) expanding the reduced stored updating count on receipt of the next updating signal/packet.

Preferably the method includes the further step of:
(ix) consolidating the stored updating count by deleting same.

Preferably the method includes the further step of:
(x) re-creating an updating count on the next occasion of writing to memory and transmission of the new memory value to the other machines, and
(xi) re-creating a stored updating count on receipt of the next updating signal/packet and setting the re-created count to equal the count of the received message.

Preferably the method includes the further step of:
(xii) setting the re-created updating count to one.

Preferably the method includes the step of:
(xiii) for each the updating signal/packet format providing an updating count for each memory location to be updated.

Preferably the method includes the step of:
(xiv) for a plurality of memory locations to be updated substantially simultaneously forming a group updating signal comprising all the memory locations to be updated, the content or value of each the memory location to be updated, and a single updating count for all the memory locations to be updated.

In addition, there is also disclosed a system for data consolidation to permit detection and/or resolution of contention where addressed memory in which memory locations each having a specific address or identifier can be updated substantially simultaneously from a plurality of sources, the system comprising a data storage comprising the specific address of each memory location to be updated, for each the address the content thereof which is overwritten by any received updated content, and an updating count indicative of the cumulative number of occasions on which each the memory location has been updated inclusive of any current updating, and consolidation means connected to the data storage to from time to time on the occurrence of a predetermined condition consolidate the stored updating count.

Preferably the consolidation means includes a re-initializing means to re-set all the updating counts to a predetermined member.

Preferably the predetermined number is zero.

Preferably the consolidation means predetermined condition comprises the absence of any updating signal/packet for a predetermined period of time.

Preferably the consolidation means predetermined condition comprises the available spare memory space within the data storage falling below a predetermined threshold.

Preferably the consolidation means predetermined condition comprises the activity of a central processing unit associated with the memory location falling below a predetermined threshold.

Preferably the consolidation means consolidates each the stored updating count by reducing the number of bits thereof.

Preferably the reduced number of bits comprises one bit.

Preferably the consolidation means on receipt of an updating signal/packet expands the reduced stored updating count.

Preferably the consolidation means consolidates each the stored updating count by deletion thereof.

Preferably the consolidation means on receipt of an updating signal/packet including an incoming updating count re-creates a stored updating count and sets same to equal the incoming updating count.

Preferably the consolidation means on receipt of an updating signal/packet re-creates the stored updating count and sets same to one.

Preferably the format of any updating signal/packet provides an updating count for each memory location to be updated.

Preferably the format of any updating signal/packet includes data simultaneously updating a group of the memory locations and the updating signal/packet includes a single updating count for all the memory locations to be updated.

There is also disclosed a method of data consolidation in a multiple computer system for detection and/or resolution of contention in addressed memory updating in which a replicated application memory location/content having a specific address or identifier can be updated substantially simultaneously from a plurality of sources, each of the computers comprising an independent local memory and each executing a portion of an application program written to operation on only a single computer, the method comprising the steps of:
(i) utilizing an updating signal/packet format comprising the specific address of the replicated application memory location/content to be updated, the content with which the memory location is to be updated, and an updating count ("count value") indicative of the cumulative number of occasions on which the memory location will have been updated inclusive of the current updating.
(ii) storing for each the memory location the updating count of the previously received updating.
(iii) from time to time on the occurrence of a predetermined condition, consolidating or deleting the stored updating count.

Still further there is disclosed a multiple computer system, each of the computers comprising an independent local memory and each executing a portion of a same application program written to operate on only a single computer, and a system for data consolidation to permit detection and/or resolution of contention where addressed memory in which replicated application memory locations/contents each having a specific address or identifier can be updated substantially simultaneously from a plurality of sources, the system comprising a data storage comprising the specific address of each replicated application memory location/content to be updated, for each the address the content thereof which is overwritten by any received updated content, and an updating count ("count value") indicative of the cumulative number of occasions on which each the memory location has been updated inclusive of any current updating, and consolidation or deletion means connected to the data storage to from time to time on the occurrence of a predetermined condition consolidate the stored updating count.

Stored data updated by the above method or methods.

A single computer adapted to communicate with other computers to form the above multiple computer system or systems.

A computer program product adapted to carry out the above method or methods or form the above multiple computer system or systems.

To summarize, there is disclosed a method of ensuring correct operation of a data updating system using a count value to signify the position of an updating message in a sequence of updating messages, the method comprising the steps of:
(i) halting the flow of updating messages, and
(ii) during the halt re-setting the count values.

Preferably the halt is initiated by the count values approaching a predetermined magnitude.

Preferably the predetermined magnitude is determined by potential arithmetic overflow.

Preferably the halt is initiated after a predetermined time.

Preferably the halt is initiated in the absence of predetermined message activity.

Preferably the count values are re-set to zero.

Also there is disclosed a multiple memory system in which at least one memory location at each of at least two physical locations are connected by a communications link over which memory updating messages are set, wherein a count value is associated with each the sent message to signify its position in a sequence of sent messages, and wherein the sending of the messages is temporarily halted to re-set the count values.

Preferably the halt is initiated by the count values approaching a predetermined magnitude.)

Preferably the predetermined magnitude is determined by potential arithmetic overflow.

Preferably the halt is initiated after a predetermined time.

Preferably the halt is initiated in the absence of predetermined message activity.

Preferably the count values are re-set to zero.

Preferably the system comprises a multiple computer system.

Still further there is disclosed a single computer adapted to form one of the computers of the above multiple computer system or systems.

Further, there is disclosed a method ensuring correct operation of a finite counter storing an updating count value in a multiple computer system, each the computer comprising an independent local memory and each operating an application program written to operate on only a single computer, and at least on application program memory location/content replicated in each of the independent memories and updated to remain substantially similar, the method comprising the steps of:

(i) resetting or reinitializing the updating count value of each the computer upon the updating count value reaching a threshold value.

Furthermore, there is disclosed a method ensuring correct operation of a finite counter storing an updating count value in a multiple computer system, each the computer comprising an independent local memory and each operating an application program written to operate on only a single computer, and at least on application program memory location/content replicated in each of the independent memories and updated to remain substantially similar, the method comprising the steps of:

(i) halting replica updating transmissions of replicated application memory locations/contents when associated the updating count value reaches a threshold value or a predetermined time interval has elapsed, (ii) resetting or reinitializing the updating count value on each of the computers, (iii) resuming the previously halted replica updating transmissions.

In addition, there is disclosed a single computer adapted to communicate with other computers to form a multiple computer system or systems and is arranged to carry out the above method or methods.

Also disclosed is a computer program product which when loaded into a computer enables the computer to carry out the above method or methods.

Additionally, disclosed is stored data updated by the above method or methods.

To summarize, there is disclosed a method of overcoming memory updating echoes in a memory system where at least one memory location is replicated at different memory stores and is able to be substantially simultaneously updated from a number of sources, each source transmitting an updating message including the address of the location, the new content for the location, and an updating count indicative of the position of the updating message in a sequence of updating messages, the updating count being incremented by a predetermined number to indicate consecutive updating messages, the method comprising the steps of:

(i) determining which source was the last to transmit in respect of a specific memory location, and (ii) where the same source is to transmit sequentially in respect of the same memory location, incrementing the updating count for the second transmission by more than the predetermined number.

Preferably the predetermined number is one.

Preferably the updating count is incremented by two in step (ii).

Preferably the memory system comprises replicated memory locations in a multiple computer system executing a single application program written to be operated on a single computer but with different portions of the single application program executing each on a different one of the multiple computers.

In addition there is disclosed a replicated memory system with memory updating echo rejection, the system comprising at least one memory location replicated at different memory stores and able to be substantially simultaneously updated from a number of sources each source transmitting an updating message including the address of the location, the new content for the location, and an updating count indicative of the position of the updating message in a sequence of updating messages, the updating count being increased by a predetermined number to indicate consecutive updating messages, wherein the system determines which source was the last to transmit, and where the same source is to transmit sequentially in respect of the same memory location increments the updating count for the second transmission by more than the predetermined number.

Preferably the predetermined number is one.

Preferably the updating count increment for same source same memory sequential transmission is two.

Preferably the memory system comprises a replicated memory system of a multiple computer system executing a single application program written to be operated on a single computer but with different portions of the single application program executing each on a different one of the multiple computers.

Still further there is disclosed a multiple computer system, each computer comprising an independent local memory and each computer operating a portion of an application program written to operate on a single computer, and utilizing a method of overcoming memory updating echoes in a memory system where at least one application memory location is replicated in each of the independent local memories and updated to remain substantially similar, each source transmitting an updating message including the address or identity of the replicated application memory location/content, the associated new content for the replicated application memory location, and an updating count indicative of the position of the updating message in a sequence of updating messages, the updating count being incremented by a predetermined number to indicate consecutive updating messages, the method comprising the steps of:

(i) determining which source was the last to transmit in respect of a specific memory location, and (ii) where the same source is to transmit sequentially in respect of the same memory location, incrementing the updating count for the second transmission by more than the predetermined number.

Yet still further there is disclosed a replicated memory system with memory updating echo rejection, the system comprising at least one application memory location/content replicated at different independent memory stores and being able to be substantially simultaneously updated from a number of sources each source transmitting an updating message including the address or identity of the replicated application memory location/content, the associated new content for the replicated application memory location, and an updating count indicative of the position of the updating message in a sequence of updating messages, the updating count being increased by a predetermined number to indicate consecutive updating messages, wherein the system determines which source was the last to transmit, and where the same source is to transmit sequentially in respect of the same memory location increments the updating count for the second transmission to more than the predetermined number.

In addition there is disclosed a multiple computer system, each computer of which comprises an independent local memory and each computer operating a portion of an application program written to operate on a single computer, and utilizing a method of overcoming memory updating echoes in a memory system where at least one application memory location is replicated in each of the independent local memories and updated to remain substantially similar, each source transmitting an updating message including the address or identity of the replicated application memory location/content, the associated new content for the replicated application memory location, and an updating count indicative of the position of the updating message in a sequence of updating messages, the updating count being incremented by a predetermined number to indicate consecutive updating messages, the method comprising the steps of:

(i) disabling on a receiving machine any alerted or scheduled but not yet transmitted replica memory updates upon receipt of a replica memory update transmission for the same replicated application memory location/content.

Furthermore a replicated memory system with memory updating echo rejection, is disclosed, the system comprising at least one application memory location/content replicated at different independent memory stores and able to be substantially simultaneously updated from a number of sources each source transmitting an updating message including the address or identity of the replicated application memory location/content, the associated new content for the replicated application memory location, and an updating count indicative of the position of the updating message in a sequence of updating messages, the updating count being increased by a predetermined number to indicate consecutive updating messages, wherein the system determines upon receipt of a replica memory update transmission by a receiving machine whether there exists on the receiving machine any alerted or scheduled but not yet transmitted replica memory updates for the same replicated application memory location/content, and if so disabling or cancelling the alerted or scheduled replica memory updates of the receiving machine.

Still further there is disclosed a single computer adapted to communicate with other computers to form a multiple computer system and arranged to carry out the above method or methods.

In addition there is disclosed a computer program product which when loaded into a computer enables the computer to carry out the above method or methods.

Also disclosed is stored data updated by the above method or methods.

The term "comprising" (and its grammatical variations) as used herein is used in the inclusive sense of "including" or "having" and not in the exclusive sense of "consisting only of".

I claim:

1. A method of detecting contention in addressed memory updating in which a memory location having a specific location identifier can be updated substantially simultaneously from a plurality of sources, said method comprising the steps of:

(i) utilizing an updating format for the signal or packet carrying out the updating, said format comprising the specific identifier of the memory location to be updated, the content with which said memory location is to be updated, and a resident updating count of the updating source, said count comprising a number indicative of the position of the updating message in the sequence of occasions on which the updating source has been updated inclusive of the current updating;

(ii) storing for each receiving memory location the updating count of the previously received updating;

(iii) comparing the updating count presently resident at the receiving memory location with the updating count of any currently received updating signal or packet; and (iv) indicating a contention situation if the compared updating counts are the same.

2. The method as defined in claim 1, including the further steps of:

(v) if the currently received updating count is greater than the presently resident updating count, not actioning the incoming signal or packet; or (vi) if the currently received updating count is less than the currently resident updating count, actioning the incoming signal or packet; or (vii) if the currently received updating count is equal to the presently resident updating count, instituting a contention resolution.

3. A computer program product comprising a set of executable computer program instructions stored in a physical, non-transitory computer readable media, the executable computer program instructions being adapted for execution by at least one computer to modify the operation of the at least one computer; the modification of operation including performing a method of detecting contention in addressed memory updating in which a memory location having a specific location identifier can be updated substantially simultaneously from a plurality of sources, said method comprising:

(i) utilizing an updating format for the signal or packet carrying out the updating, said format comprising the specific identifier of the memory location to be updated, the content with which said memory location is to be updated, and a resident updating count of the updating source, said count comprising a number indicative of the position of the updating message in the sequence of occasions on which the updating source has been updated inclusive of the current updating;

(ii) storing for each receiving memory location the updating count of the previously received updating;

(iii) comparing the updating count presently resident at the receiving memory location with the updating count of any currently received updating signal or packet; and (iv) indicating a contention situation if the compared updating counts are the same.

4. A system for detecting contention in addressed memory updating, said system comprising at least one memory location having a specific location identifier; a plurality of sources each of which can update said memory location(s) and each of which utilizes an updating format for the signal or packet carrying out the updating, said format comprising the specific identifier of the memory location to be updated, the content with which said memory location is to be updated, and a resident updating count of the updating source, said count comprising a number indicative of the position of the updating message in the sequence of occasions on which the updating source has been updated inclusive of the current updating; a storage means associated with each said memory location and in which the updating count of the previously received updating is stored; comparison means to compare the previously stored updating count with the updating count of any currently received updating signal or packet; and contention indicating means connected with said comparison means and operable to indicate a contention situation if the compared updating counts are the same.

5. The system as in claim 4, wherein said contention indicating means is operable to indicate a contention situation if the compared updating counts are the same, to not act upon the currently received updating signal or packet if said comparison indicates that the currently received updating count is greater than the presently resident updating count, or to act upon the currently received updating signal or packet if said comparison indicates that the currently received updating count is less than the presently resident updating count, and contention resolution means connected with said contention indicating means to institute a contention resolution procedure.

6. A method of detecting contention in addressed memory updating in which a memory location having a specific location identifier can be updated substantially simultaneously from a plurality of sources, said method comprising:
(i) utilizing an updating format for the signal or packet carrying out the updating, said format comprising the specific identifier of the memory location to be updated, the content with which said memory location is to be updated, and a resident updating count of the updating source, said count comprising a number indicative of the position of the updating message in the sequence of occasions on which the updating source has been updated inclusive of the current updating;
(ii) storing for each receiving memory location the updating count of the previously received updating;
(iii) comparing the updating count presently resident at the receiving memory location with the updating count of any currently received updating signal or packet;
(iv) indicating a contention situation if the compared updating counts are the same; and
(v) if the currently received updating count is greater than the presently resident updating count, not actioning the incoming signal or packet; or
(vi) if the currently received updating count is less than the currently resident updating count, actioning the incoming signal or packet; or
(vii) if the currently received updating count is equal to the presently resident updating count, instituting a contention resolution.

7. The method of claim 6, further comprising:
(viii) following receipt of said updating signal or packet storing both the corresponding updated content and said updating count.

8. The method as defined in claim 7, including the further step of:
(ix) from time to time, or on the occurrence of a predetermined condition, consolidating the stored updating count.

9. The method as defined in claim 8, including the further steps of:
(x) providing at least one further data bit in addition to, and associated with, each said memory location;
(xi) changing the state of the further data bit of each counter if said counter reaches a predetermined maximum count value; and
(xii) modifying the comparison of sequentially received updating messages or signals in accordance with the states of the associated further data bit of the sequentially received updating messages.

10. The method as defined in claim 9, including the further steps of:
(xiii) determining which source was the last to transmit in respect of a specific memory location; and
(xiv) where the same source is to transmit sequentially in respect of the same memory location, incrementing said updating count for the second transmission by more than the first transmission.

11. A system for detecting contention in addressed memory updating, said system comprising:
at least one memory location having a specific location identifier;
a plurality of sources each of which can update said memory location(s) and each of which utilizes an updating format for the signal or packet carrying out the updating, said format comprising the specific identifier of the memory location to be updated, the content with which said memory location is to be updated, and a resident updating count of the updating source, said count comprising a number indicative of the position of the updating message in the sequence of occasions on which the updating source has been updated inclusive of the current updating;
a storage means associated with each said memory location and in which the updating count of the previously received updating is stored;
comparison means to compare the previously stored updating count with the updating count of any currently received updating signal or packet;
contention indicating means connected with said comparison means and operable to indicate a contention situation if the compared updating counts are the same,
wherein said contention indicating means is operable:
to indicate a contention situation if the compared updating counts are the same,
to not act upon the currently received updating signal or packet if said comparison indicates that the currently received updating count is greater than the presently resident updating count, or
to act upon the currently received updating signal or packet if said comparison indicates that the currently received updating count is less than the presently resident updating count; and
contention resolution means connected with said contention indicating means to institute a contention resolution procedure.

12. The system of claim 11, further comprising a storage means associated with each said memory location and in which the updating count of the previously received updating is stored.

13. The system as in claim 12, and including consolidation means connected to said data storage to from time to time, or on the occurrence of a predetermined condition consolidate the stored updating count.

14. The system as in claim 13, and including a finite counter and each said memory location includes a further data bit, said updating messages or signals include said further data bit, said further data bit changes state if said counter reaches a predetermined maximum count value, and said comparison means modifies the comparison of sequentially received updating messages or signals in accordance with the states of said further data bits of sequentially received messages.

15. The system as in claim 14, wherein said updating count is increased by a predetermined number to indicate consecutive updating messages or signals, said comparison means determines which source was the last to update, and where the same source is to transmit sequentially in respect of the same memory location said updating count for the second transmission is incremented by more than for the first transmission.

\* \* \* \* \*